United States Patent
Hirai

(10) Patent No.: US 11,393,230 B2
(45) Date of Patent: Jul. 19, 2022

(54) INPUT DISPLAY CONTROL DEVICE, INPUT DISPLAY CONTROL METHOD, AND INPUT DISPLAY SYSTEM

(71) Applicant: Mitsubishi Electric Corporation, Tokyo (JP)

(72) Inventor: Masato Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/239,717

(22) Filed: Apr. 26, 2021

(65) Prior Publication Data

US 2021/0248407 A1 Aug. 12, 2021

Related U.S. Application Data

(63) Continuation of application No. PCT/JP2018/045156, filed on Dec. 7, 2018.

(51) Int. Cl.
*G06V 30/146* (2022.01)
*G06F 3/04845* (2022.01)
(Continued)

(52) U.S. Cl.
CPC ...... *G06V 30/1478* (2022.01); *G06F 3/04845* (2013.01); *G06F 3/04883* (2013.01); *G06V 10/235* (2022.01)

(58) Field of Classification Search
CPC ............ G06V 30/1478; G06V 10/235; G06V 10/248; G06V 10/443; G06F 3/04845;
(Continued)

(56) References Cited

U.S. PATENT DOCUMENTS

2009/0021530 A1 1/2009 Ishiguro
2011/0016390 A1* 1/2011 Oh ..................... G06F 3/0482
345/173
(Continued)

FOREIGN PATENT DOCUMENTS

EP 3 407 173 A1 11/2018
JP 7-84742 A 3/1995
(Continued)

OTHER PUBLICATIONS

International Search Report and Written Opinion dated Feb. 12, 2019, received for PCT Application PCT/JP2018/045156, Filed on Dec. 7, 2018, 11 pages including English Translation.

(Continued)

*Primary Examiner* — William A Beutel
(74) *Attorney, Agent, or Firm* — Xsensus LLP

(57) ABSTRACT

An input display control device includes: a curve information acquisition unit for acquiring curve information indicating a curve; a character string acquisition unit for acquiring a character string; and a display control unit for generating display information for displaying the character string acquired by the character string acquisition unit along the curve indicated by the curve information acquired by the curve information acquisition unit, in which when a part of the character string acquired by the character string acquisition unit protrudes out of a display area of a display since a length of the character string acquired by the character string acquisition unit is long, the display control unit disposes the part of the character string in a virtual area that is an area surrounding the display area.

16 Claims, 50 Drawing Sheets

(51) Int. Cl.
  *G06F 3/04883*   (2022.01)
  *G06V 10/22*   (2022.01)
(58) Field of Classification Search
  CPC ............ G06F 3/04883; G06F 3/04842; G06F 3/0485; G06F 3/0486; G06F 40/109; G06F 3/16; G06F 3/0481; G06F 3/0488; G06T 11/203; G06T 11/60; G06T 11/001; G06T 11/20
  See application file for complete search history.

(56) References Cited

U.S. PATENT DOCUMENTS

| | | | |
|---|---|---|---|
| 2012/0017159 | A1 | 1/2012 | Roh et al. |
| 2014/0163983 | A1* | 6/2014 | Kim .................. G06F 3/167 704/235 |
| 2016/0077702 | A1 | 3/2016 | Nomachi et al. |
| 2016/0196050 | A1 | 7/2016 | Shimizu et al. |
| 2016/0378290 | A1 | 12/2016 | Koyama et al. |
| 2019/0012075 | A1* | 1/2019 | Hirai .................. G06F 3/04883 |
| 2020/0210040 | A1 | 7/2020 | Koyama et al. |

FOREIGN PATENT DOCUMENTS

| | | |
|---|---|---|
| JP | 2001-117694 A | 4/2001 |
| JP | 2007-133885 A | 5/2007 |
| JP | 2009-25420 A | 2/2009 |
| JP | 2009-205304 A | 9/2009 |
| JP | 2013-20444 A | 1/2013 |
| JP | 2015-22377 A | 2/2015 |
| JP | 2016-126672 A | 7/2016 |
| JP | 2016-206603 A | 12/2016 |
| JP | 2017-10480 A | 1/2017 |
| JP | 2018-10691 A | 1/2018 |
| JP | 2018-77921 A | 5/2018 |
| KR | 10-2012-0009546 A | 2/2012 |
| KR | 10-2014-0074725 A | 6/2014 |
| WO | 2014/175395 A1 | 10/2014 |
| WO | 2017/138076 A1 | 8/2017 |

OTHER PUBLICATIONS

Notice of Reasons for Refusal dated Jul. 2, 2019, received for Japanese Application 2019-517862, 9 pages including English Translation.
Korean Office Action dated Aug. 13, 2021 in Korean Patent Application No. 2021-7016505.
Office Action dated Dec. 8, 2021, in corresponding Korean patent Application No. 10-2021-7016505, 3 pages.
Extended European Search Report dated Dec. 6, 2021 in European Patent Application No. 18942154.8, 15 pages.

* cited by examiner

FIG. 6

| Character Type | Character Size | Character Height | Character Width |
|---|---|---|---|
| A | 5 | 2.5 mm | 2.5 mm |
| | 10 | 5 mm | 5 mm |
| | 15 | 7.5 mm | 7.5 mm |
| | 20 | 10 mm | 10 mm |
| B | 5 | 2 mm | 1.25 mm |
| | 10 | 4 mm | 2.5 mm |
| | 15 | 6 mm | 3.75 mm |
| | 20 | 8 mm | 5 mm |
| C | ... | ... | ... |
| | ... | ... | ... |
| | ... | ... | ... |
| | ... | ... | ... |

FIG. 8

[When Character String Indicating Voice Recognition Result Is Output First]

Step A

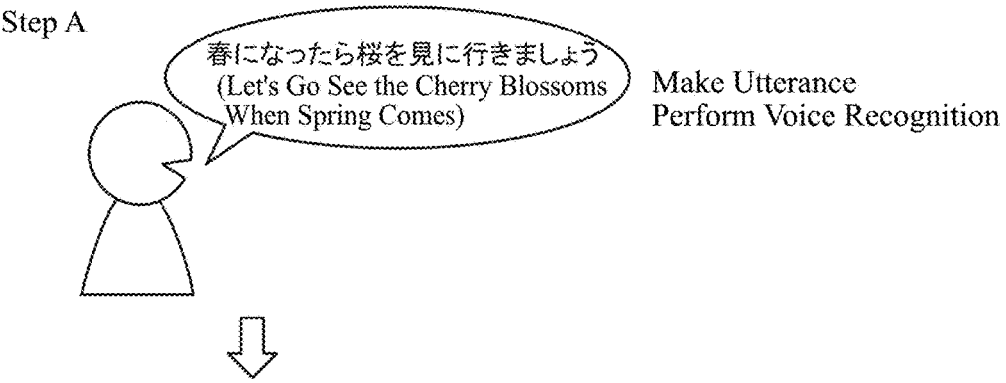

Make Utterance
Perform Voice Recognition

Step B

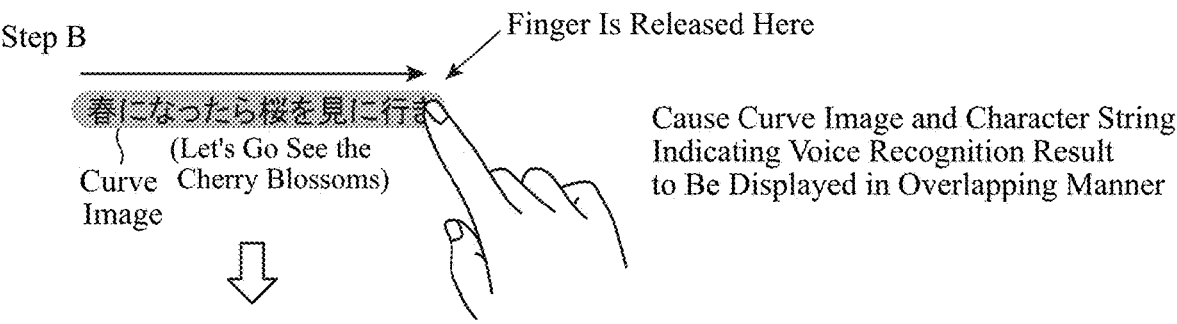

Cause Curve Image and Character String Indicating Voice Recognition Result to Be Displayed in Overlapping Manner Step C

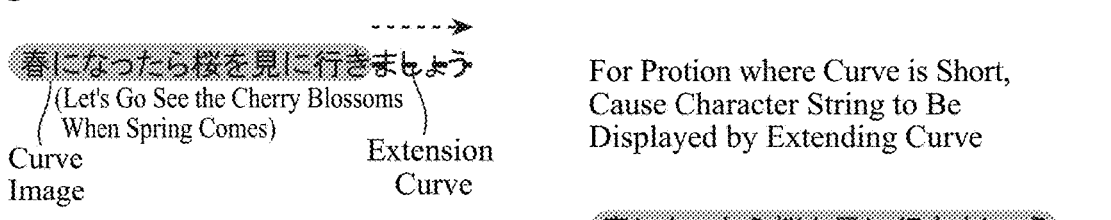

For Protion where Curve is Short, Cause Character String to Be Displayed by Extending Curve Step D 春になったら桜を見に行きましょう
(Let's Go See the Cherry Blossoms
When Spring Comes)

Cause Curve Image to Be Erased

Example in Which All Characters Can Be Displayed When Length of Curve Is Longer than Length of Character String Example in Which Part of Characters Cannot Be Displayed When Length of Curve Is Shorter than Length of Character String

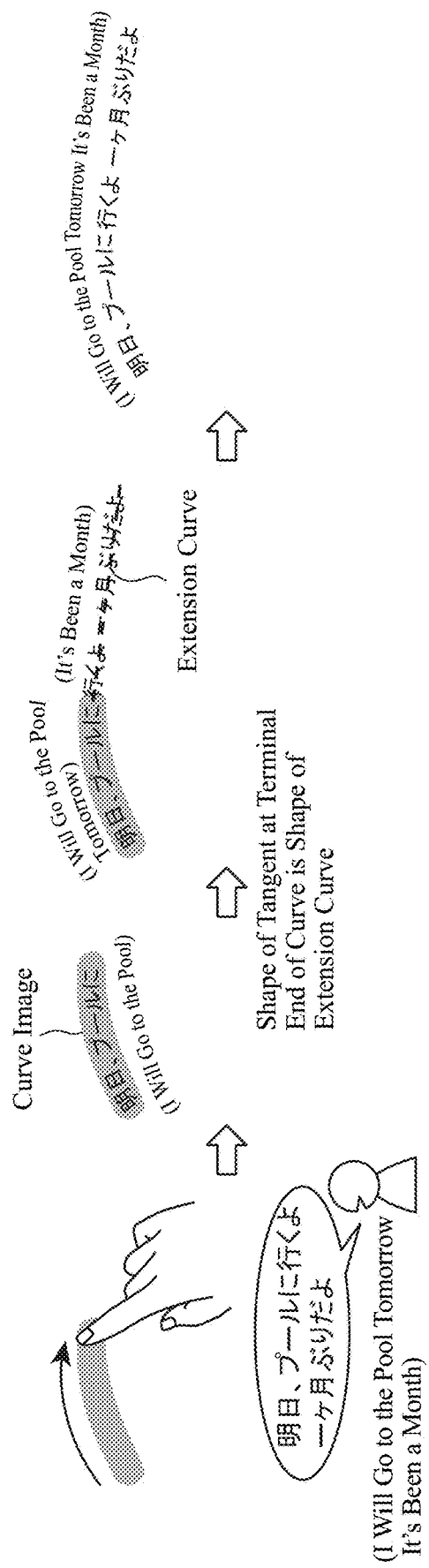

FIG. 15
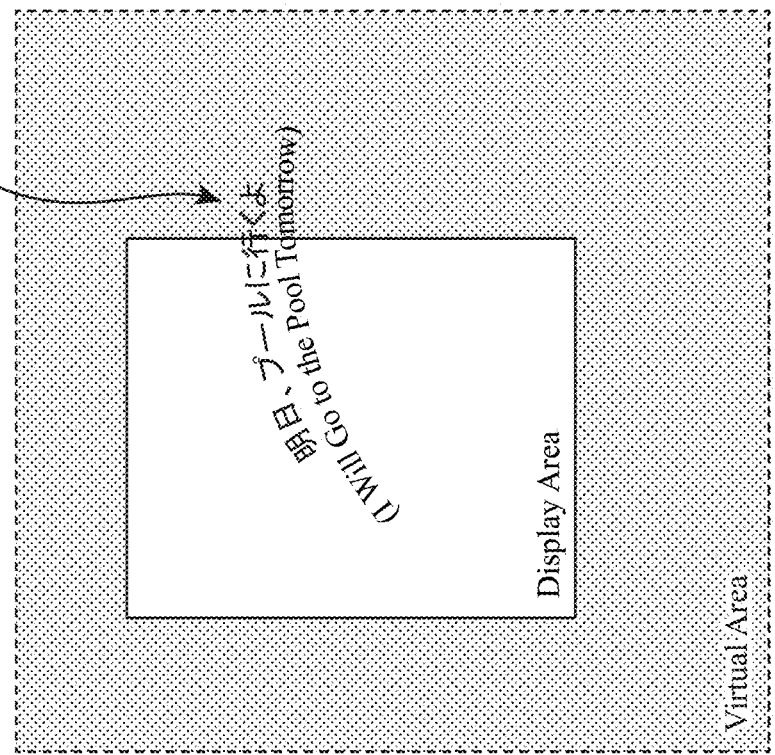
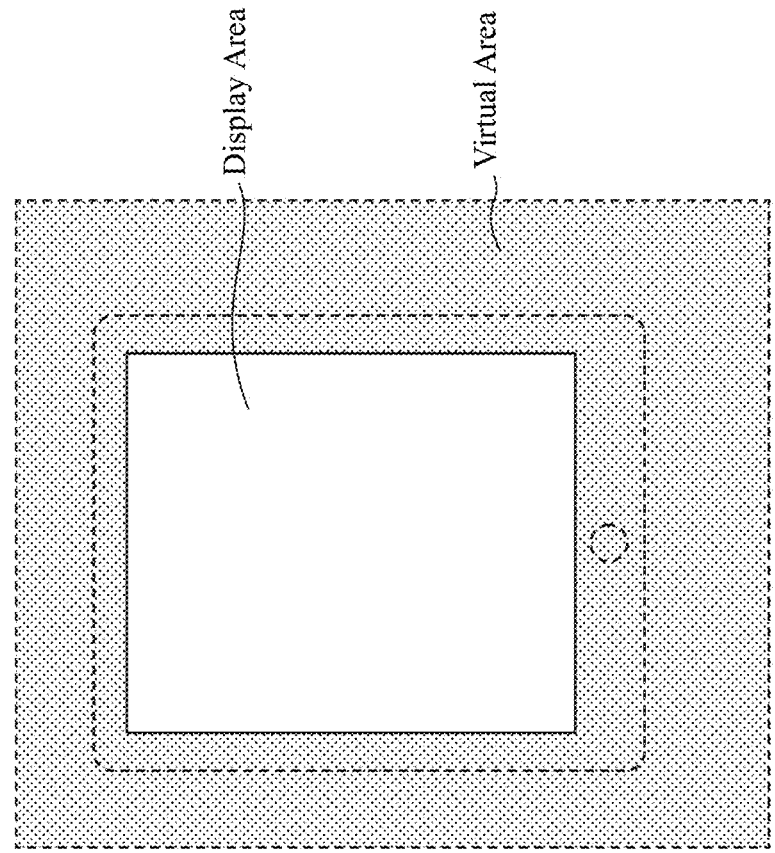

FIG. 17
 
Character String Is in Selected State When Being Long-Pressed
Character String Is in Selected State, Character String Becomes Outline Character

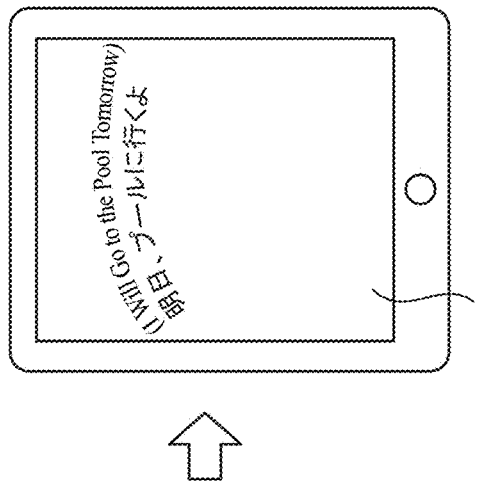
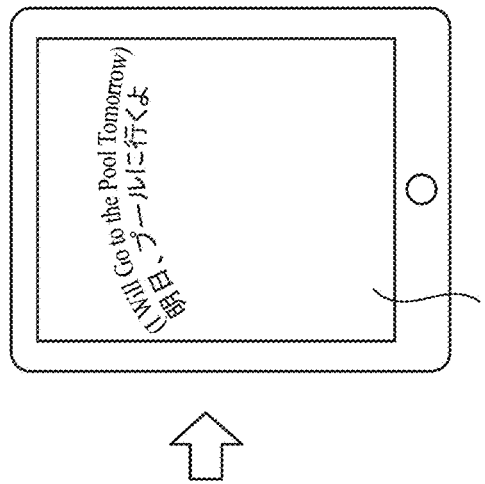
FIG. 18A
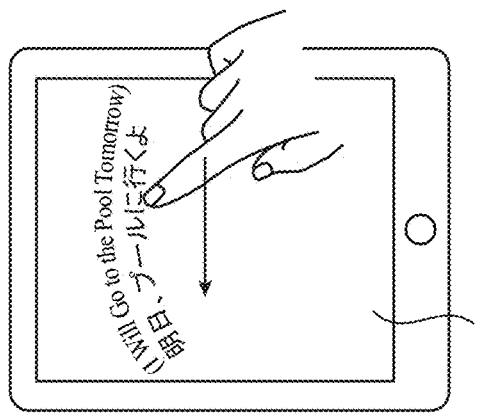
FIG. 18B
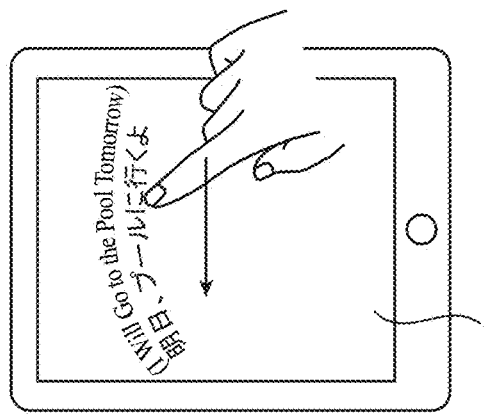
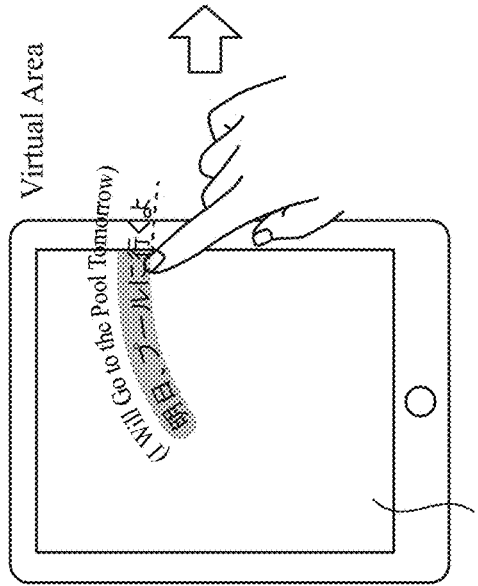
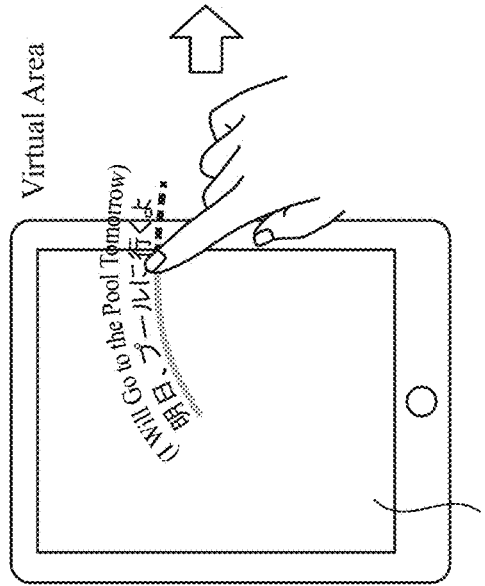

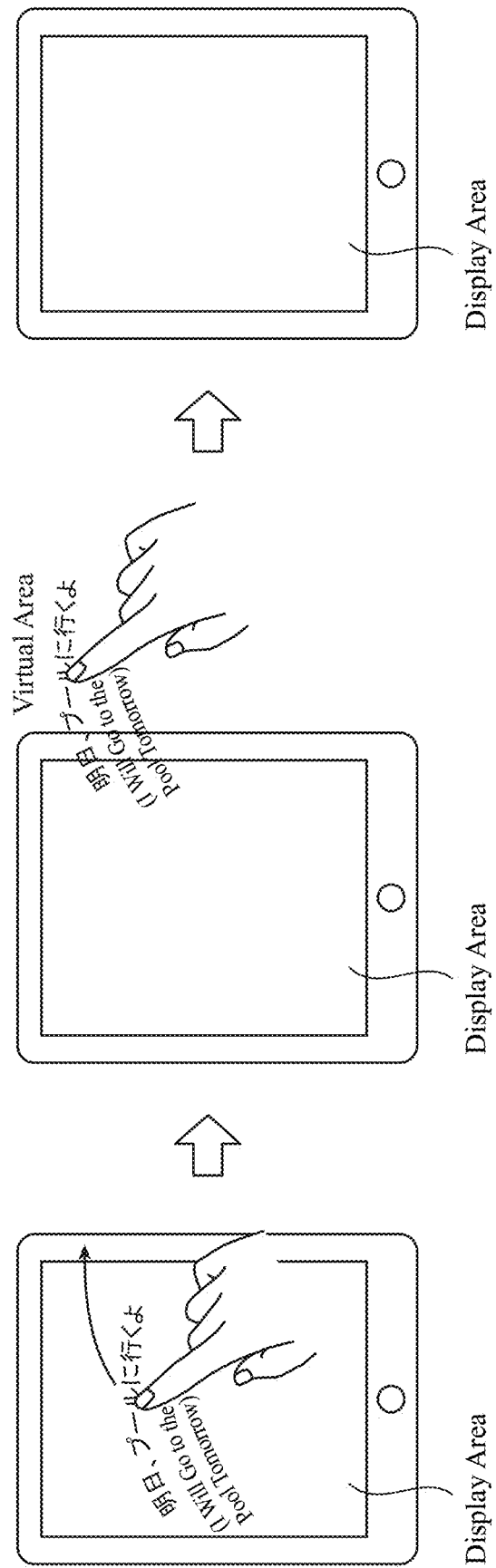

| Character String | Simplified Version |
|---|---|
| Went to Eat | Ate |
| Went Eating | |
| Ate | |
| Ramen |  |

FIG. 39

Step A

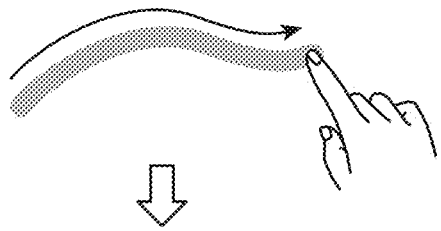

Cause Image of Curve Representing Locus of Line Drawn by Operation to Be Displayed Step B

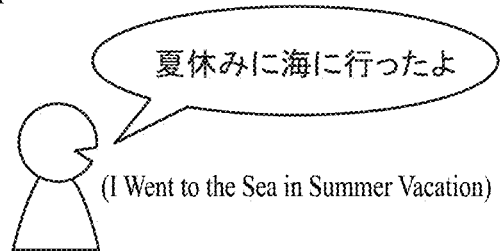

(I Went to the Sea in Summer Vacation)

Make Utterance
Perform Voice Recognition

Step C

Curve Image

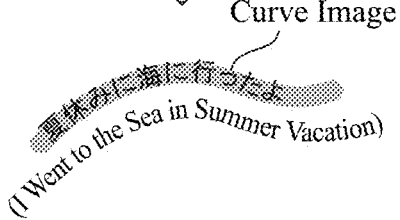

Cause Character String Indicating Voice Recognition Result to Be Displayed Superimposed on Curve Image Step D

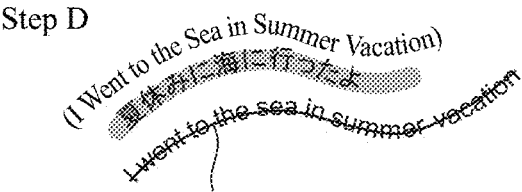

Curve for Displaying Translated Character String

Cause Character String Indicating Translation Result to Be Displayed along Curve Step E

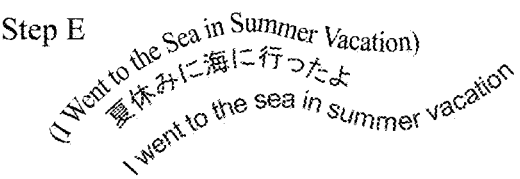

Cause Curve Image to Be Erased

FIG. 40

Step A

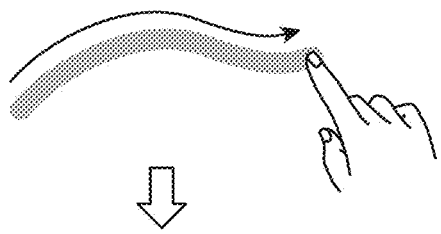

Cause Image of Curve Representing Locus of Line Drawn by Operation to Be Displayed Step B

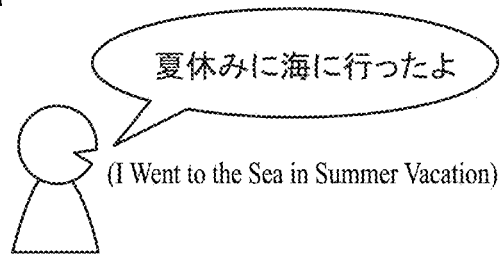

(I Went to the Sea in Summer Vacation)

Make Utterance
Perform Voice Recognition

Step C

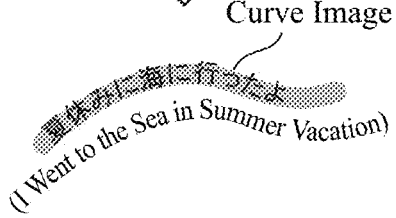

Cause Character String Indicating Voice Recognition Result to Be Displayed Superimposed on Curve Image Step D

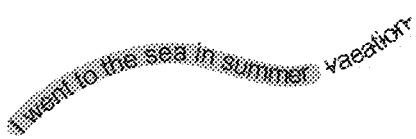

Cause Character String Indicating Translation Result to Be Displayed Superimposed on Curve Image Step E

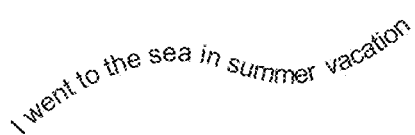

Cause Curve Image to Be Erased

FIG. 41

Step A

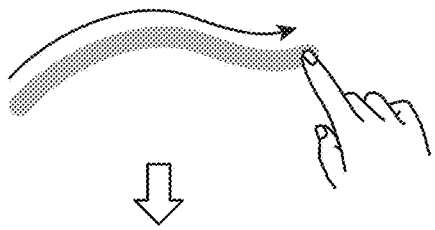

Cause Image of Curve Representing Locus of Line Drawn by Operation to Be Displayed Step B

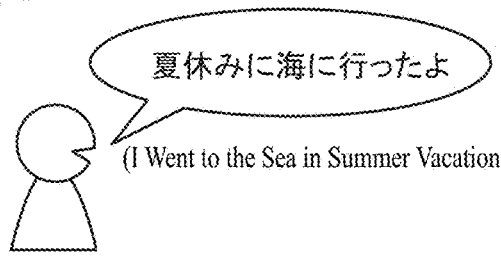

(I Went to the Sea in Summer Vacation)

Make Utterance
Perform Voice Recognition

Step C

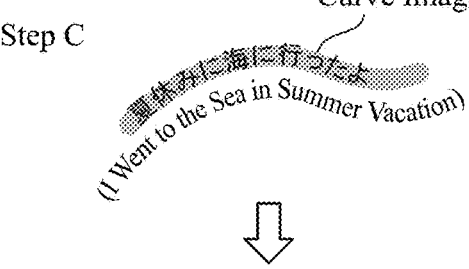

Curve Image

Cause Character String Indicating Voice Recognition Result to Be Displayed Superimposed on Curve Image Step D

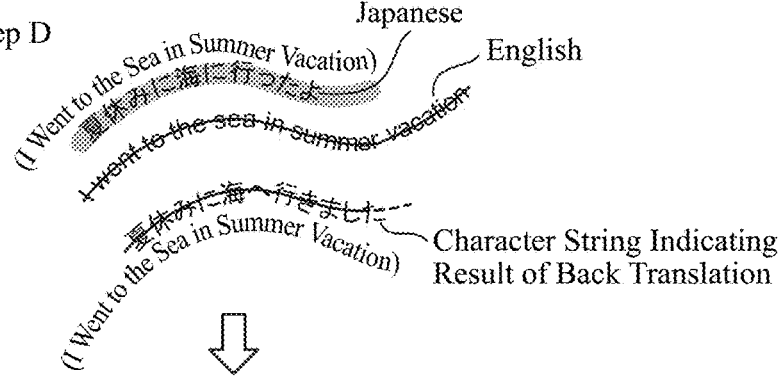

Japanese

English

Character String Indicating Result of Back Translation

Step E

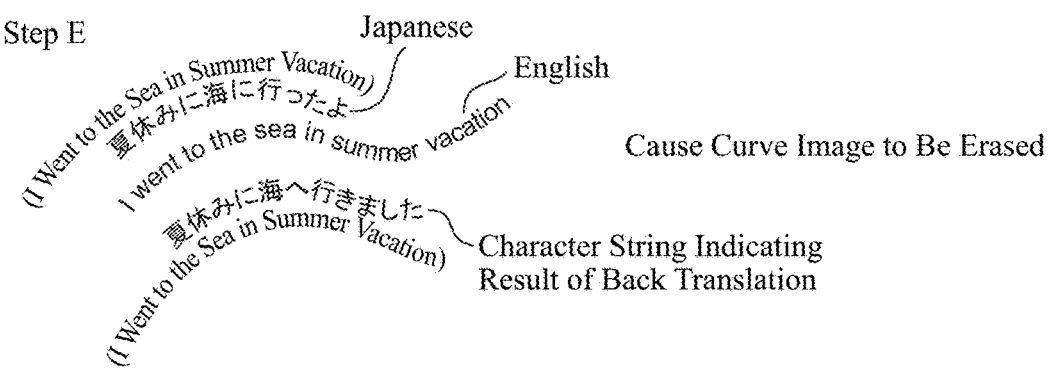

Japanese

English

Cause Curve Image to Be Erased

Character String Indicating Result of Back Translation

FIG. 42

Step A

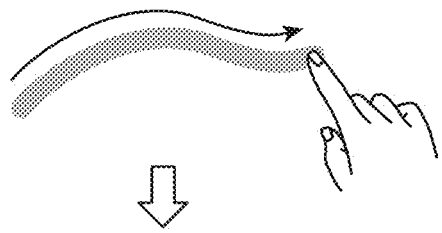

Cause Image of Curve Representing Locus of Line Drawn by Operation to Be Displayed Step B

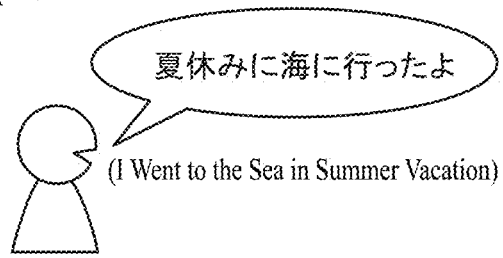

Make Utterance
Perform Voice Recognition

Step C

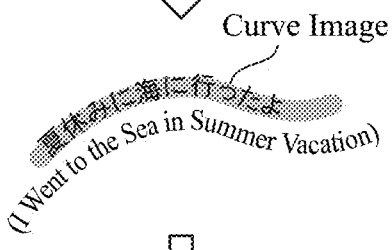

Curve Image

Cause Character String Indicating Voice Recognition Result to Be Displayed Superimposed on Curve Image Step D

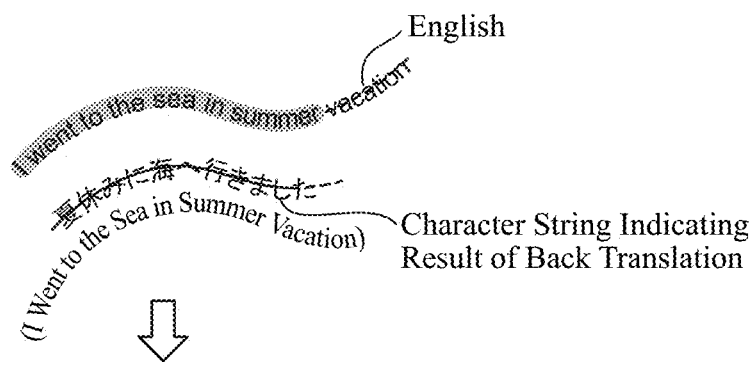

English

Character String Indicating Result of Back Translation

Step E

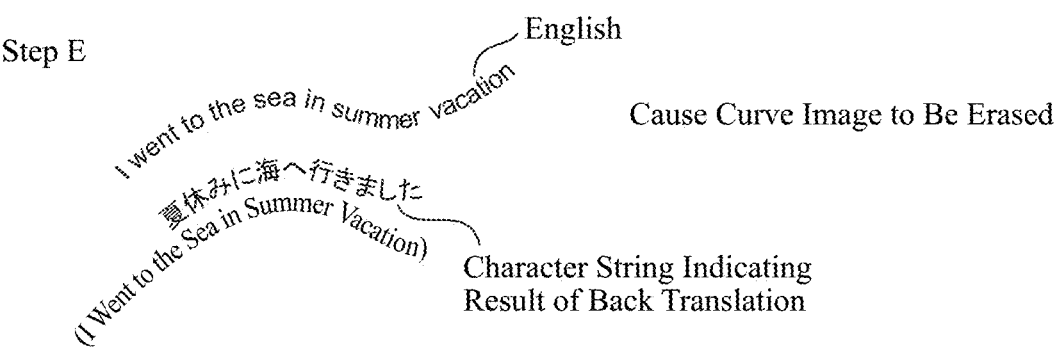

English

Cause Curve Image to Be Erased

Character String Indicating Result of Back Translation

FIG. 47

Step A

Write Characters in Handwriting

⇩

Step B

● Represents Central Coordinates of Character

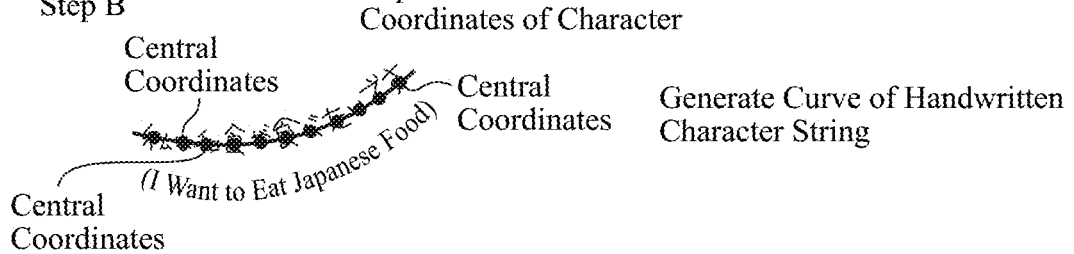

Generate Curve of Handwritten Character String

⇩

Step C

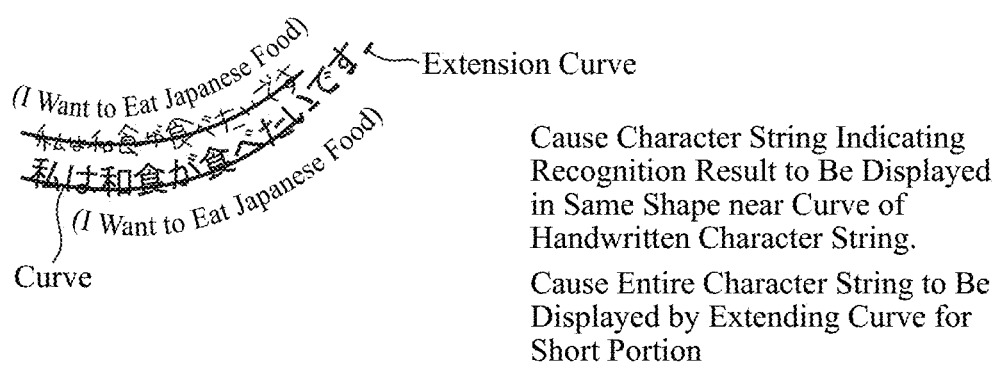

Cause Character String Indicating Recognition Result to Be Displayed in Same Shape near Curve of Handwritten Character String.

Cause Entire Character String to Be Displayed by Extending Curve for Short Portion FIG. 49
Step A
Write Characters in Handwriting
Step B
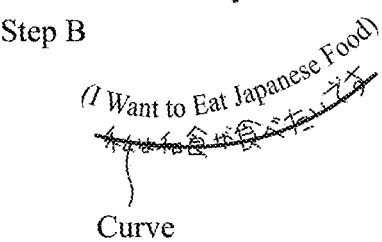
Curve
Generate Curve of Handwritten Character String
Step C
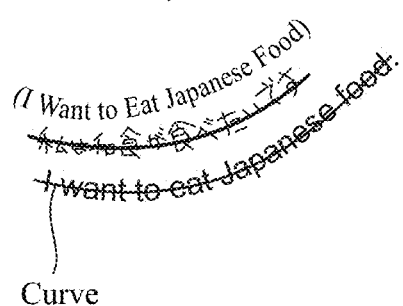
Curve
Cause Character String Indicating Translation Result to Be Displayed in Same Shape Near Curve of Handwritten Character String

INPUT DISPLAY CONTROL DEVICE, INPUT DISPLAY CONTROL METHOD, AND INPUT DISPLAY SYSTEM

CROSS-REFERENCE TO RELATED APPLICATION

The present application is a continuation of International Application No. PCT/JP2018/045156, filed Dec. 7, 2018, the entire contents of which is incorporated herein by reference in its entirety.

TECHNICAL FIELD

The present invention relates to an input display control device, an input display control method, and an input display system for generating display information for displaying a character string.

BACKGROUND ART

The following Patent Literature 1 discloses an input display control device for generating display information for displaying a character string along a line such as a curve.

CITATION LIST

Patent Literature

Patent Literature 1: WO 2017/138076 A

SUMMARY OF INVENTION

Technical Problem

The input display control device disclosed in Patent Literature 1 generates display information for displaying a character string in a display area of a display. However, since the display area of the display has a size limitation, there has been a problem that the entire character string cannot be generated.

The present invention has been made to solve the above problem, and it is an object to obtain an input display control device, an input display control method, and an input display system capable of avoiding a situation in which the entire character string cannot be generated.

Solution To Problem

An input display control device according to the present invention includes: processing circuitry to perform a process of: acquiring curve information indicating a curve; acquiring a character string; and generating display information for displaying the character string acquired along the curve indicated by the curve information acquired, wherein the process extends the curve by determining a shape of an extension part of the curve on a basis of the curve indicated by the curve information when determining that a length of the curve indicated by the curve information acquired is shorter than a length of the character string acquired, compares the length of the curve with the length of the character string acquired when the curve reaches ends of a display area of a display, extends further the curve to the virtual area which is an area surrounding the display area when determining that a part of the character string acquired protrudes out of the display area of the display since a length of the character string acquired is longer than the length of the curve, and generates the display information by disposing the part of the character string in a virtual area along the curve.

Advantageous Effects of Invention

According to the present invention, the input display control device is configured so that when a part of the character string acquired by the character string acquisition unit protrudes out of a display area of a display since a length of the character string acquired by the character string acquisition unit is long, the display control unit disposes the part of the character string in a virtual area that is an area surrounding the display area. Thus, the input display control device according to the present invention can avoid the situation in which the entire character string cannot be generated.

BRIEF DESCRIPTION OF DRAWINGS

FIG. 3 is a hardware configuration diagram of a computer when the input display system is implemented by software, firmware, or the like.

FIG. 6 is an explanatory diagram illustrating a character attribute table stored in a character management DB 2.

FIG. 8 is an explanatory diagram illustrating display processing when a character string indicating a voice recognition result is output before a curve image is output.

FIG. 12A is an explanatory diagram illustrating an example in which the shape of an extension curve is the shape of the tangent at the terminal end of an original curve.

FIG. 15 is an explanatory diagram illustrating a display area of the display 32 and a virtual area that is an area surrounding the display area.

FIG. 17 is an explanatory diagram illustrating the character string of which selection is accepted by a character string selection unit 18a.

FIG. 18A is an explanatory diagram illustrating movement of the character string displayed superimposed on a curve image.

FIG. 18B is an explanatory diagram illustrating an example in which the curve image is illustrated as an underline of the character string.

FIG. 19 is an explanatory diagram illustrating discarding of the character string acquired by a character string acquisition unit 10.

FIG. 39 is an explanatory diagram illustrating an example of display processing in a display processing unit 53 of a display control unit 51.

FIG. 40 is an explanatory diagram illustrating an example of display processing in the display processing unit 53 of the display control unit 51.

FIG. 41 is an explanatory diagram illustrating an example of displaying a character string indicating a translation result.

FIG. 42 is an explanatory diagram illustrating an example of displaying a character string indicating a translation result.

FIG. 47 is an explanatory diagram illustrating an example of processing of displaying a character string indicating a character recognition result.

FIG. 49 is an explanatory diagram illustrating an example of processing of displaying a character string indicating a translation result.

DESCRIPTION OF EMBODIMENTS

Hereinafter, to explain the present invention in more detail, embodiments for carrying out the present invention will be described with reference to the accompanying drawings.

First Embodiment

Figure 1:
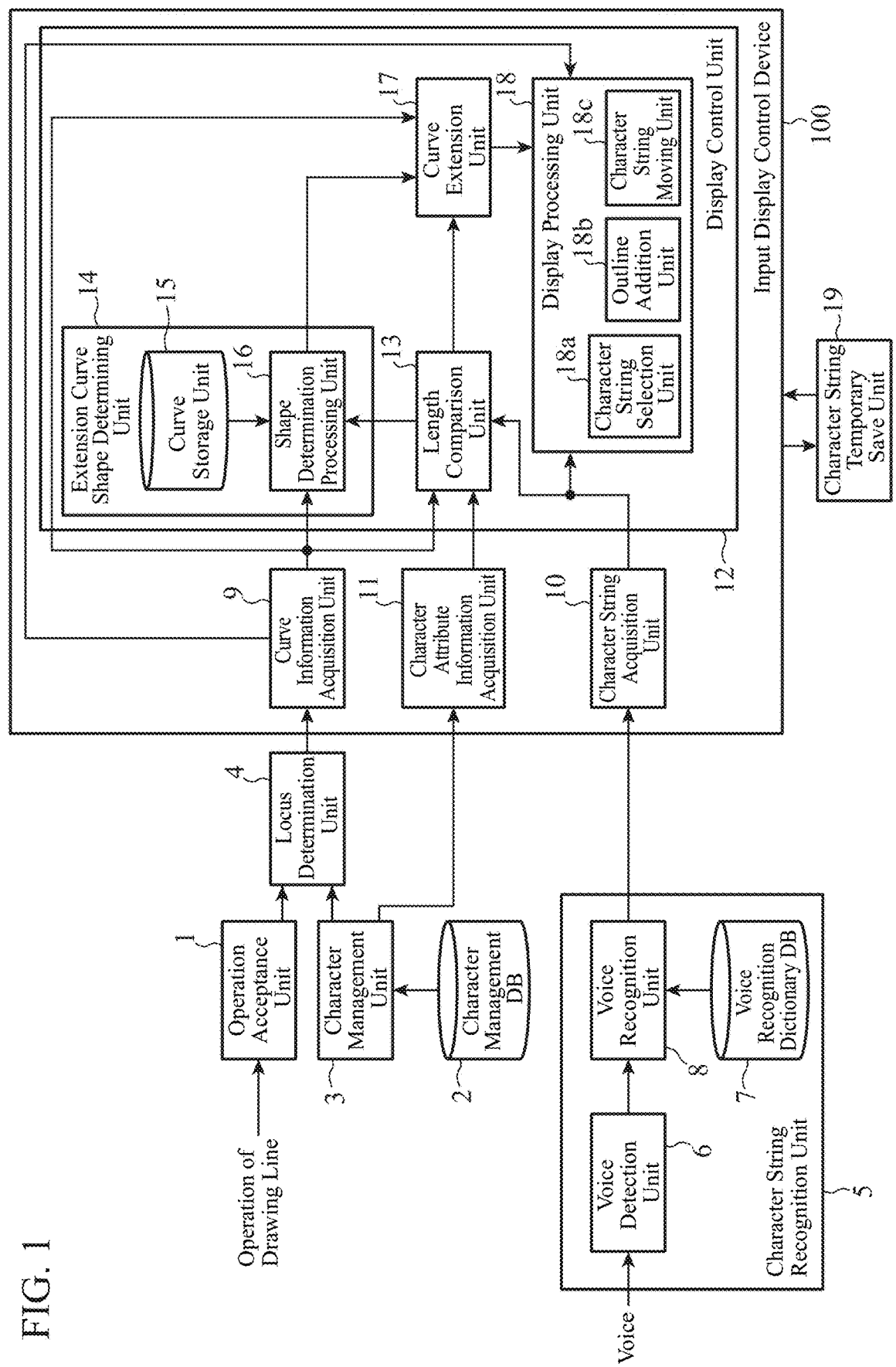
FIG. 1 is a configuration diagram illustrating an input display system including an input display control device according to a first embodiment.
Figure 2:
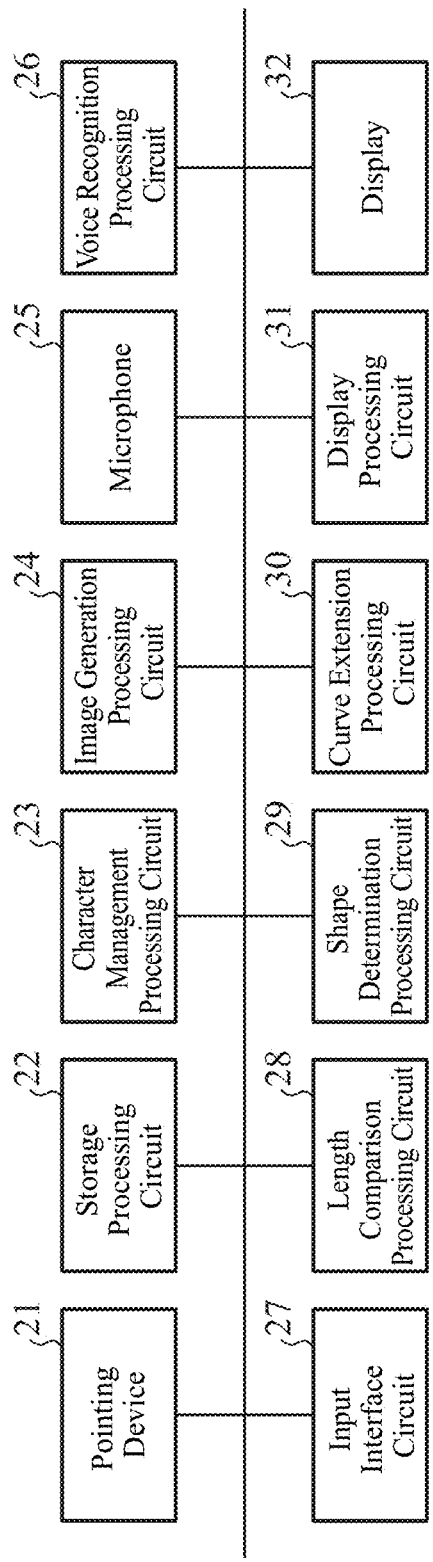
FIG. 2 is a hardware configuration diagram of the input display system according to the first embodiment.

FIG. 1 is a configuration diagram illustrating an input display system including an input display control device according to a first embodiment, and FIG. 2 is a hardware configuration diagram of the input display system according to the first embodiment.

In FIGS. 1 and 2, it is assumed that an input display control device 100 uses a touch panel as a pointing device 21. However, this is only an example, and the input display control device 100 can use a joystick, a pointing stick, a touch pad, a stylus, a data glove, a trackball, a pen tablet, a mouse, a light pen, a joy pad, and the like.

An operation acceptance unit 1 is implemented by, for example, the pointing device 21 illustrated in FIG. 2. The operation acceptance unit 1 accepts operation of drawing a line as user's operation, and outputs a content of the accepted operation to a locus determination unit 4.

A character management database (DB) 2 is implemented by, for example, a storage processing circuit 22 illustrated in FIG. 2. The character management DB 2 stores a character attribute table indicating a correspondence between a character type, a character size, a character height, and a character width.

A character management unit 3 is implemented by, for example, a character management processing circuit 23 illustrated in FIG. 2. In the character management unit 3, a size of a character to be displayed on a display 32 is set in advance. The character management unit 3 refers to the character attribute table stored in the character management DB 2, outputs character attribute information indicating the character height corresponding to the character size to the locus determination unit 4, and outputs character attribute information indicating the character height and the character width corresponding to the character size to the input display control device 100.

The locus determination unit 4 is implemented by, for example, an image generation processing circuit 24 illustrated in FIG. 2. The locus determination unit 4 determines a locus of the line drawn by the operation accepted by the operation acceptance unit 1. The locus determination unit 4 outputs curve information indicating a curve to the input display control device 100 as information indicating the length and shape of the curve representing the locus. The curve includes a line of any shape, such as a straight line or a bent line.

Furthermore, the locus determination unit 4 generates a curve image that is an image of the curve representing the locus, and outputs the curve image to the input display control device 100. The curve image is included in the curve information, and the locus determination unit 4 outputs the curve information including the curve image to the input display control device 100.

A line width of the curve image corresponds to the character height indicated by the character attribute information output from the character management unit 3.

A character string recognition unit 5 includes a voice detection unit 6, a voice recognition dictionary DB 7, and a voice recognition unit 8. The character string recognition unit 5 outputs a character string indicating a voice recognition result to the input display control device 100 as a character string to be displayed.

The voice detection unit 6 is implemented by, for example, a microphone 25 illustrated in FIG. 2. The voice detection unit 6 detects user's voice and outputs the detected voice to the voice recognition unit 8.

The voice recognition dictionary DB 7 is implemented by, for example, the storage processing circuit 22 illustrated in FIG. 2. The voice recognition dictionary DB 7 includes, for example, an acoustic model in which acoustic characteristics are described of phonemes that are small units of human utterance, and a recognition dictionary in which words for voice recognition are described.

The voice recognition unit 8 is implemented by, for example, a voice recognition processing circuit 26 illustrated in FIG. 2. The voice recognition unit 8 is equipped with a voice recognition engine for recognizing the voice detected by the voice detection unit 6.

The voice recognition unit 8 analyzes the voice detected by the voice detection unit 6, calculates acoustic characteristics of the voice, and searches for a word having acoustic characteristics closest to the calculated acoustic characteristics from the words described in the recognition dictionary of the voice recognition dictionary DB 7. The voice recognition unit 8 outputs a character string indicating the word obtained by the search to the input display control device 100 as the character string indicating the voice recognition result.

The character string recognition unit 5 illustrated in FIG. 1 mounts the voice recognition dictionary DB 7 and the voice recognition unit 8. However, this is only an example, and instead of the voice recognition dictionary DB 7 and the voice recognition unit 8, the character string recognition unit 5 may be used in which a data transmission and reception unit is mounted.

The data transmission and reception unit is a network communication device such as a network card capable of transmission and reception of data with a voice recognition server (not illustrated) via a communication path such as the Internet or a local area network (LAN). The data transmission and reception unit transmits data indicating the voice detected by the voice detection unit 6 to the voice recognition server.

The voice recognition server is equipped with a voice recognition engine for recognizing voice, and when receiving the data indicating the voice transmitted from the data transmission and reception unit, recognizes the voice indicated by the received data and transmits the character string indicating the voice recognition result to the data transmission and reception unit.

When the data transmission and reception unit receives the character string indicating the voice recognition result transmitted from the voice recognition server, the data transmission and reception unit outputs the character string to the input display control device 100.

The input display control device 100 includes a curve information acquisition unit 9, a character string acquisition unit 10, a character attribute information acquisition unit 11, and a display control unit 12.

The curve information acquisition unit 9 is implemented by, for example, an input interface circuit 27 illustrated in FIG. 2. The input interface circuit 27 includes, for example, a LAN port or a universal serial bus (USB) port.

The curve information acquisition unit 9 acquires the curve information output from the locus determination unit 4, and outputs the acquired curve information to each of a length comparison unit 13, a shape determination processing unit 16, a curve extension unit 17, and a display processing unit 18.

The character string acquisition unit 10 is implemented by, for example, the input interface circuit 27 illustrated in FIG. 2. The character string acquisition unit 10 acquires the character string output from the voice recognition unit 8, and outputs the acquired character string to each of the length comparison unit 13 and the display processing unit 18.

The character attribute information acquisition unit 11 is implemented by, for example, the input interface circuit 27 illustrated in FIG. 2. The character attribute information acquisition unit 11 acquires the character attribute information output from the character management unit 3, and outputs the acquired character attribute information to the length comparison unit 13.

The display control unit 12 includes the length comparison unit 13, an extension curve shape determining unit 14, the curve extension unit 17, and the display processing unit 18.

The display control unit 12 generates display information for displaying the character string acquired by the character string acquisition unit 10 on the display 32 along the curve indicated by the curve information acquired by the locus determination unit 4, and causes the display 32 to display the character string in accordance with the generated display information. The display information generated by the display control unit 12 is information for displaying the character string acquired by the character string acquisition unit 10 superimposed on the curve image included in the curve information acquired by the curve information acquisition unit 9. The display control unit 12 causes the display 32 to display the character string superimposed on the curve image in accordance with the display information.

Upon determining that it is not possible to display a part of the character string acquired by the character string acquisition unit 10 along the curve since the length of the curve indicated by the curve information acquired by the curve information acquisition unit 9 is short, the display control unit 12 determines the shape of an extension portion of the curve from the shape of the curve, and extends the curve. The display control unit 12 generates display information for displaying a part of the character string along the curve of the extension portion, and causes the display 32 to display the part of the character string along the extension portion of the curve in accordance with the generated display information.

Furthermore, when determining that a part of the character string protrudes out of a display area of the display 32 since the length of the character string acquired by the character string acquisition unit 10 is long, the display control unit 12 disposes the part of the character string in a virtual area that is an area surrounding the display area.

For example, when the user performs swiping on the display 32 toward the right end of the display area of the display 32, if the right end of the curve indicated by the curve information is on the left end side from the right end of the display area of the display 32, the display control unit 12 can extend the curve toward the right end of the display area.

However, when the length of the curve is shorter than the length of the entire character string even if the curve is extended to the right end of the display area, a part of the character string may protrude out of the display area of the display 32. In this case, the right end of the curve indicated by the curve information is further extended to the virtual area, and the character string is disposed along the extended curve.

Moreover, the display control unit 12 displays the character string superimposed on the curve image, and then generates display information for erasing display of the curve image, and erases the curve image in accordance with the generated display information.

The length comparison unit 13 is implemented by, for example, a length comparison processing circuit 28 illustrated in FIG. 2. The length comparison unit 13 compares the length of the curve indicated by the curve information acquired by the curve information acquisition unit 9 with the length of the character string acquired by the character string acquisition unit 10, and outputs a comparison result between the length of the curve and the length of the character string to each of the shape determination processing unit 16 and the curve extension unit 17.

The extension curve shape determining unit 14 is implemented by, for example, a shape determination processing circuit 29 illustrated in FIG. 2, and includes a curve storage unit 15 and the shape determination processing unit 16. If the comparison result by the length comparison unit 13 indicates that the length of the curve is shorter than the length of the character string, the extension curve shape determining unit 14 determines the shape of the extension curve that is the curve of the extension portion from the shape of the curve indicated by the curve information acquired by the curve information acquisition unit 9.

The curve storage unit 15 stores a plurality of curves having different shapes in advance.

The shape determination processing unit 16 collates the shapes of the plurality of curves stored in the curve storage unit 15 with the shape of the curve indicated by the curve information acquired by the curve information acquisition unit 9, and selects the shape of the curve corresponding to the curve indicated by the curve information acquired by the curve information acquisition unit 9 from the shapes of the plurality of curves stored in the curve storage unit 15. The shape determination processing unit 16 determines the shape of the extension curve from the shape of the curve selected, and outputs the determined extension curve to the curve extension unit 17.

The curve extension unit 17 is implemented by, for example, a curve extension processing circuit 30 illustrated in FIG. 2. If the comparison result by the length comparison unit 13 indicates that the length of the curve is shorter than the length of the character string, the curve extension unit 17 adds the extension curve whose shape is determined by the extension curve shape determining unit 14 to the terminal end of the curve indicated by the curve information acquired by the curve information acquisition unit 9.

The display processing unit 18 is implemented by, for example, a display processing circuit 31 illustrated in FIG. 2. The display processing unit 18 includes a character string selection unit 18a, an outline addition unit 18b, and a character string moving unit 18c.

The display processing unit 18 generates display information for displaying the character string acquired by the character string acquisition unit 10 on the display 32 along the curve indicated by the curve information acquired by the curve information acquisition unit 9, and causes the display 32 to display the character string in accordance with the generated display information. The display information generated by the display processing unit 18 is information for displaying the character string acquired by the character string acquisition unit 10 superimposed on the curve image included in the curve information acquired by the curve information acquisition unit 9. The display processing unit 18 causes the display 32 to display the character string superimposed on the curve image in accordance with the display information.

Furthermore, if the comparison result by the length comparison unit 13 indicates that the length of the curve is shorter than the length of the character string, the display processing unit 18 generates display information for displaying, on the display 32, a part of the character string that cannot be displayed superimposed on the curve image along the extension curve added by the curve extension unit 17. The display processing unit 18 causes the display 32 to display the part of the character string in accordance with the generated display information.

Moreover, after causing the display 32 to display the character string, the display processing unit 18 generates display information for erasing the display of the curve image, and causes the display 32 to erase the curve image in accordance with the generated display information.

The character string selection unit 18a is implemented by, for example, the pointing device 21 illustrated in FIG. 2. The character string selection unit 18a accepts selection of a character string a part of which is disposed in the virtual area. If a user's contact time with respect to a character displayed in the display area of the display 32 among characters included in the character string a part of which is disposed in the virtual area is longer than a threshold value, for example, the character string selection unit 18a accepts the selection of the character string. The threshold value may be a value stored in an internal memory of the character string selection unit 18a, or may be a value externally given.

The outline addition unit 18b is implemented by, for example, the image generation processing circuit 24 illustrated in FIG. 2. The outline addition unit 18b adds, to the contour of a character included in the character string of which selection is accepted by the character string selection unit 18a, an outline of a color different from the character.

The character string moving unit 18c is implemented by, for example, the pointing device 21 illustrated in FIG. 2. The character string moving unit 18c accepts movement of the character string of which selection is accepted by the character string selection unit 18a.

When the character string moving unit 18c accepts movement for disposing the entire character string of which selection is accepted by the character string selection unit 18a in the display area of the display 32, the display processing unit 18 generates display information for display the entire character string in the display area of the display 32.

Furthermore, when the character string moving unit 18c accepts movement for moving the entire character string of which selection is accepted by the character string selection unit 18a outside the display area of the display 32, the display processing unit 18 discards the character string acquired by the character string acquisition unit 10.

A character string temporary save unit 19 is implemented by, for example, the storage processing circuit 22 illustrated in FIG. 2. The character string temporary save unit 19 temporarily saves the character string acquired by the character string acquisition unit 10.

In FIG. 1, each of the operation acceptance unit 1, the character management DB 2, the character management unit 3, the locus determination unit 4, the character string recognition unit 5, the curve information acquisition unit 9, the character string acquisition unit 10, the character attribute information acquisition unit 11, the length comparison unit 13, the extension curve shape determining unit 14, the curve extension unit 17, the display processing unit 18, and the character string temporary save unit 19 that are components of the input display system, is implemented by dedicated hardware as illustrated in FIG. 2. That is, the input display system is assumed to be one implemented by the pointing device 21, the storage processing circuit 22, the character management processing circuit 23, the image generation processing circuit 24, the microphone 25, the voice recognition processing circuit 26, the input interface circuit 27, the length comparison processing circuit 28, the shape determination processing circuit 29, the curve extension processing circuit 30, the display processing circuit 31, and the display 32.

Here, examples of the storage processing circuit 22 include a nonvolatile or volatile semiconductor memory such as random access memory (RAM), read only memory (ROM), flash memory, erasable programmable read only memory (EPROM), and electrically erasable programmable read only memory (EEPROM); a magnetic disk, a flexible disk, an optical disk, a compact disk, a mini disk, a digital versatile disc (DVD), and the like.

Furthermore, examples of the character management processing circuit 23, the image generation processing circuit 24, the voice recognition processing circuit 26, the length comparison processing circuit 28, the shape determination processing circuit 29, the curve extension processing circuit 30, and the display processing circuit 31 include a single circuit, a composite circuit, a programmed processor, a parallel-programmed processor, an application specific integrated circuit (ASIC), a field-programmable gate array (FPGA), or a combination thereof.

Furthermore, the input display system is not limited to one in which the components each are implemented by dedicated hardware, and the input display system may be one implemented by software, firmware, or a combination of software and firmware.

Software or firmware is stored as a program in a memory of a computer. The computer means hardware for executing a program, and examples of the computer include a central processing unit (CPU), a central processing device, a processing device, an arithmetic device, a microprocessor, a microcomputer, a processor, a digital signal processor (DSP), and the like.

Figure 3:
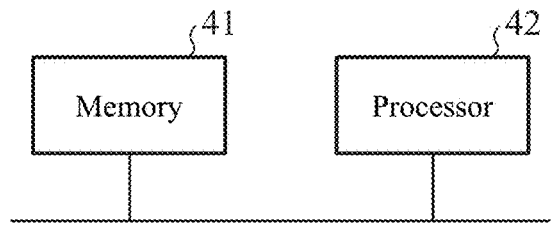

FIG. 3 is a hardware configuration diagram of the computer when the input display system is implemented by software, firmware, or the like.

When the input display system is implemented by software, firmware, or the like, the character management DB 2, the voice recognition dictionary DB 7, and the character string temporary save unit 19 are configured on a memory 41 of the computer. Furthermore, a program is stored in the memory 41 for causing the computer to execute processing procedures for the character management unit 3, the locus determination unit 4, the voice recognition unit 8, the curve information acquisition unit 9, the character string acquisition unit 10, the character attribute information acquisition unit 11, the length comparison unit 13, the extension curve shape determining unit 14, the curve extension unit 17, and the display processing unit 18. Then, it is sufficient that a processor 42 executes the program stored in the memory 41.

Figure 4:
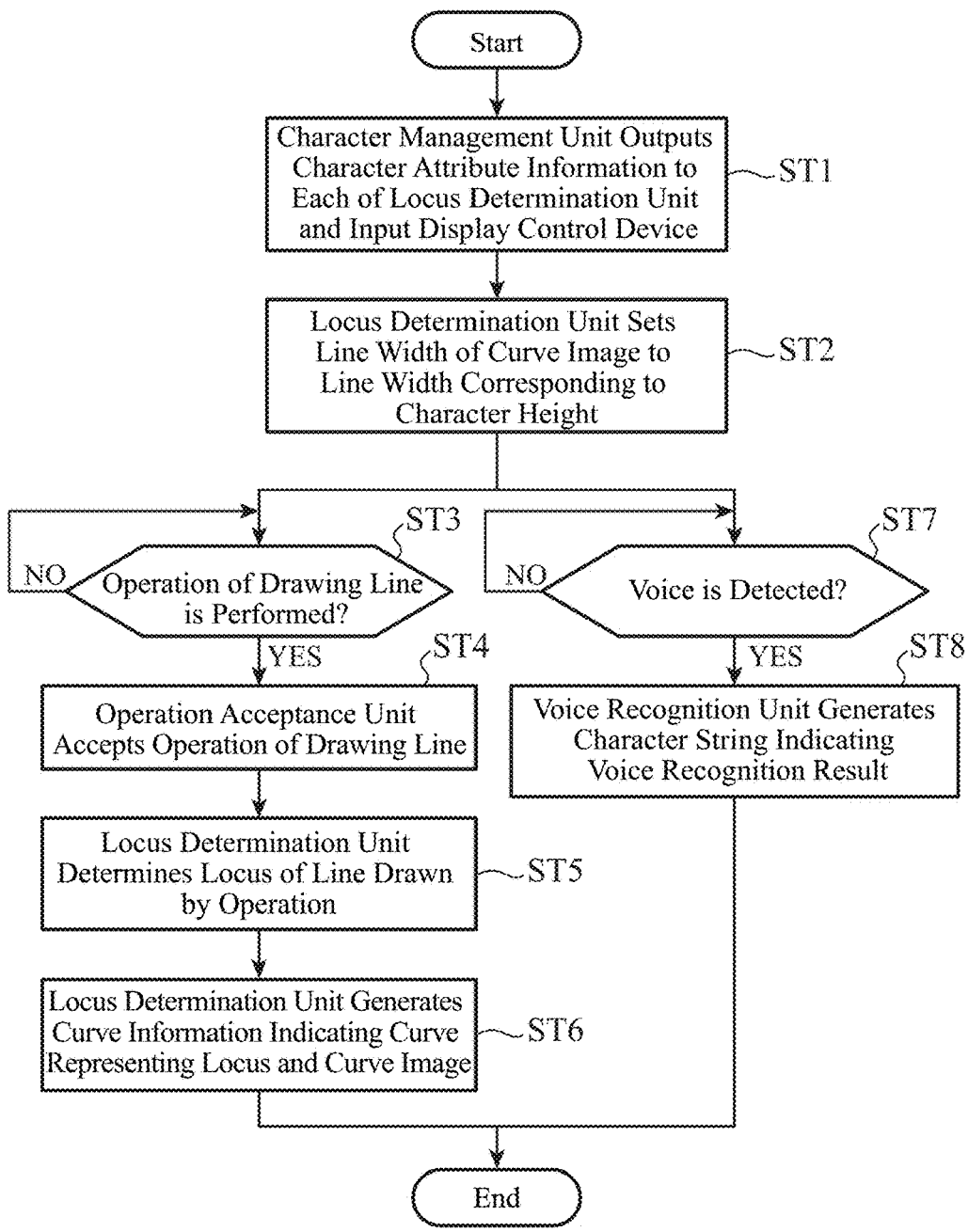
FIG. 4 is a flowchart (part 1) illustrating an input display control method that is a processing content of the input display system according to the first embodiment.
Figure 5:
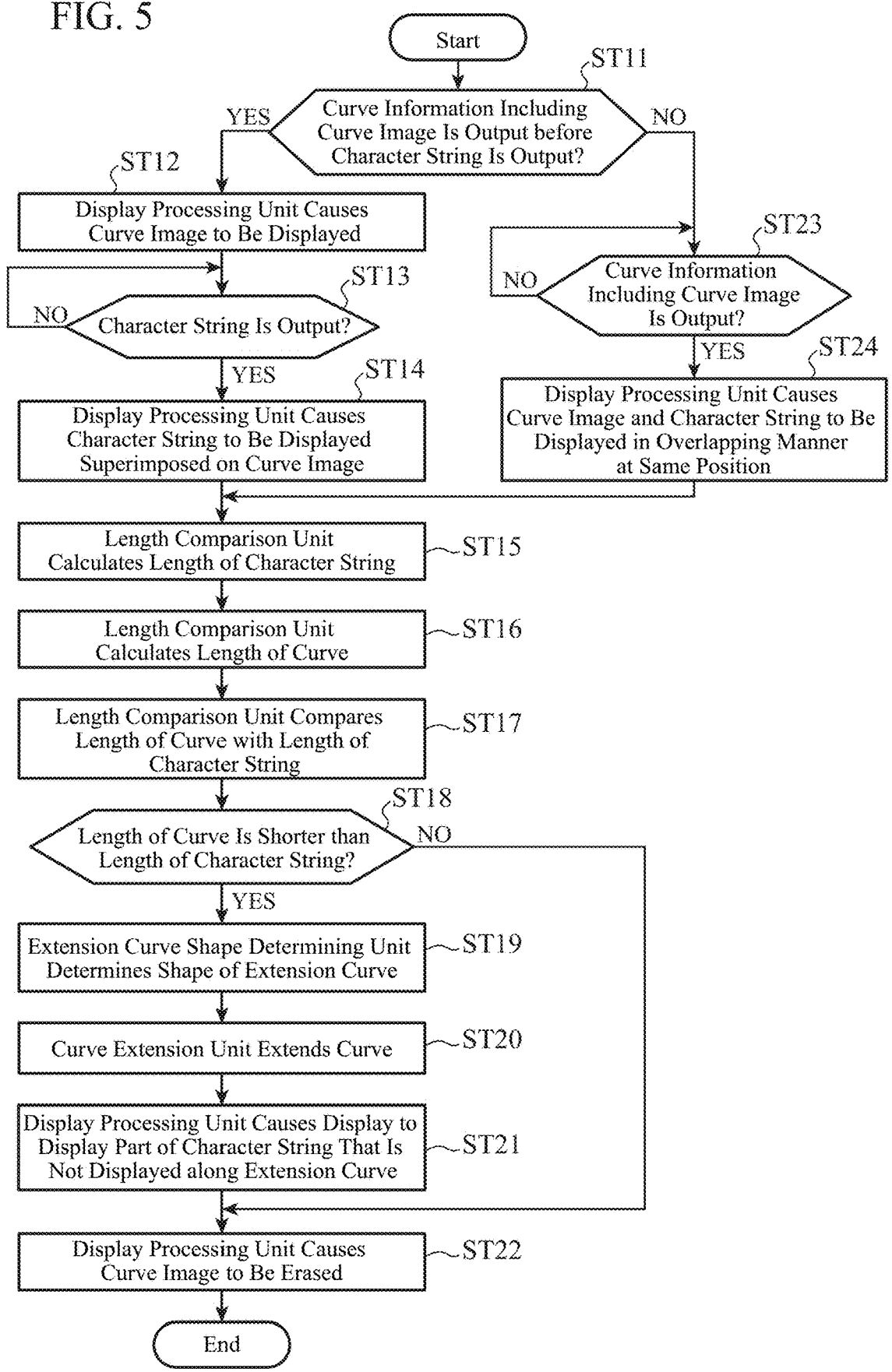
FIG. 5 is a flowchart (part 2) illustrating the input display control method that is the processing content of the input display system according to the first embodiment.

FIG. 4 is a flowchart (part 1) illustrating an input display control method that is a processing content of the input display system according to the first embodiment. FIG. 5 is a flowchart (part 2) illustrating the input display control method that is the processing content of the input display system according to the first embodiment.

Furthermore, FIG. 2 illustrates an example in which each of the components of the input display system is implemented by dedicated hardware, and FIG. 3 illustrates an example in which the input display system is implemented by software, firmware, or the like. However, this is only an example, and some components in the input display system may be implemented by dedicated hardware, and the remaining components may be implemented by software, firmware, or the like.

For example, it is possible to implement the operation acceptance unit 1 and the character string recognition unit 5 by dedicated hardware, and implement the character management DB 2, the character management unit 3, the locus determination unit 4, the input display control device 100, and the character string temporary save unit 19 by software, firmware, or the like. However, the combination of dedicated hardware and software is arbitrary.

Next, the operation of the input display system illustrated in FIG. 1 will be described.

FIG. 6 is an explanatory diagram illustrating the character attribute table stored in the character management DB 2.

In the character attribute table of FIG. 6, for example, the character height and character width corresponding to the character size are described for each character type. As the character type, Mincho typeface, Gothic typeface, and the like are conceivable.

The character type and character size of the character to be displayed on the display 32 are set in advance in the character management unit 3, and the character management unit 3 refers to the character attribute table stored in the character management DB 2 and outputs character attribute information indicating the character height corresponding to the character type and the character size to the locus determination unit 4. Furthermore, the character management unit 3 refers to the character attribute table stored in the character management DB 2 and outputs character attribute information indicating the character height and character width corresponding to the character type and character size to the character attribute information acquisition unit 11 of the input display control device 100 (step ST1 in FIG. 4).

For example, if the character type of the character set in advance is "A" and the character size is "10", character attribute information indicating that the character height is "5 mm" is output from the character management unit 3 to the locus determination unit 4. Furthermore, character attribute information indicating that the character height is "5 mm" and the character width is "5 mm" is output from the character management unit 3 to the input display control device 100.

Furthermore, if the character type of the character set in advance is "B" and the character size is "5", character attribute information indicating that the character height is "2 mm" is output from the character management unit 3 to the locus determination unit 4. Furthermore, character attribute information indicating that the character height is "2 mm" and the character width is "1.25 mm" is output from the character management unit 3 to the input display control device 100.

Upon receiving the character attribute information from the character management unit 3, the locus determination unit 4 sets the line width of a curve image to be generated to the line width corresponding to the character height indicated by the character attribute information (step ST2 in FIG. 4).

For example, when the character height indicated by the character attribute information is "10 mm", if the upper and lower margins of the character are set to "0.5 mm", the locus determination unit 4 calculates 10+0.5+0.5=11 (mm), and sets the line width of the curve image to "11 mm".

Here, the locus determination unit 4 provides margins at the upper and lower parts of the character, but the margins do not have to be provided, and the character height indicated by the character attribute information and the line width of the curve image may match.

In the input display control device illustrated in FIG. 1, it is assumed that the pointing device 21 implementing the operation acceptance unit 1 is a touch panel. Thus, when the user performs operation of drawing a line on the touch panel by using one's finger or an input pen for the touch panel (in the case of step ST3: YES in FIG. 4), the operation acceptance unit 1 accepts the operation of drawing the line (step ST4 in FIG. 4). The operation acceptance unit 1 outputs a content of the accepted operation to the locus determination unit 4.

The content of the operation of drawing the line to be output is, for example, time-series data indicating a continuous change of coordinates of a position of the finger or coordinates of a position of the input pen in contact with the touch panel. Note that, the coordinates of the position are the position coordinates on the touch panel.

Upon receiving the content of the operation of drawing the line from the operation acceptance unit 1, the locus determination unit 4 determines the locus of the line drawn by the operation from the operation content (step ST5 in FIG. 4).

As described above, the content of the operation of drawing the line indicates the continuous change of the contact position with respect to the touch panel, so that it is possible to determine the locus of the drawn line by connecting the contact positions in the time series together.

Upon determining the locus of the drawn line, the locus determination unit 4 generates, as information indicating the length and shape of a curve representing the locus, curve information indicating the curve (step ST6 in FIG. 4).

The line width of the curve image is the line width set in step ST2 of FIG. 4, and in the above example, the line width of the curve image is set to "11 mm", so that the locus determination unit 4 generate a curve image having a line width of "11 mm" (step ST6 in FIG. 4).

The locus determination unit 4 outputs the curve information including the curve image to the curve information acquisition unit 9 of the input display control device 100.

When the voice detection unit 6 detects the user's voice (in the case of step ST7: YES in FIG. 4), the voice recognition unit 8 of the character string recognition unit 5 performs voice recognition processing using the voice recognition dictionary DB 7, thereby generating a character string indicating a voice recognition result (step ST8 in FIG. 4). The voice recognition unit 8 outputs the generated character string to the character string acquisition unit 10 of the input display control device 100.

Since the voice recognition processing itself by the voice recognition unit 8 is a known technique, detailed description thereof will be omitted, but for example, the following voice recognition method is conceivable.

[Voice Recognition Method]

The voice detected by the voice detection unit 6 is analyzed, acoustic characteristics of the voice are calculated, and search is performed for a word having acoustic characteristics closest to the calculated acoustic characteristics from the words described in the recognition dictionary of the voice recognition dictionary DB 7. Then, a character string indicating the word obtained by the search is output as a character string indicating a voice recognition result.

In the input display control device illustrated in FIG. 1, for convenience of explanation, it is assumed that the user utters "Let's go see the cherry blossoms when spring comes", and the voice recognition unit 8 outputs a character string indicating "Let's go see the cherry blossoms when spring comes".

When the curve information including the curve image is output from the locus determination unit 4, the input display control device 100 causes the display 32 to display the curve image and display the character string output from the character string recognition unit 5 superimposed on the curve image.

Hereinafter, a processing content of the input display control device 100 will be specifically described.

Figure 7:
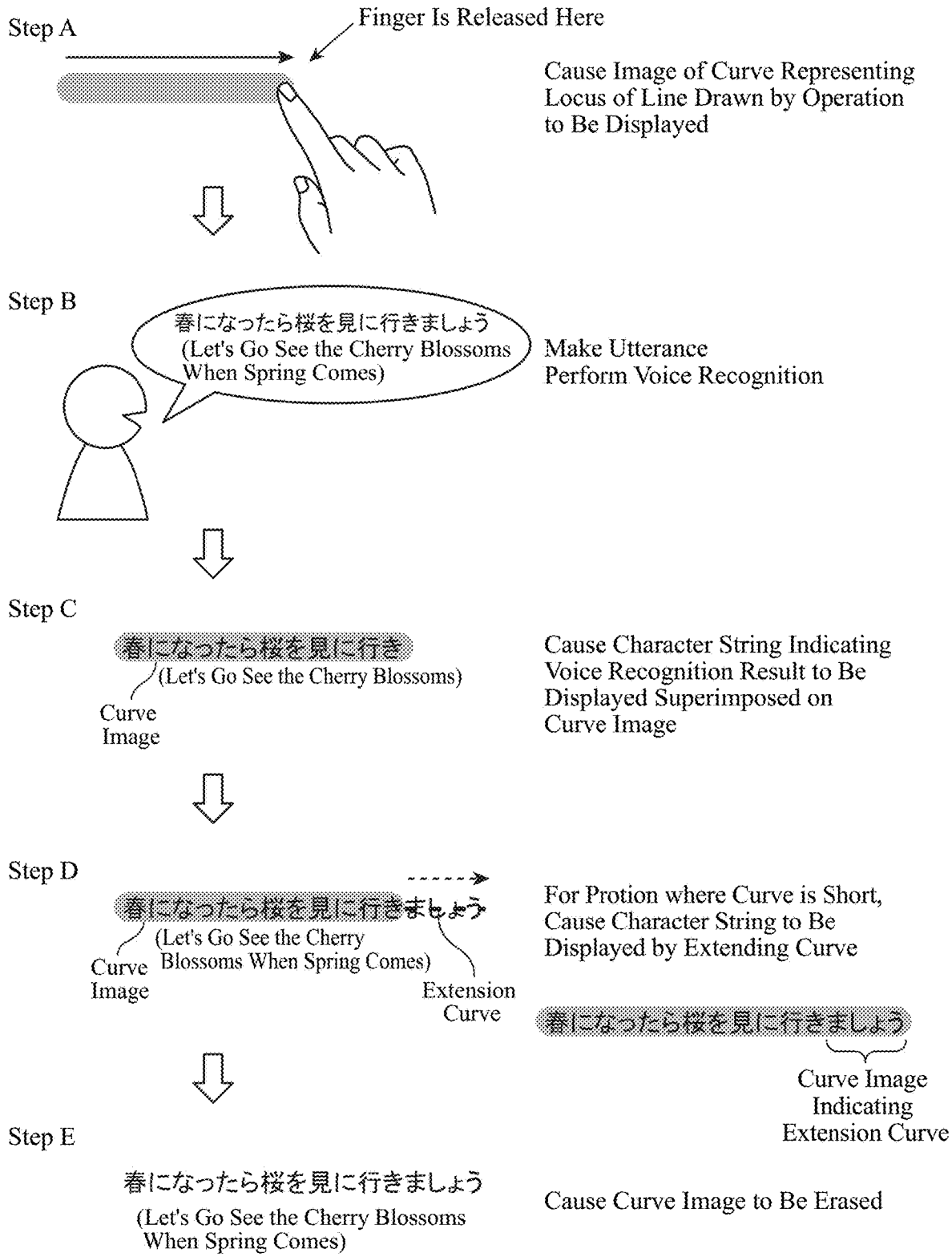
FIG. 7 is an explanatory diagram illustrating display processing when a curve image is output before a character string indicating a voice recognition result is output.

FIG. 7 is an explanatory diagram illustrating display processing when a curve image is output before a character string indicating a voice recognition result is output.

FIG. 8 is an explanatory diagram illustrating display processing when a character string indicating a voice recognition result is output before a curve image is output.

Figure 9A:
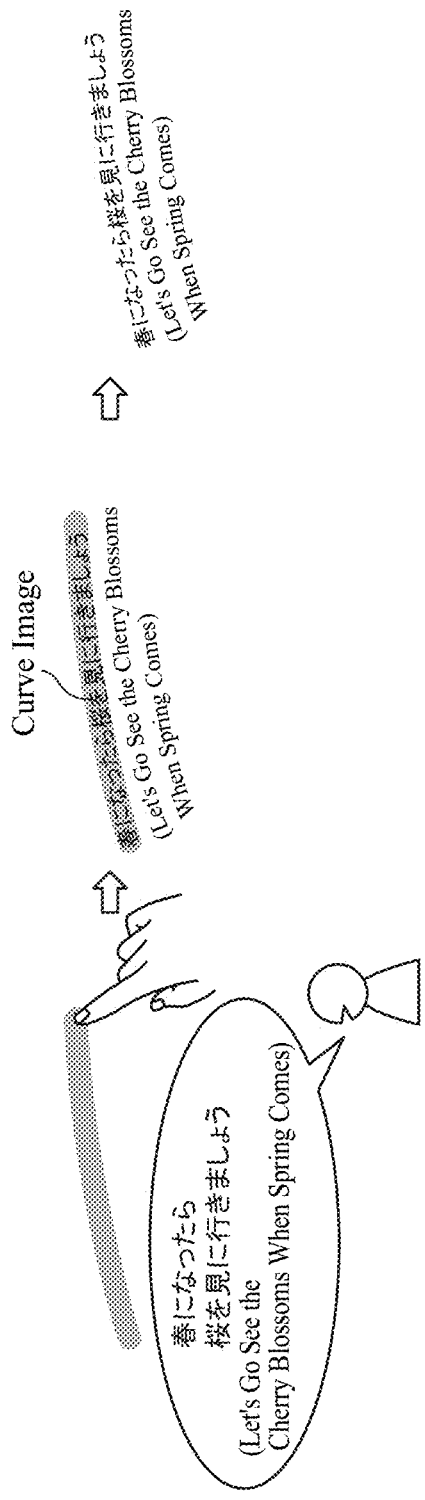
FIG. 9A is an explanatory diagram illustrating that if the length of the curve is longer than the length of the character string, all the characters included in the character string can be displayed superimposed on the curve image.
Figure 9B:
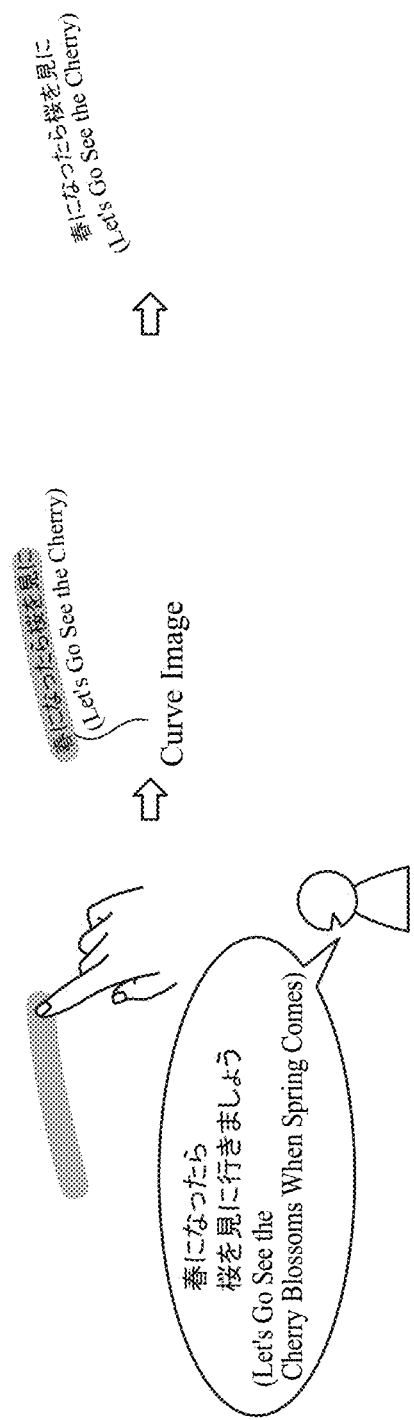
FIG. 9B is an explanatory diagram illustrating that if the length of the curve is shorter than the length of the character string, some characters included in the character string cannot be displayed superimposed on the curve image.

FIGS. 9A and 9B are an explanatory diagram illustrating the character string to be displayed superimposed on the curve image. FIG. 9A illustrates that if the length of the curve is longer than the length of the character string, all the characters included in the character string can be displayed superimposed on the curve image. FIG. 9B illustrates that if the length of the curve is shorter than the length of the character string, some characters included in the character string cannot be displayed superimposed on the curve image.

Figure 10A:
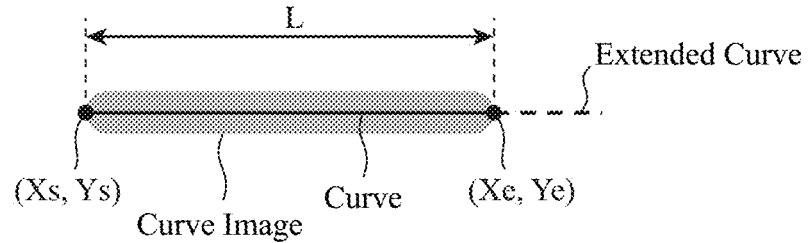
FIG. 10A is an explanatory diagram illustrating position coordinates of the start end and the terminal end of a curve used for calculation of a length L of the curve when the shape of the curve is a straight line.
Figure 10B:
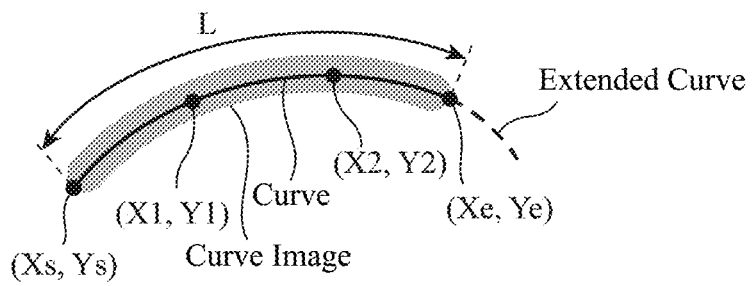
FIG. 10B is an explanatory diagram illustrating position coordinates of the start end, the terminal end, and an intermediate point of a curve used for the calculation of the length L of the curve when the shape of the curve is curved.

FIGS. 10A and 10B are an explanatory diagram illustrating a processing content of the length comparison unit 13 of the display control unit 12. FIG. 10A illustrates position coordinates of a start end and the terminal end of a curve used for calculation of a length L of the curve when the shape of the curve is a straight line. FIG. 10B illustrates position coordinates of the start end, the terminal end, and an intermediate point of a curve used for the calculation of the length L of the curve when the shape of the curve is curved.

Figure 11:
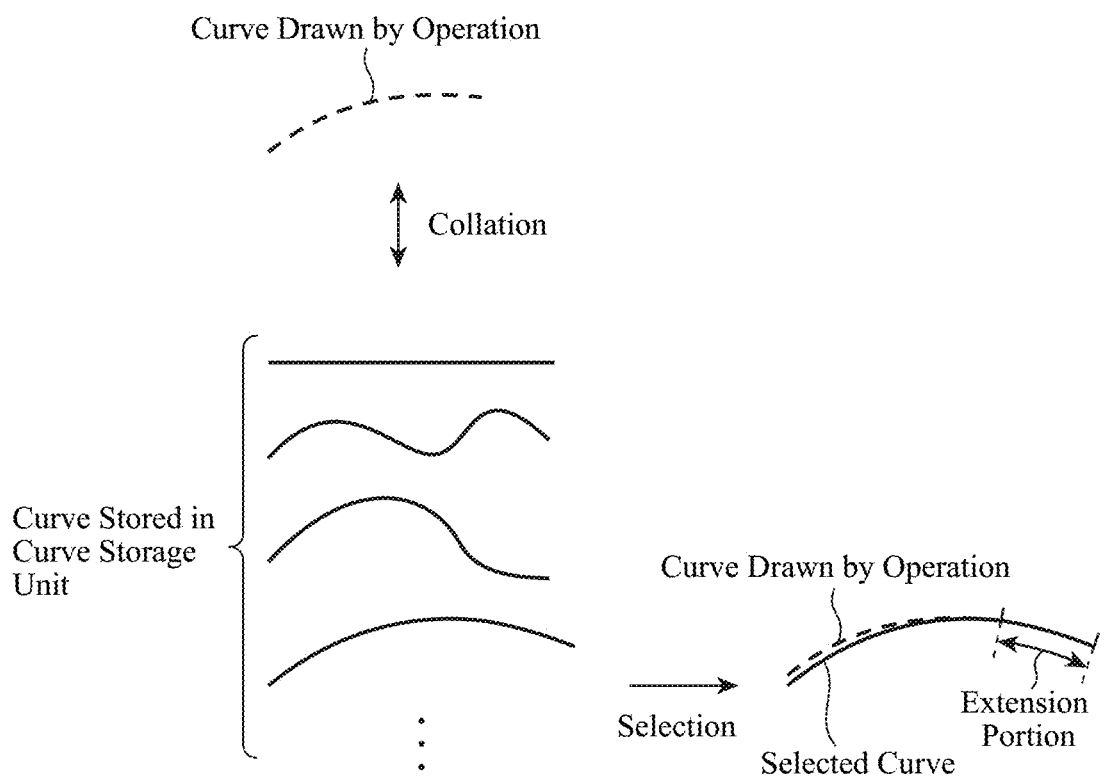
FIG. 11 is an explanatory diagram illustrating a processing content of an extension curve shape determining unit 14 of a display control unit 12.

FIG. 11 is an explanatory diagram illustrating a processing content of the extension curve shape determining unit 14 of the display control unit 12.

Figure 12B:
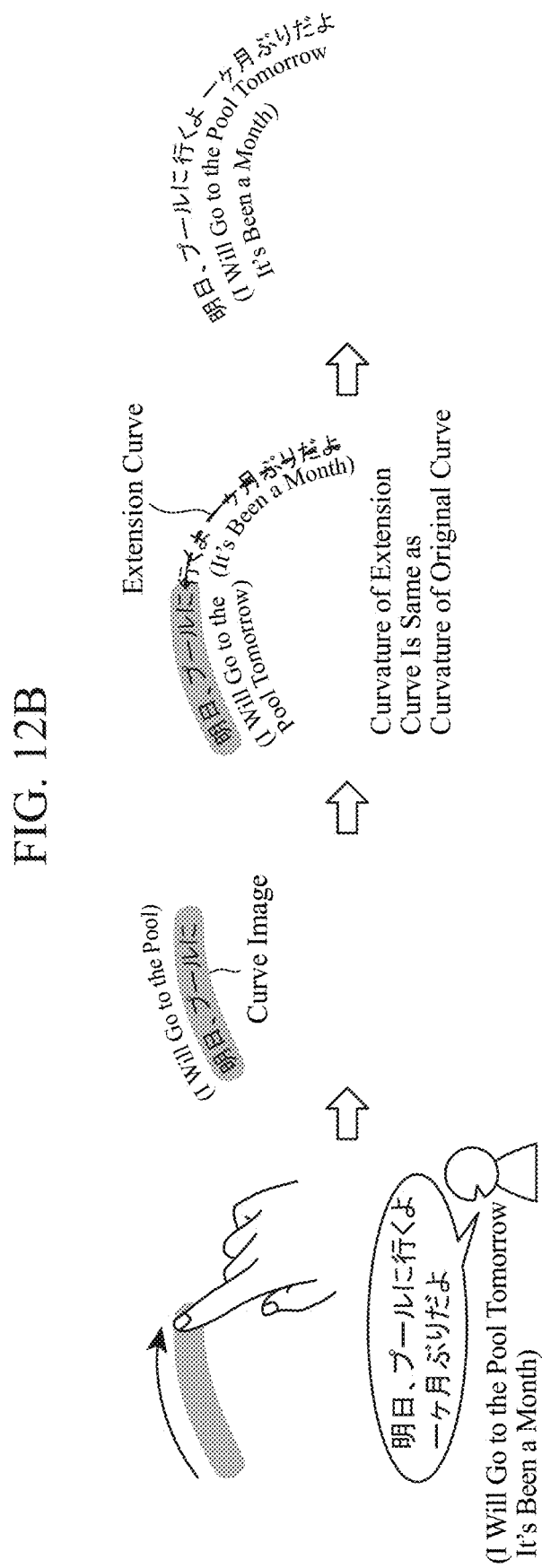
FIG. 12B is an explanatory diagram illustrating an example in which the shape of the extension curve has the same curvature as that of the shape of an original curve.

FIG. 12A is an explanatory diagram illustrating an example in which the shape of an extension curve is the shape of the tangent at the terminal end of an original curve, and FIG. 12B is an explanatory diagram illustrating an example in which the shape of the extension curve has the same curvature as that of the shape of an original curve.

Figure 12C:
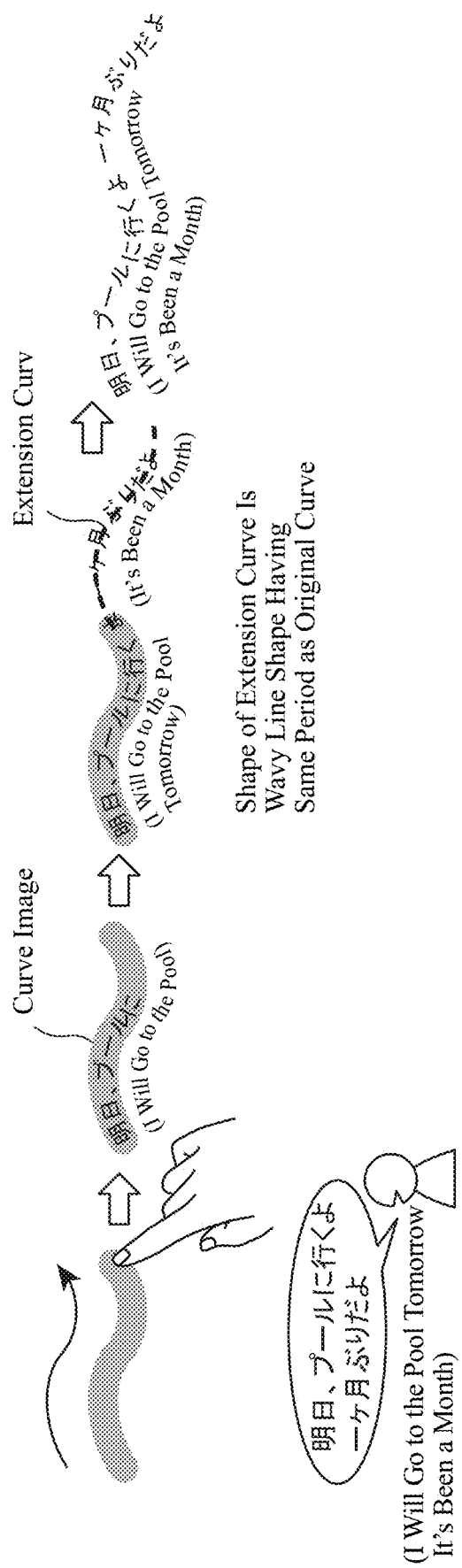
FIG. 12C is an explanatory diagram illustrating an example in which the shape of the extension curve is a wavy line shape having the same period as that of the shape of an original curve.
Figure 12D:
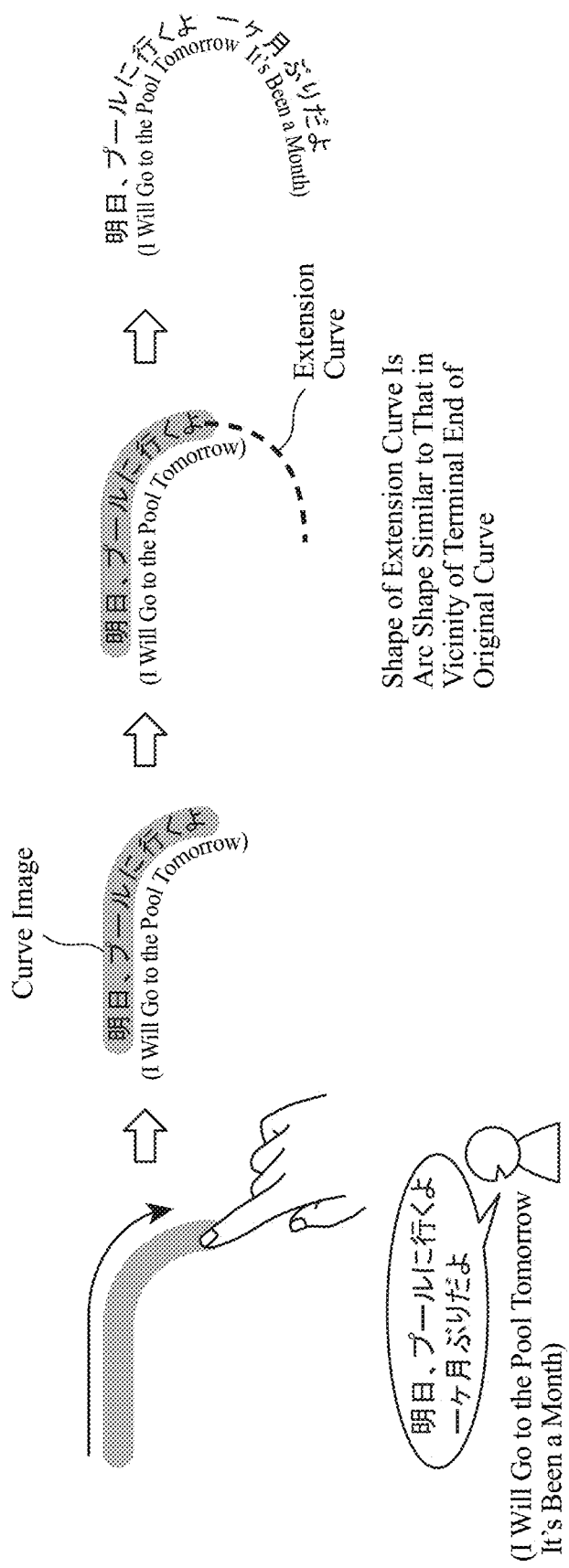
FIG. 12D is an explanatory diagram illustrating an example in which the shape of the extension curve is an arc shape.

FIG. 12C is an explanatory diagram illustrating an example in which the shape of the extension curve is a wavy line shape having the same period as that of the shape of an original curve, and FIG. 12D is an explanatory diagram illustrating an example in which the shape of the extension curve is an arc shape.

Figure 13:
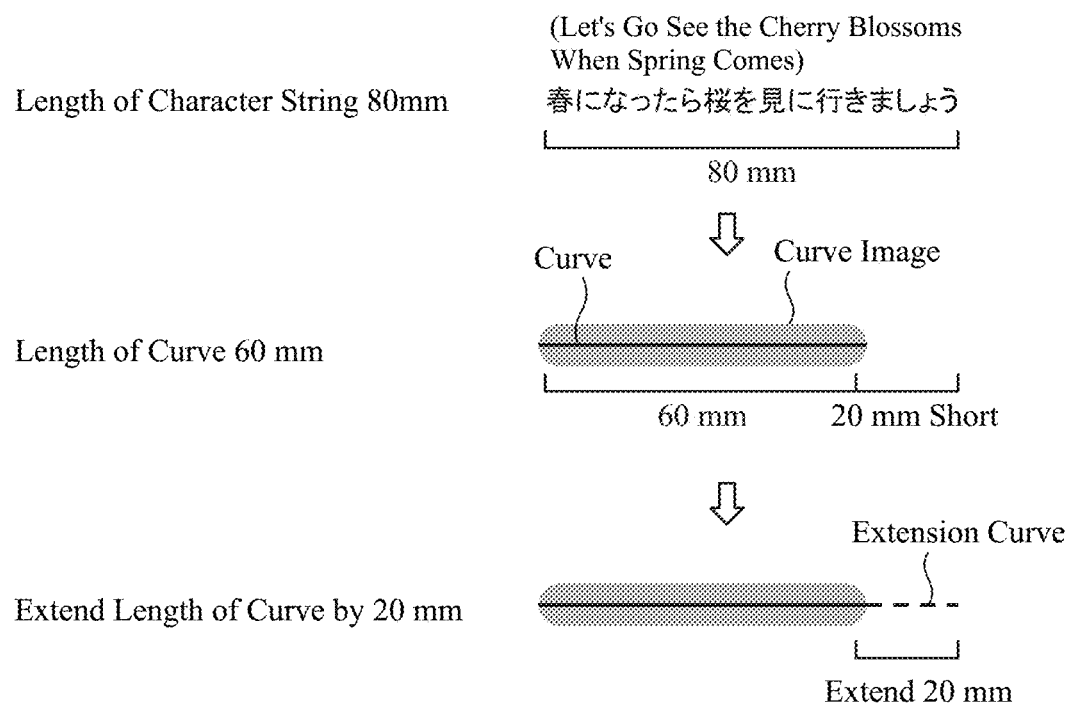
FIG. 13 is an explanatory diagram illustrating a processing content of a curve extension unit 17 of the display control unit 12.

FIG. 13 is an explanatory diagram illustrating a processing content of the curve extension unit 17 of the display control unit 12.

When the curve information acquisition unit 9 acquires the curve information due to that the curve information including the curve image is output from the locus determination unit 4 before the character string is output from the voice recognition unit 8 of the character string recognition unit 5 (in the case of step ST11: YES in FIG. 5), the display processing unit 18 of the display control unit 12 generates display information for displaying the curve image. The display processing unit 18 causes the display 32 to display the curve image in accordance with the generated display information, as illustrated in step A of FIG. 7 (step ST12 of FIG. 5).

In the first embodiment, for convenience of explanation, it is assumed that the length of the curve is shorter than the length of the character string indicating the voice recognition result since the length of the line drawn by the user's operation is short.

Note that, when the display processing unit 18 causes the curve image to be displayed, the entire curve image may be displayed at the same time, but the curve image may be displayed by an animation in which the character string to be displayed later is sequentially displayed from the beginning side.

For example, as illustrated in step B of FIG. 7, when the user makes an utterance of "Let's go see the cherry blossoms when spring comes" and thus the display processing unit 18 receives the character string indicating "Let's go see the cherry blossoms when spring comes" from the voice recognition unit 8 (step ST13: YES in FIG. 5), the display processing unit 18 generates display information for displaying the character string superimposed on the curve image. The display processing unit 18 causes the character string to be displayed superimposed on the curve image in accordance with the generated display information, as illustrated in step C of FIG. 7 (step ST14 of FIG. 5).

However, in the example of FIG. 7, the length of the curve is shorter than the length of the character string indicating the voice recognition result, so of the character string, "Let's go see the cherry blossoms" is displayed superimposed on the curve image, but "when spring comes" is not displayed superimposed on the curve image.

The character string acquisition unit 10 acquires the character string indicating "Let's go see the cherry blossoms when spring comes" output from the voice recognition unit 8, and outputs the acquired character string to the length comparison unit 13.

The character attribute information acquisition unit 11 acquires the character attribute information output from the character management unit 3 and outputs the character attribute information to the length comparison unit 13.

Upon receiving the character string indicating "Let's go see the cherry blossoms when spring comes" output from the character string acquisition unit 10, the length comparison unit 13 refers to the character width indicated by the character attribute information output from the character attribute information acquisition unit 11, and calculates the length of the character string (step ST15 in FIG. 5).

Here, the character string output from the voice recognition unit 8 is "Let's go see the cherry blossoms when spring comes", and the number of characters in the character string is 16. Thus, if the character width indicated by the character attribute information output from the character management unit 3 is, for example, "5 mm", the length of the character string is 80 mm as indicated in the following equation (1).

$$\text{Length of character string} = 5 \text{ mm} \times 16 = 80 \text{ mm} \qquad (1)$$

Next, the length comparison unit 13 calculates the length of the curve indicated by the curve information acquired by the curve information acquisition unit 9 (step ST16 in FIG. 5).

If the shape of the curve is a straight line as illustrated in FIG. 10A, the length L of the curve can be calculated from position coordinates (Xs, Ys) of the start end and position coordinates (Xe, Ye) of the terminal end of the curve as indicated in the following equation (2). In the case of the curve image displayed in step A of FIG. 7, the left end of the curve is the start end of the curve, and the right end of the curve is the terminal end of the curve. These position coordinates have the same unit as the unit for expressing the character width and the like. Here, mm is the unit.

$$L=\sqrt{(Xe-Xs)^2+(Ye-Ys)^2} \qquad (2)$$

The equation (2) indicates a calculation equation for the length L of the curve when the shape of the curve is a straight line. However, this is only an example, and for example, if the shape of the curve is a curve as illustrated in FIG. 10B, it is possible to calculate the length L of the curve by approximating the shape of the curve with straight lines by using the position coordinates (Xs, Ys) of the start end and the position coordinates (Xe, Ye) of the terminal end of the curve, and position coordinates (Xn, Yn) (n=1, ..., N: N is an integer of greater than or equal to 1) of multiple intermediate points from the start end to the terminal end of the curve.

For example, when N=2, the length L of the curve can be calculated from the position coordinates (Xs, Ys) of the start end, the position coordinates (X1, Y1) of the intermediate point, the position coordinates (X2, Y2) of the intermediate point, and the position coordinates (Xe, Ye) of the terminal end of the curve, as indicated in the following equation (3).

$$L = \sqrt{(X1-Xs)^2+(Y1-Ys)^2} + \sqrt{(X2-X1)^2+(Y2-Y1)^2} + \sqrt{(Xe-X2)^2+(Ye-Y2)^2} \qquad (3)$$

In the equation (3), Xs<X1<X2<Xe, and Ys<Y1<Y2<Ye.

Although FIG. 10B illustrates an example of N=2, it goes without saying that N may be set to greater than or equal to 3, and the position coordinates (Xn, Yn) of many intermediate points may be used to improve the approximation accuracy.

Upon calculating the length of the curve, the length comparison unit 13 compares the length of the curve with the length of the character string (step ST17 in FIG. 5). The length comparison unit 13 outputs the comparison result between the length of the curve and the length of the character string to each of the shape determination processing unit 16 and the curve extension unit 17.

If the comparison result by the length comparison unit 13 indicates that the length of the curve is shorter than the length of the character string (in the case of step ST18: YES in FIG. 5), the extension curve shape determining unit 14 determines the shape of the extension curve that is the curve of the extension portion, from the shape of the curve indicated by the curve information acquired by the curve information acquisition unit 9 (step ST19 in FIG. 5).

Hereinafter, processing will be specifically described of determining the shape of the extension curve by the extension curve shape determining unit 14.

The shape determination processing unit 16 collates the shapes of the plurality of curves stored in the curve storage unit 15 with the shape of the curve indicated by the curve information acquired by the curve information acquisition unit 9.

By collating the shapes of the curves with each other, the shape determination processing unit 16 identifies a shape of a curve having the highest degree of match with the shape of the curve indicated by the curve information among the shapes of the plurality of curves stored in the curve storage unit 15, and selects the shape of the curve having the highest degree of match. Since the processing itself of collating the shapes of the curves with each other and identifying the shape of the curve having the highest degree of match is a known technique, detailed description thereof will be omitted.

Upon selecting the shape of the curve as illustrated in FIG. 11 from the shapes of the plurality of curves stored in the curve storage unit 15, the shape determination processing unit 16 determines the shape of the extension curve from the shape of the curve selected.

For example, if the lengths of the plurality of curves stored in the curve storage unit 15 are sufficiently longer than the curve representing the locus of the line drawn by the operation, a shape of a portion longer than the curve indicated by the curve information in the shape of the curve selected is determined as the shape of the extension curve.

In the example of FIG. 11, as a curve representing the locus of the line drawn by the operation, the curve representing the locus determined by the locus determination unit 4 is represented by a broken line. Furthermore, in the example of FIG. 11, the selected curve having the highest degree of match is represented by a solid line, and the shape of the extension portion of the curve represented by the broken line is the same as the shape of the curve represented by the solid line.

In the first embodiment, an example is described in which among the shapes of the plurality of curves stored in the curve storage unit 15, the shape of the curve having the highest degree of match with the shape of the curve representing the locus determined by the locus determination unit 4 is selected, and the shape of the extension curve is determined from the shape of the curve selected. However, this is only an example, and the shape of the extension curve that is the curve of the extension portion may be determined by another method.

For example, a method is conceivable such as calculating a change tendency and the like of the curvature of the shape of the curve representing the locus determined by the locus determination unit 4 and estimating the shape of the extension curve from the change tendency of the curvature.

FIGS. 12A to 12D illustrate examples of determining the shape of the extension curve, and in FIG. 12A, the shape of the tangent at the terminal end of the gently curved curve is the shape of the extension curve.

In FIG. 12B, since the curvature of the entire curve is constant, the curvature of the shape of the extension curve is the same as the curvature of the shape of the original curve that is a curve representing the locus determined by the locus determination unit 4.

In FIG. 12C, since the shape of the curve is a periodic wavy line shape, the shape of the extension curve is a wavy line shape having the same period as that of the original curve.

In FIG. 12D, since the vicinity of the terminal end of the curve is curved in an arc shape, the shape of the extension curve is an arc shape similar to that in the vicinity of the terminal end of the original curve.

When the extension curve shape determining unit 14 determines the shape of the extension curve, the curve extension unit 17 extends the curve by adding the extension curve to the terminal end of the curve indicated by the curve information acquired by the curve information acquisition unit 9. (step ST20).

In the example of FIG. 13, the length of the curve is 60 mm, the length of the character string is 80 mm, and the length of the curve is 20 mm shorter than the length of the character string, so the curve is extended by 20 mm.

When the curve extension unit 17 extends the curve, the display processing unit 18 generates display information for displaying "when spring comes" that is a part of the character string that is not displayed since the curve is short, along the curve of the extension portion.

The display processing unit 18 causes the display 32 to display "when spring comes" that is the part of the character string that is not displayed since the curve is short, along the curve of the extension portion, in accordance with the generated display information, as illustrated in step D of FIG. 7 (step ST21 in FIG. 5). In step D of FIG. 7, the broken line represents the extension curve that is a curve of the extension portion.

Here, the display processing unit 18 causes the display 32 to display the part of the character string that is not displayed, along the extension curve added by the curve extension unit 17. However, this is only an example, and as illustrated in the right figure in step D of FIG. 7, the display processing unit 18 may cause the display 32 to display the curve image illustrating the extension curve, and display the part of the character string that is not displayed superimposed on the curve image.

In the example of step D in FIG. 7, the display processing unit 18 causes the display 32 to display the extension curve, but since the extension curve is a virtual line, the display processing unit 18 does not have to cause the display 32 to display the extension curve.

Here, for example, when the user performs swiping on the display 32 toward the right end of the display area of the display 32, the right end of the curve indicated by the curve information is positioned at the right end of the display area of the display 32. In this case, the curve extension unit 17 extends the curve to the virtual area existing on the right side of the display area.

Then, the display processing unit 18 disposes a part of the character string in the virtual area that is an area surrounding the display area, along the curve extended to the virtual area.

Processing of disposing the part of the character string in the virtual area and processing after disposing the part of the character string in the virtual area by the display processing unit 18 will be described later.

The display processing unit 18 causes all the characters constituting the character string to be displayed superimposed on the curve image, and then generates display information for erasing the curve image. The display processing unit 18 causes the display 32 to erase the curve image from the display 32 and display only the character string in accordance with the generated display information, as illustrated in step E of FIG. 7 (step ST22 of FIG. 5).

When the display processing unit 18 causes the curve image to be erased, the entire curve image may be erased at one time, but the curve image may be erased by an animation in which the character string is erased in order from the beginning side.

Here, it is assumed that the display processing unit 18 causes the curve image and the character string to be displayed in an overlapping manner and then erases the curve image after a certain period of time, but the curve image may be erased immediately after completion of the display of the character string.

As illustrated in step A of FIG. 8, there is a case where the user makes an utterance before performing operation of drawing a line, and thus before the curve information including the curve image is output from the locus determination unit 4, the character string is output from the voice recognition unit 8 of the character string recognition unit 5, whereby the character string acquisition unit 10 acquires the character string.

When the character string is output from the character string acquisition unit 10 before the curve information including the curve image is output from the locus determination unit 4 (in the case of step ST11: NO in FIG. 5), the display processing unit 18 stores the output character string in the character string temporary save unit 19.

Upon storing the character string in the character string temporary save unit 19, the display processing unit 18 waits until the curve information is output from the locus determination unit 4 (in the case of step ST23: NO in FIG. 5).

After that, when the user starts the operation of drawing a line and the operation of drawing the line is completed, the curve information is output from the locus determination unit 4 to the display processing unit 18.

When the curve information is output from the locus determination unit 4 and thus the curve information is output from the curve information acquisition unit 9 (in the case of step ST23: YES in FIG. 5), the display processing unit 18 reads the character string stored in the character string temporary save unit 19. The display processing unit 18 generates display information for displaying the read character string superimposed on the curve image, and causes the character string to be displayed superimposed on the curve image in accordance with the generated display information, as illustrated in step B of FIG. 8. That is, the display processing unit 18 causes the curve image and the character string to be displayed in an overlapping manner at the same position (step ST24 in FIG. 5).

However, in the example of FIG. 8, the length of the curve is shorter than the length of the character string indicating the voice recognition result, so of the character string, "Let's go see the cherry blossoms" is displayed superimposed on the curve image, but "when spring comes" is not displayed superimposed on the curve image.

When the display processing unit 18 causes the curve image and the character string to be displayed in an overlapping manner at the same position, the whole of the curve image and entire character string may be displayed at the same time, but the curve image and the character string may be displayed by an animation in which the character string is sequentially displayed from the beginning side of the character string.

Furthermore, the curve image and the character string may be sequentially displayed so that the curve image and the character string wells up from under the finger in accordance with swiping with the user's finger.

Note that, FIG. 7 illustrates an example in which the user performs swiping with the finger and then makes an utterance, and FIG. 8 illustrates an example in which the user makes an utterance and then performs swiping with the finger, but the swiping with the finger and the utterance may be performed at the same time.

Upon receiving the character string indicating "Let's go see the cherry blossoms when spring comes" output from the character string acquisition unit 10, the length comparison unit 13 refers to the character width indicated by the character attribute information output from the character attribute information acquisition unit 11, and calculates the length of the character string (step ST15 in FIG. 5).

Furthermore, upon receiving the curve information acquired by the curve information acquisition unit 9, the length comparison unit 13 calculates the length of the curve indicated by the curve information in accordance with the above equation (2) or equation (3) (step ST16 in FIG. 5).

Upon calculating the length of the curve, the length comparison unit 13 compares the length of the curve with the length of the character string (step ST17 in FIG. 5).

If the comparison result by the length comparison unit 13 indicates that the length of the curve is shorter than the length of the character string (in the case of step ST18: YES in FIG. 5), the extension curve shape determining unit 14 determines the shape of the extension curve that is the curve of the extension portion, from the shape of the curve indicated by the curve information acquired by the curve information acquisition unit 9 (step ST19 in FIG. 5).

When the extension curve shape determining unit 14 determines the shape of the extension curve, the curve extension unit 17 extends the curve by adding the extension curve to the terminal end of the curve indicated by the curve information acquired by the curve information acquisition unit 9. (step ST20 in FIG. 5).

In the example of FIG. 13, the length of the curve is 60 mm, the length of the character string is 80 mm, and the length of the curve is 20 mm shorter than the length of the character string, so the curve is extended by 20 mm.

When the curve extension unit 17 extends the curve, the display processing unit 18 generates display information for displaying "when spring comes" that is a part of the character string that is not displayed since the length of the curve is short, along the curve of the extension portion.

The display processing unit 18 causes the display 32 to display "when spring comes" that is the part of the character string that is not displayed, along the curve of the extension portion, in accordance with the generated display information, as illustrated in step C of FIG. 8 (step ST21 in FIG. 5).

Here, the display processing unit 18 causes the display 32 to display the part of the character string that is not displayed, along the extension curve added by the curve extension unit 17. However, this is only an example, and the display processing unit 18 may cause the display 32 to display the curve image illustrating the extension curve, and display the part of the character string that is not displayed superimposed on the curve image, as illustrated in the right figure in step C of FIG. 8.

The display processing unit 18 causes all the characters constituting the character string to be displayed superimposed on the curve image, and then generates display information for erasing the curve image.

The display processing unit 18 causes the display 32 to erase the curve image from the display 32 and display only the character string in accordance with the generated display information, as illustrated in step D of FIG. 8 (step ST22 of FIG. 5).

When the display processing unit 18 causes the curve image to be erased, the entire curve image may be erased at the same time, but the curve image may be erased by an animation in which the character string is erased in order from the beginning side.

Here, it is assumed that the display processing unit 18 causes the curve image and the character string to be displayed in an overlapping manner and then erases the curve image after a certain period of time, but the curve image may be erased immediately after completion of the display of the character string.

In the input display control device 100 illustrated in FIG. 1, an example is described in which the length of the curve is shorter than the length of the character string indicating the voice recognition result, but when the length of the curve is longer than or equal to the length of the character indicating the voice recognition result, it is possible to cause all the characters constituting the character string to be displayed superimposed on the curve image without extending the length of the curve.

Thus, if the comparison result by the length comparison unit 13 indicates that the length of the curve is longer than or equal to the length of the character string (in the case of step ST18: No in FIG. 5), the processing of steps ST19 to ST21 is not performed and the processing proceeds to step ST22, and the curve image is erased and only the character string is displayed.

In the input display control device 100 illustrated in FIG. 1, the length comparison unit 13 assumes that the characters included in the character string are not separated from each other and the length between the characters is 0 mm, and calculates the length of the character string by the equation (1). However, if the length between the characters is greater than 0 mm, the length comparison unit 13 may calculate the length of the character string in consideration of the length between the characters. For example, if the length between the characters is 0.5 mm, the length of the character string is 87.5 mm as indicated in the following equation (4).

$$\text{Length of character string} = (5 \text{ mm} \times 16) + (0.5 \text{ mm} \times 15) = 87.5 \text{ mm} \quad (4)$$

The equation (4) indicates a case where the number of characters in the character string is 16 and the character width is "5 mm", as in the equation (1).

Next, the processing of disposing a part of the character string in the virtual area and processing after disposing the part of the character string in the virtual area by the display processing unit 18 will be described.

Figure 14:
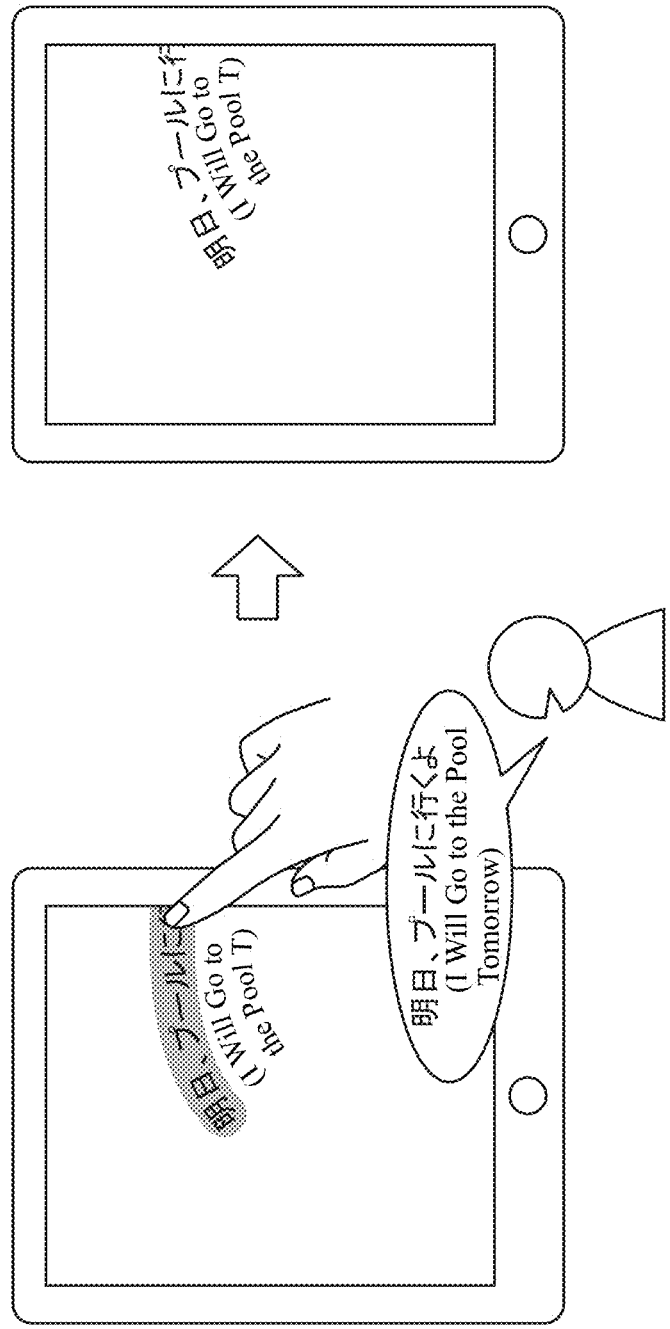
FIG. 14 is an explanatory diagram illustrating an example in which a display processing unit 18 cannot cause a display 32 to display a part of a character string.

For example, as illustrated in FIG. 14, when the user performs swiping on the display 32 toward the right end of the display area of the display 32, the right end of the curve indicated by the curve information is positioned at the right end of the display area of the display 32. FIG. 14 is an explanatory diagram illustrating an example in which the display processing unit 18 cannot cause the display 32 to display the part of the character string.

In the example of FIG. 14, of a character string indicating "I will go to the pool tomorrow", a character string "tomorrow" is not displayed.

FIG. 15 is an explanatory diagram illustrating the display area of the display 32 and the virtual area that is an area surrounding the display area.

The display area of the display 32 is a real area in which characters can actually be displayed. On the other hand, the virtual area is a virtual area that is not displayed on the display 32.

When it is not possible to cause the display 32 to display a part of the character string, the display processing unit 18 extends the extension curve to the virtual area as illustrated in FIG. 15, and dispose the character string that is not displayed, along the extended extension curve in the virtual area. When disposing, in the virtual area, the character string that is not displayed, the display processing unit 18 disposes the character string that is not displayed so that "I will go to the pool tomorrow" that is the character string output from the character string acquisition unit 10 straddles a border between the display area and the virtual area.

In the example of FIG. 15, the display processing unit 18 disposes the character string "tomorrow" in the virtual area.

Figure 16:
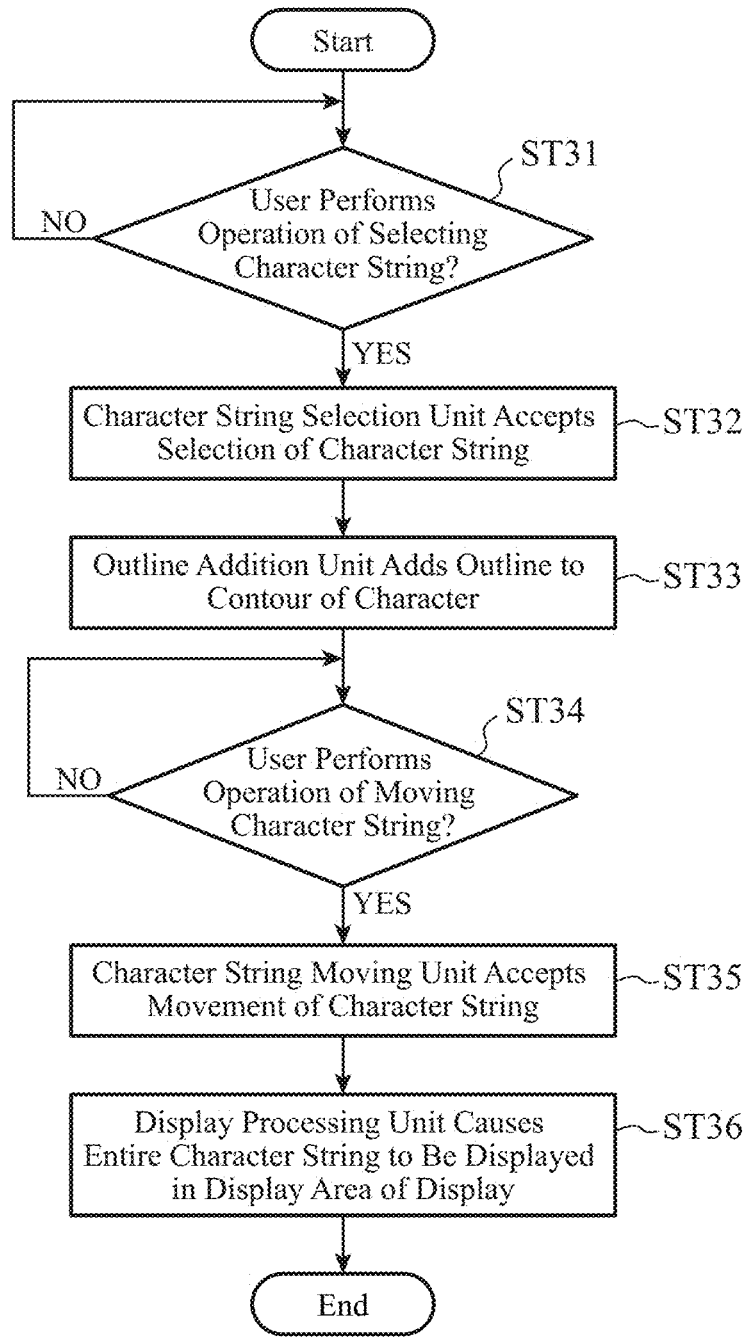
FIG. 16 is a flowchart illustrating processing after the display processing unit 18 disposes a part of the character string in the virtual area.

FIG. 16 is a flowchart illustrating processing after the display processing unit 18 disposes a part of the character string in the virtual area.

Hereinafter, the processing after the display processing unit 18 disposes the part of the character string in the virtual area will be described referring to FIG. 16.

When the user performs operation of selecting a character string a part of which is disposed in the virtual area (in the case of step ST31: YES in FIG. 16), the character string selection unit 18a accepts selection of the character string (step ST32 in FIG. 16).

If the user does not perform the operation of selecting a character string (in the case of step ST31: NO in FIG. 16), the character string selection unit 18a waits until the user performs the operation of selecting a character string.

As the operation of selecting a character string by the user, the operation of long-pressing a character displayed in the display area of the display 32 among characters included in the character string a part of which is disposed in the virtual area is conceivable.

The operation of long-pressing a character displayed in the display area of the display 32 means operation in which the user touches a character displayed in the display area of the display 32 for a longer time than a threshold value.

Here, an example is described in which the user performs the operation of long-pressing a character displayed in the display area of the display 32 and thus the character string selection unit 18a accepts selection of the character string selection. However, this is only an example, and for example, the character string selection unit 18a may accept selection of the character string when the user touches a character displayed in the display area of the display 32 regardless of the touching time.

When the character string selection unit 18a accepts selection of the character string, the outline addition unit 18b adds, to the contour of each of all the characters included in the character string of which selection is accepted, an outline of a color different from that of the character, as illustrated in FIG. 17 (step ST33 in FIG. 16).

The outline addition unit 18b adds the outline to the contour of the character, whereby the character is displayed on the display 32 as a so-called "outline character", and the user can recognize that selection of the character string is accepted.

FIG. 17 is an explanatory diagram illustrating the character string of which selection is accepted by the character string selection unit 18a.

When the user performs operation of moving the character string of which selection is accepted by the character string selection unit 18a (in the case of step ST34: YES in FIG. 16), the character string moving unit 18c accepts movement of the character string (step ST35 in FIG. 16).

When the user does not perform the operation of moving the character string (in the case of step ST34: NO in FIG. 16), the character string moving unit 18c waits until the user performs the operation of moving the character string.

When the character string moving unit 18c accepts movement for disposing the entire character string in the display area of the display 32, the display processing unit 18 generates display information for displaying the entire character string in the display area of the display 32.

The display processing unit 18 causes the entire character string to be displayed in the display area of the display 32 in accordance with the generated display information, as illustrated in FIG. 18 (step ST36 in FIG. 16).

FIGS. 18A and 18B are an explanatory diagram illustrating the movement of the character string.

FIG. 18A illustrates the movement of the character string displayed superimposed on the curve image.

FIG. 18B illustrates an example in which the curve image is illustrated as an underline of the character string.

Here, when the character string moving unit 18c accepts the movement for disposing the entire character string in the display area of the display 32, the display processing unit 18 causes the entire character string to be displayed in the display area of the display 32. However, as illustrated in FIG. 19, when the character string moving unit 18c accepts movement for moving the entire character string outside the display area of the display 32, the display processing unit 18 may discard the character string.

FIG. 19 is an explanatory diagram illustrating discarding of the character string acquired by the character string acquisition unit 10.

In FIG. 19, as movement operation for moving the entire character string outside the display area of the display 32, an example is illustrated in which the user flicks the character string of which selection is accepted by the character string selection unit 18a to the outside of the display area of the display 32.

In the first embodiment described above, the input display control device 100 is configured so that when a part of the character string acquired by the character string acquisition unit 10 protrudes out of the display area of the display 32 since the length of the character string acquired by the character string acquisition unit 10 is long, the display control unit 12 disposes the part of the character string in the virtual area that is an area surrounding the display area. Thus, the input display control device 100 can avoid a situation in which the entire character string cannot be generated.

Furthermore, in the first embodiment, the display control unit 12 includes the character string selection unit 18a for accepting selection of the character string a part of which is disposed in the virtual area, and the character string moving unit 18c for accepting movement of the character string of which selection is accepted by the character string selection unit 18a. Furthermore, the input display control device 100 is configured so that when the character string moving unit 18c accepts movement for disposing the entire character string of which selection is accepted by the character string selection unit 18a in the display area, the display control unit 12 generates display information for displaying the entire character string in the display area. Thus, the input display control device 100 can cause the entire character string to be displayed in the display area of the display 32.

Furthermore, in the first embodiment, the input display control device 100 is configured so that when it is determined that a part of the character string acquired by the character string acquisition unit 10 cannot be displayed along the curve since the length of the curve indicated by the curve information acquired by the curve information acquisition unit 9 is short, the display control unit 12 determines the shape of the extension portion of the curve from the shape of the curve indicated by the curve information acquired by the curve information acquisition unit 9 and extends the curve, and generates display information for displaying the part of the character string along the curve of the extension portion. Thus, the input display control device 100 can cause the entire character string to be displayed along the curve even when the length of the curve indicated by the curve information acquired by the curve information acquisition unit 9 is shorter than the length of the character string.

Moreover, in the first embodiment, when the curve information including the curve image is output from the locus determination unit 4 before the character string is output from the voice recognition unit 8, the input display control device 100 causes the display 32 to display the curve image and then display the character string output from the voice recognition unit 8 superimposed on the curve image. On the other hand, the input display control device 100 is configured so that when the character string is output from the voice recognition unit 8 before the curve information including the curve image is output from the locus determination unit 4, the input control device waits until the curve information is output from the locus determination unit 4, and when the curve information is output from the locus determination unit 4, the display 32 is caused to display the curve information and display the character string superimposed on the curve image. Thus, the input display control device 100 can grasp in advance the position where the character string indicating the voice recognition result is displayed when the user performs the operation of drawing a line before making an utterance. The user can therefore grasp an idea of a display image of the character string. Furthermore, when the user makes an utterance before performing the operation of drawing a line, the curve image and the character string are displayed in an overlapping manner at the same position, so that it is possible to give a highly responsive operation feeling to the user.

In the input display control device 100 illustrated in FIG. 1, the display processing unit 18 causes the character string to be displayed superimposed on the curve image. However, this is only an example, and the display processing unit 18 may cause the character string to be displayed around the curve image along the curve image without causing the character string to be displayed superimposed on the curve image.

Furthermore, the curve image may be a colorless and transparent image if the user does not need to confirm the curve image. Furthermore, the curve image may be a colored and transparent image.

Furthermore, the line width of the curve image is configured to have a width corresponding to the character height indicated by the character attribute information output from the character management unit 3, but for example, as illustrated in FIG. 18B, the curve image may be an underline having a constant width.

When the curve image is colorless and transparent, the display processing unit 18 may cause the display 32 to display a curve having no width representing the locus determined by the locus determination unit 4, or a curve having no width representing the locus extended by the curve extension unit 17.

Second Embodiment

In the input display system illustrated in FIG. 1, when the character string moving unit 18*c* accepts movement for disposing the entire character string of which selection is accepted by the character string selection unit 18*a* in the display area, the display control unit 12 generates display information for displaying the entire character string in the display area.

In a second embodiment, an input display system will be described in which the display control unit 12 makes a line break in a character string a part of which is disposed in the virtual area, thereby generating display information for displaying a part of the character string disposed in the virtual area in the display area.

A configuration diagram illustrating the input display system including the input display control device 100 of the second embodiment is FIG. 1, as in the first embodiment. However, the display processing unit 18 does not have to include the character string selection unit 18*a*, the outline addition unit 18*b*, and the character string moving unit 18*c*.

Figure 20:
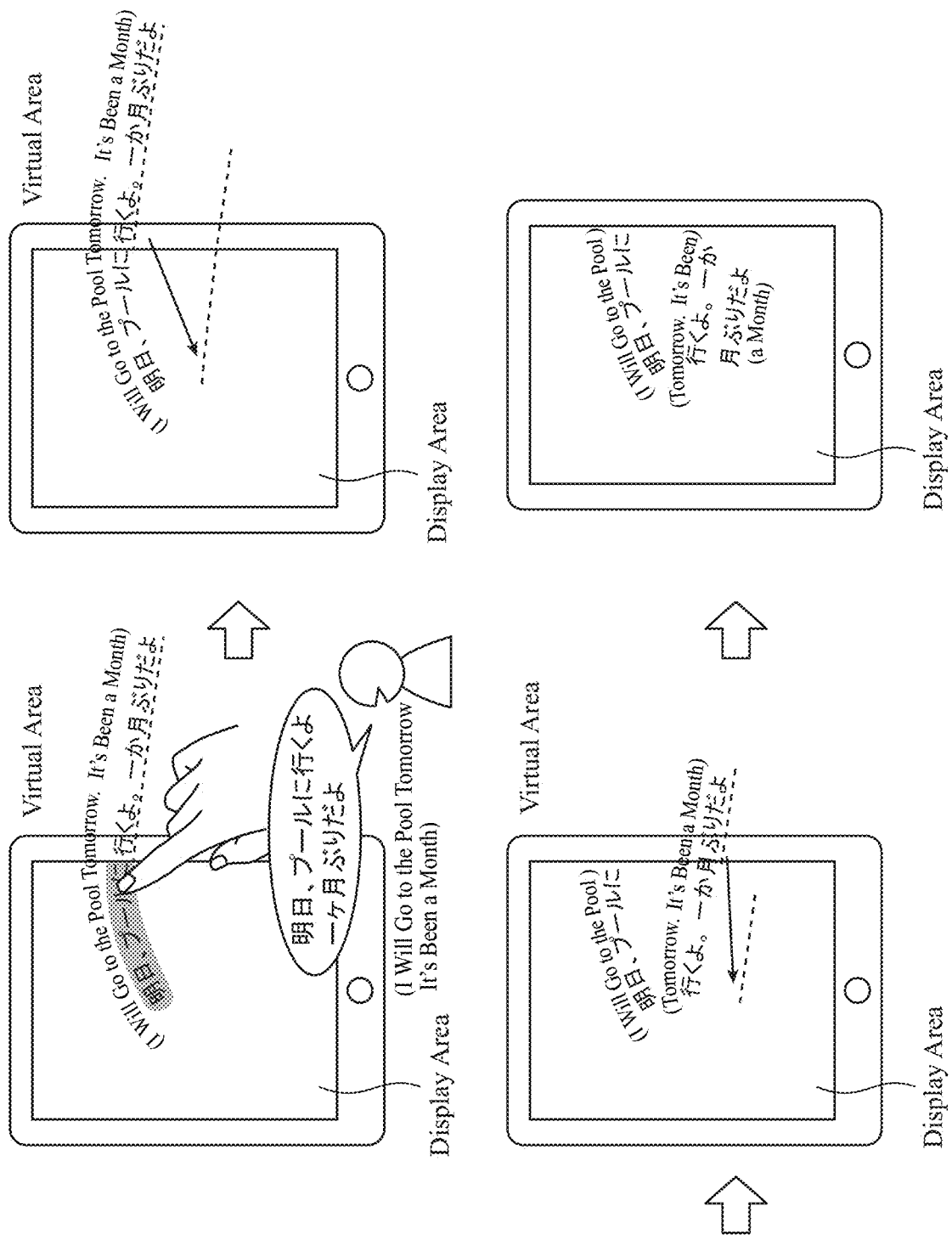
FIG. 20 is an explanatory diagram illustrating an example in which a character string disposed in the virtual area is displayed in the display area by being subjected to automatic line breaking at the right end of the display area on the display 32.

FIG. 20 is an explanatory diagram illustrating an example in which the character string disposed in the virtual area is displayed in the display area by being subjected to automatic line breaking at the right end of the display area on the display 32.

Next, the operation of the input display system of the second embodiment will be described.

Figure 21:
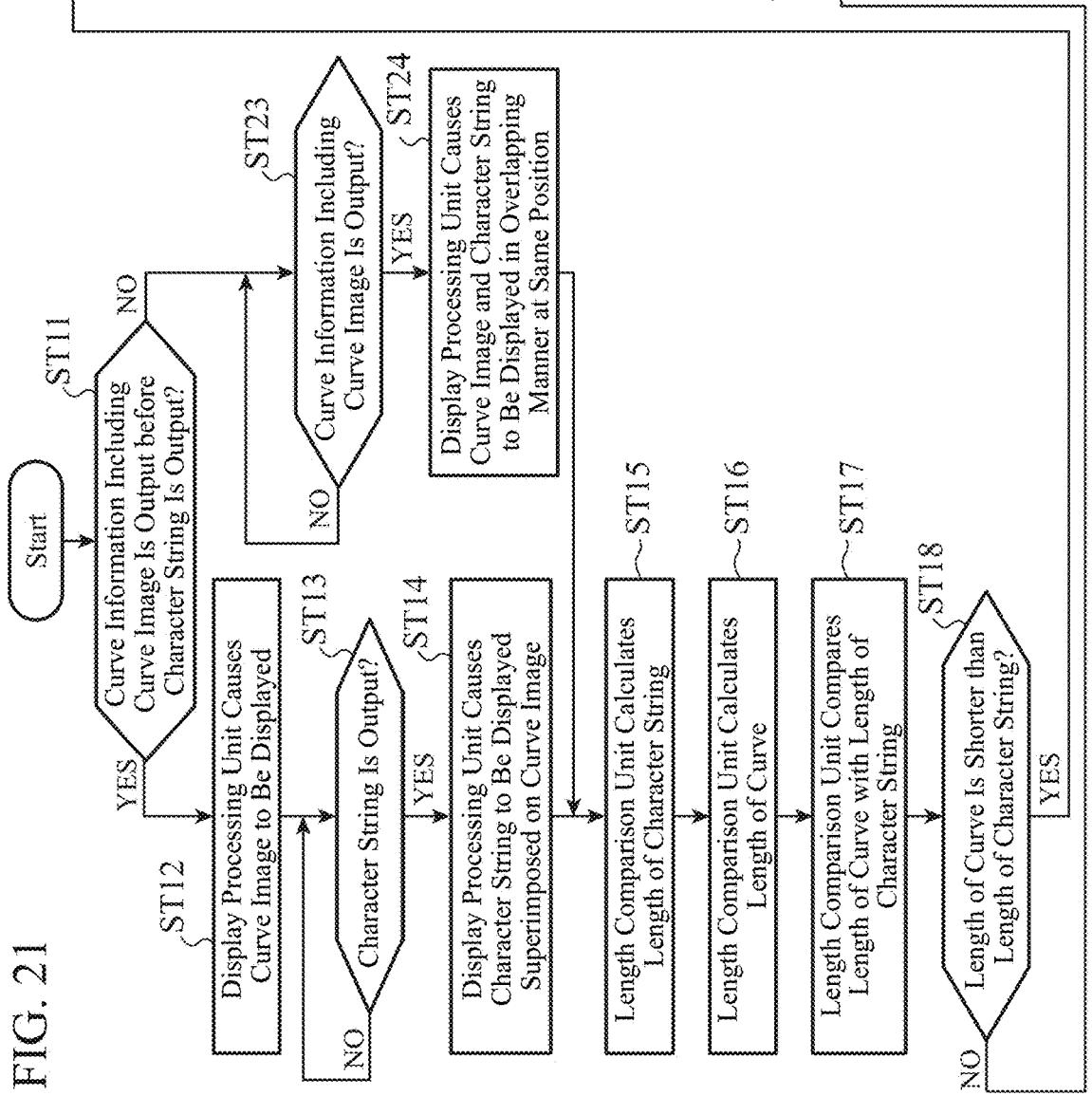
FIG. 21 is a flowchart illustrating an input display control method that is a processing content of an input display system according to a second embodiment.

FIG. 21 is a flowchart illustrating an input display control method that is a processing content of the input display system according to the second embodiment. In FIG. 21, the same reference numerals as those in FIG. 5 denote the same or corresponding portions.

For example, when the user utters "I will go to the pool tomorrow, It's been a month", the character string acquisition unit 10 acquires a character string indicating "I will go to the pool tomorrow. It's been a month" from the voice recognition unit 8, and outputs the character string to each of the length comparison unit 13 and the display processing unit 18.

Upon receiving the character string indicating "I will go to the pool tomorrow. It's been a month" from the character string acquisition unit 10, the display processing unit 18 generates display information for displaying the character string superimposed on the curve image, as in the first embodiment.

However, since the length of the character string acquired by the character string acquisition unit 10 is long, a part of the character string acquired by the character string acquisition unit 10 protrudes out of the display area of the display 32, so that the display processing unit 18 disposes the part of the character string in the virtual area.

In the example of FIG. 20, of the character string acquired by the character string acquisition unit 10, the display processing unit 18 displays a character string "I will go to the pool" in the display area, and disposes a character string "tomorrow. It's been a month" in the virtual area.

If the comparison result by the length comparison unit 13 indicates that the length of the curve is shorter than the length of the character string, the extension curve shape determining unit 14 determines the shape of the extension curve that is the curve of the extension portion, from the shape of the curve indicated by the curve information acquired by the curve information acquisition unit 9, as in the first embodiment.

When the extension curve shape determining unit 14 determines the shape of the extension curve, the curve extension unit 17 extends the curve by adding the extension curve to the terminal end of the curve indicated by the curve information acquired by the curve information acquisition unit 9, as in the first embodiment.

In the second embodiment as well, as in the first embodiment, the curve extension unit 17 extends the curve to the virtual area as illustrated in FIG. 20 (step ST20A in FIG. 21).

As described above, the display processing unit 18 disposes the character string "tomorrow. It's been a month" in the virtual area, and disposes the character string "tomorrow. It's been a month" along the curve extended to the virtual area.

Upon disposing the character string "tomorrow. It's been a month" in the virtual area, the display processing unit 18 cuts out the curve extended to the virtual area, and disposes the cut out curve below the curve in the real area (step ST21A in FIG. 21).

The display processing unit 18 makes a line break in the character string indicated by "I will go to the pool tomorrow. It's been a month" output from the character string acquisition unit 10, at the right end of the display area on the display 32. In the example of FIG. 20, the line break is made between the character "l" and the character "t". In FIG. 20, "←" represents the line break in the character string.

Next, the display processing unit 18 disposes "tomorrow. It's been a month" so that start points of the curves are caused to match each other, and thus "t" that is the character of the start point of "tomorrow. It's been a month" that is the character string obtained by the line break, and "I" that is the character of the start point of "I will go to the pool tomorrow. It's been a month" are almost aligned in position in the left-right direction.

The display processing unit 18 displays a character string "tomorrow. It's been" out of the character string "tomorrow. It's been a month" in the display area of the display 32 along the cut out curve. (step ST21B in FIG. 21).

In the example of FIG. 20, of the character string "tomorrow. It's been a month", "tomorrow. It's been" can be displayed in the display area of the display 32. However, the character string "a month" protrudes out of the display area of the display 32.

Since the character string "a month" protrudes out of the display area of the display 32, the curve extension unit 17 extends the curve that is along the character string "tomorrow. It's been" to the virtual area (step ST20A in FIG. 21).

The display processing unit 18 disposes the character string "a month" in the virtual area, along the curve extended to the virtual area.

Upon disposing the character string "a month" in the virtual area, the display processing unit 18 cuts out the curve extended to the virtual area, and disposes the cut out curve below the curve in the real area (step ST21A in FIG. 21).

The display processing unit 18 makes a line break in the character string indicated by "tomorrow. It's been a month" at the right end of the display area on the display 32. In the example of FIG. 20, the line break is made between the character "n" and the character "a".

Next, the display processing unit 18 disposes the character string "a month" so that start points of the curves are caused to match each other, and thus "a" that is the character of the start point of the character string "a month" that is the character string obtained by the line break, and "t" that is the character of the start point of "tomorrow. It's been a month" are almost aligned in position in the left-right direction.

The display processing unit 18 displays the character string "a month" in the display area of the display 32, along the cut out curve (step ST21B in FIG. 21).

In the example of FIG. 20, the character string "a month" is displayed in the display area of the display 32, and the character string "I will go to the pool", the character string "tomorrow. It's been", and the character string "a month" are displayed in three lines.

The display processing unit 18 repeatedly performs processing of steps ST21A to ST21C until the entire curve extended to the virtual area are cut out.

In FIG. 20, the display processing unit 18 makes a line break twice in the character string indicating "I will go to the pool tomorrow. It's been a month", thereby causing the character string indicating "I will go to the pool tomorrow. It's been a month" to be displayed in three lines. However, this is only an example, and for example, the display processing unit 18 may move the character string on the second line to the left end of the display area, to cause the character string "I will go to the pool" and the character string "tomorrow. It's been a month" to be displayed in two lines. Furthermore, the last character of the character string on the second line may be aligned with the right end of the display area to make the two lines.

Figure 22:
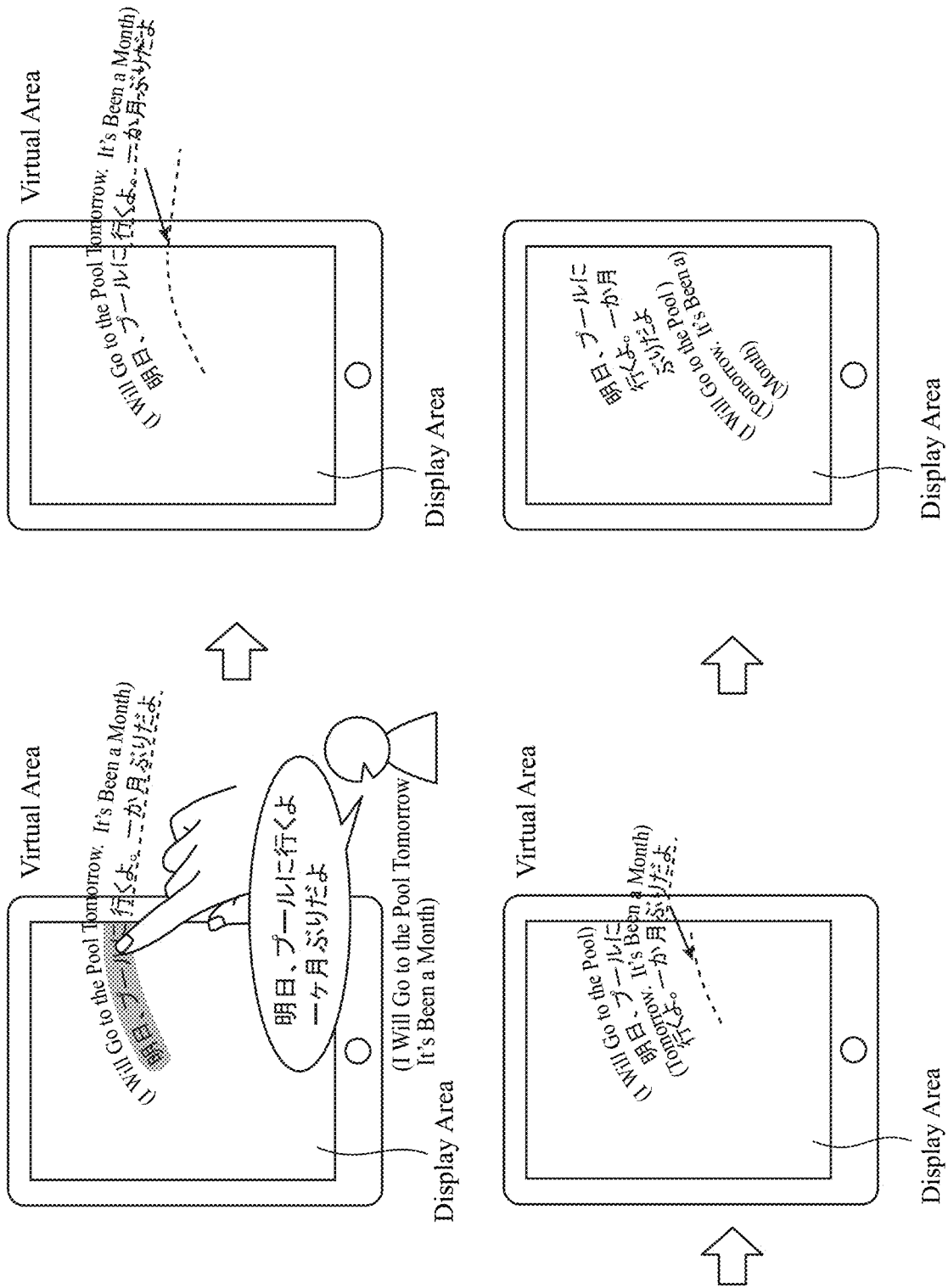
FIG. 22 is an explanatory diagram illustrating an example in which the character string disposed in the virtual area is displayed in the display area by being subjected to automatic line breaking at the right end of the display area on the display 32.

Here, the display processing unit 18 causes the multiple characters included in each of the character string on the second line and the character string on the third line to be arranged in a straight line and displayed. However, this is only an example, and the curve extension unit 17 generates a curve for displaying each of the character string on the second line and the character string on the third line so that the shape of the curve for disposing each of the character string on the second line and the character string on the third line has the same shape as the shape of the curve for disposing the character string on the first line. Then, as illustrated in FIG. 22, the display processing unit 18 may cause the multiple characters included in each of the character string on the second line and the character string on the third line to be displayed along the corresponding curve generated by the curve extension unit 17, in the display area of the display 32. In FIG. 22, "←" represents a line break in the character string.

FIG. 22 is an explanatory diagram illustrating an example in which the character string disposed in the virtual area is displayed in the display area by being subjected to automatic line breaking at the right end of the display area on the display 32.

In the second embodiment described above, the input display control device 100 is configured so that the display control unit 12 generates display information for displaying a part of the character string disposed in the virtual area, in the display area, by making a line break in the character string acquired by the character string acquisition unit 10. Thus, the input display control device 100 can cause all the characters included in the character string a part of which is disposed in the virtual area to be displayed in the display area of the display 32 automatically.

Third Embodiment

In the input display system illustrated in FIG. 1, when the character string moving unit 18c accepts movement for disposing the entire character string of which selection is accepted by the character string selection unit 18a in the display area, the display control unit 12 generates display information for displaying the entire character string in the display area.

In a third embodiment, an input display system will be described in which the display control unit 12 generates display information for displaying an entire character string a part of which is disposed in the virtual area, in the display area of the display 32, by moving the entire character string to the display area.

A configuration diagram illustrating the input display system including the input display control device 100 of the third embodiment is FIG. 1, as in the first embodiment. However, the display processing unit 18 does not have to include the character string selection unit 18a, the outline addition unit 18b, and the character string moving unit 18c.

Figure 23:
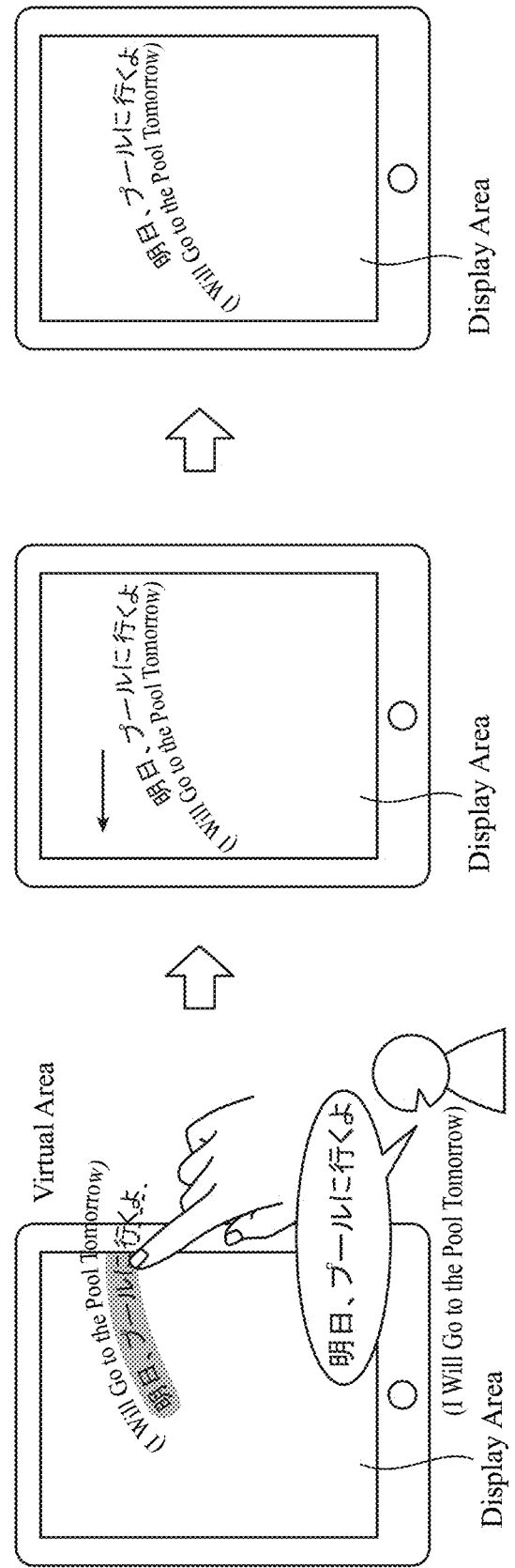
FIG. 23 is an explanatory diagram illustrating an example in which the display control unit 12 causes an entire character string a part of which is disposed in the virtual area to be displayed in the display area of the display 32 by moving the entire character string to the display area.

FIG. 23 is an explanatory diagram illustrating an example in which the display control unit 12 causes the entire character string a part of which is disposed in the virtual area to be displayed in the display area by moving the entire character string to the display area of the display 32.

Next, the operation will be described of the input display system of the third embodiment.

Figure 24:
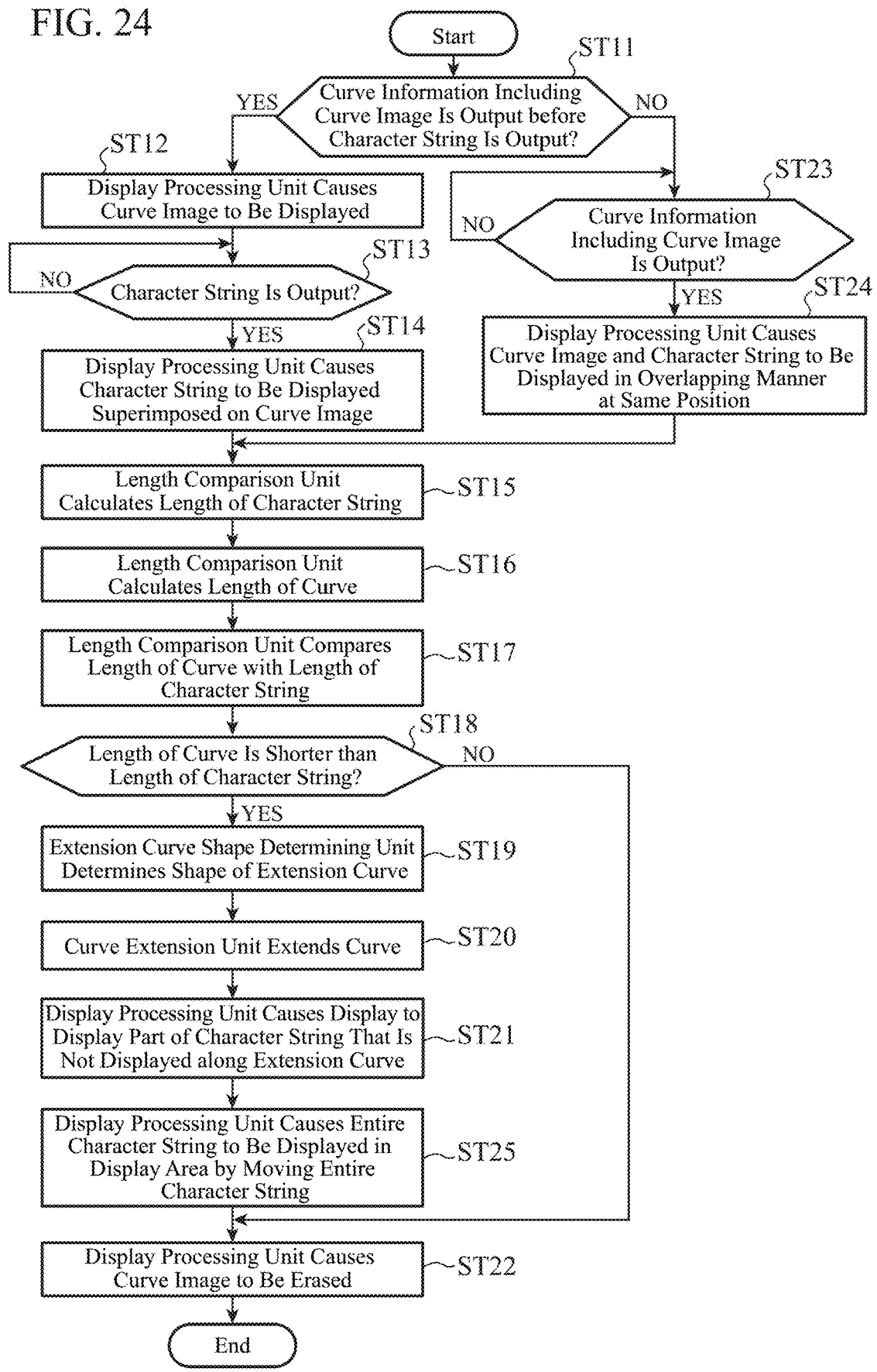
FIG. 24 is a flowchart illustrating an input display control method that is a processing content of an input display system according to a third embodiment.

FIG. 24 is a flowchart illustrating an input display control method that is a processing content of the input display system according to the third embodiment. In FIG. 24, the same reference numerals as those in FIG. 5 denote the same or corresponding portions.

For example, when the user utters "I will go to the pool tomorrow", the character string acquisition unit 10 acquires a character string indicating "I will go to the pool tomorrow" from the voice recognition unit 8, and outputs the character string to each of the length comparison unit 13 and the display processing unit 18.

Upon receiving the character string indicating "I will go to the pool tomorrow" from the character string acquisition unit 10, the display processing unit 18 generates display information for displaying the character string superimposed on the curve image, as in the first embodiment.

However, since the length of the character string acquired by the character string acquisition unit 10 is long, a part of the character string protrudes out of the display area of the display 32, so that the display processing unit 18 disposes the part of the character string in the virtual area.

In the example of FIG. 23, of the character string acquired by the character string acquisition unit 10, the display processing unit 18 displays a character string "I will go to the pool" in the display area, and disposes a character string "tomorrow" in the virtual area.

Upon disposing a part of the character string in the virtual area, the display processing unit 18 causes the entire character string to be displayed in the display area by, for example, moving the entire character string toward the left end side of the display area in the figure, as illustrated in FIG. 23 (step ST25 in FIG. 24). In FIG. 23, "←" represents movement of the character string.

In the example of FIG. 23, the display processing unit 18 can cause the entire character string to be displayed in the display area by moving the entire character string toward the left end side of the display area in the figure.

In the third embodiment described above, the input display control device 100 is configured so that the display control unit 12 generates display information for displaying the entire character string a part of which is disposed in the virtual area, in the display area, by moving the entire character string to the display area. Thus, the input display control device 100 can cause all the characters included in the character string a part of which is disposed in the virtual area to be displayed in the display area of the display 32 automatically.

Note that, when the length of the character string output from the character string acquisition unit 10 is longer than, for example, the length in the left-right direction of the display area, the entire character string cannot be displayed in the display area even if the display processing unit 18 moves the entire character string toward the left end side of the display area. Specifically, it is as follows.

For example, when the user utters "I will go to the pool tomorrow, It's been a month", the character string acquisition unit 10 acquires a character string indicating "I will go to the pool tomorrow. It's been a month" from the voice recognition unit 8, and outputs the character string to each of the length comparison unit 13 and the display processing unit 18.

Upon receiving the character string indicating "I will go to the pool tomorrow. It's been a month" from the character string acquisition unit 10, the display processing unit 18 generates display information for displaying the character string superimposed on the curve image, as in the first embodiment.

However, since the length of the character string acquired by the character string acquisition unit 10 is long, a part of the character string protrudes out of the display area of the display 32, so that the display processing unit 18 disposes the part of the character string in the virtual area.

Figure 25:
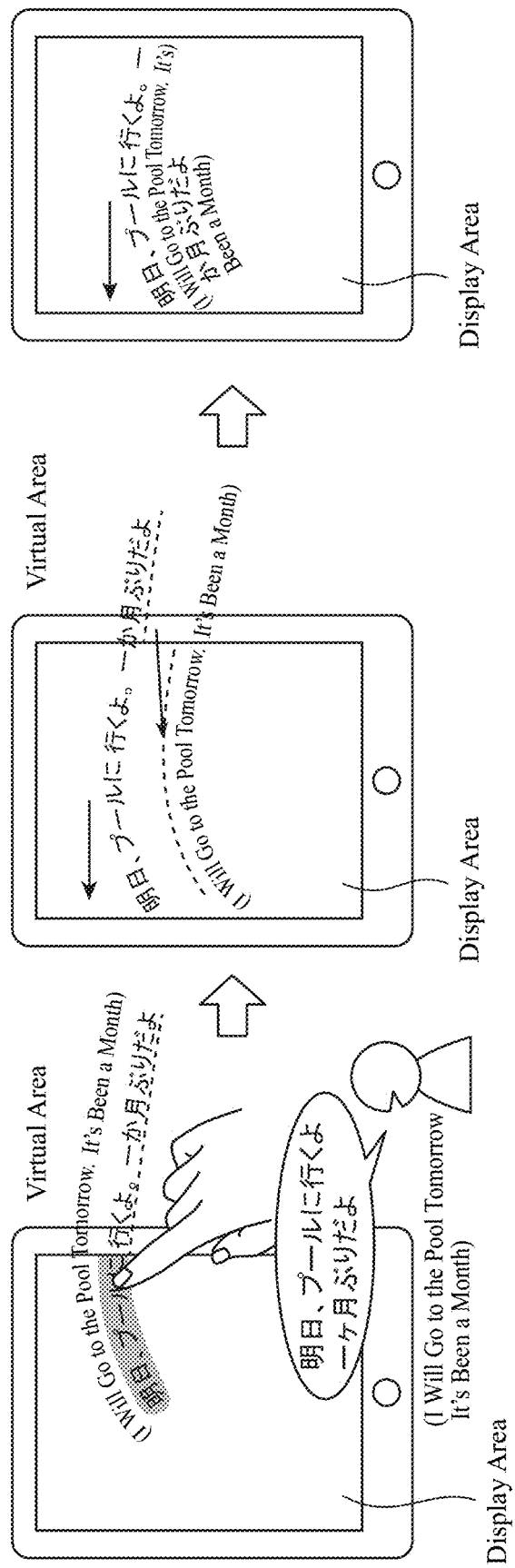
FIG. 25 is an explanatory diagram illustrating an example in which the display control unit 12 causes an entire character string a part of which is disposed in the virtual area to be displayed in the display area by moving the entire character string and then making a line break in the character string.

FIG. 25 is an explanatory diagram illustrating an example in which the display control unit 12 causes the entire character string a part of which is disposed in the virtual area to be displayed in the display area by moving the entire character string and then making a line break in the character string.

In the example of FIG. 25, of the character string acquired by the character string acquisition unit 10, the display processing unit 18 causes a character string "I will go to the pool" to be displayed in the display area, and disposes a character string "tomorrow. It's been a month" in the virtual area.

The display processing unit 18 moves "I" that is the character of the start point of the character string to, for example, the front of the left end of the display area, and then makes a line break in the character string at the right end of the display area on the display 32.

In the example of FIG. 25, the display processing unit 18 moves the entire character string, thereby causing the character string "I will go to the pool tomorrow. It's" to be displayed in the display area. However, since the character string "been a month" protrudes out of the display area of the display 32, the display processing unit 18 disposes the character string "been a month" in the virtual area.

Next, the display processing unit 18 makes a line break in the entirely moved character string at the right end of the display area on the display 32. In the example of FIG. 25, the line break is made between the character "s" and the character "b".

The display processing unit 18 causes the character string "been a month" that is a character string obtained by the line break to be displayed in the display area of the display 32.

In the example of FIG. 25, the shape of the curve for disposing the character string "I will go to the pool tomorrow. It's" and the shape of the curve for disposing the character string "been a month" have the same shape, but may have different shapes.

With the configuration as described above, even when the length of the character string is long, all the characters included in the character string can be automatically displayed in the display area of the display 32.

Fourth Embodiment

In the input display system illustrated in FIG. 1, when the character string moving unit 18c accepts movement for disposing the entire character string of which selection is accepted by the character string selection unit 18a in the display area, the display control unit 12 generates display information for displaying the entire character string in the display area.

In a fourth embodiment, an input display system will be described in which the display control unit 12 makes the length of the character string less than or equal to the length of the curve indicated by the curve information acquired by the curve information acquisition unit 9 by reducing the character size of the character included in the character string a part of which is disposed in the virtual area.

A configuration diagram illustrating the input display system including the input display control device 100 of the fourth embodiment is FIG. 1, as in the first embodiment. However, the display processing unit 18 does not have to include the character string selection unit 18a, the outline addition unit 18b, and the character string moving unit 18c.

Figure 26:
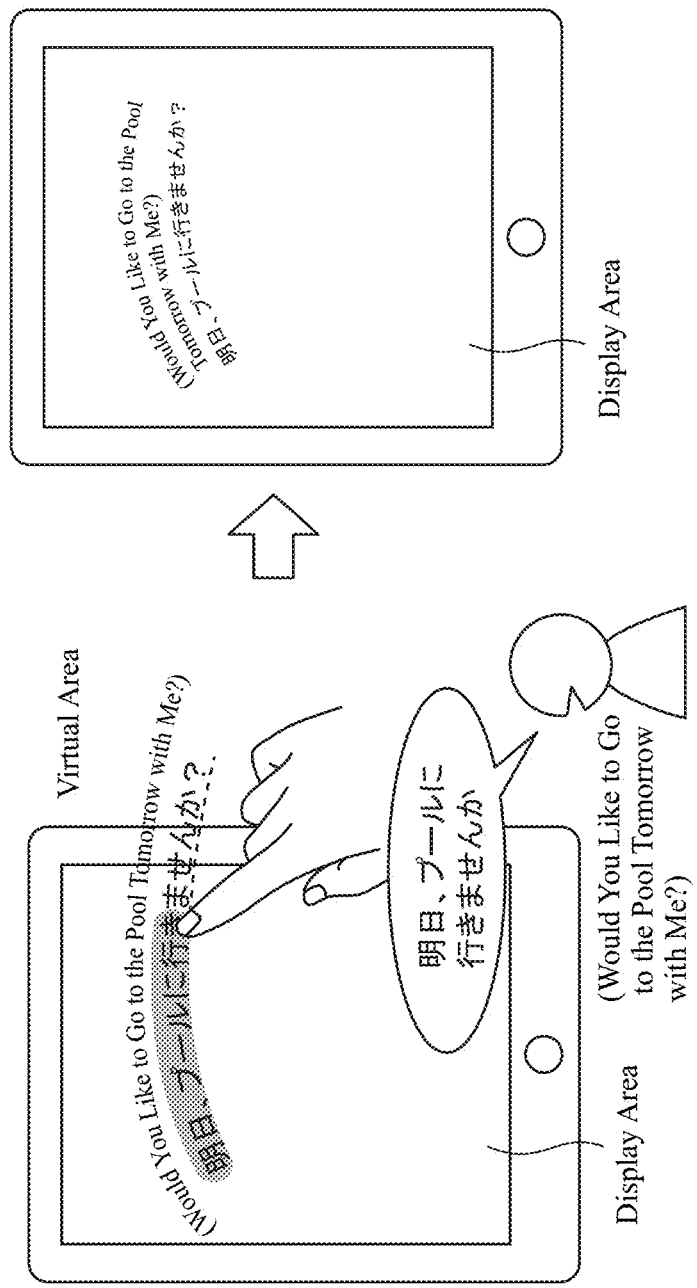
FIG. 26 is an explanatory diagram illustrating an example in which the display control unit 12 causes an entire character string to be displayed in the display area by reducing the character size of characters included in the character string.

FIG. 26 is an explanatory diagram illustrating an example in which the display control unit 12 causes the entire character string to be displayed in the display area by reducing the character size of the characters included in the character string.

Next, the operation will be described of the input display system of the fourth embodiment.

Figure 27:
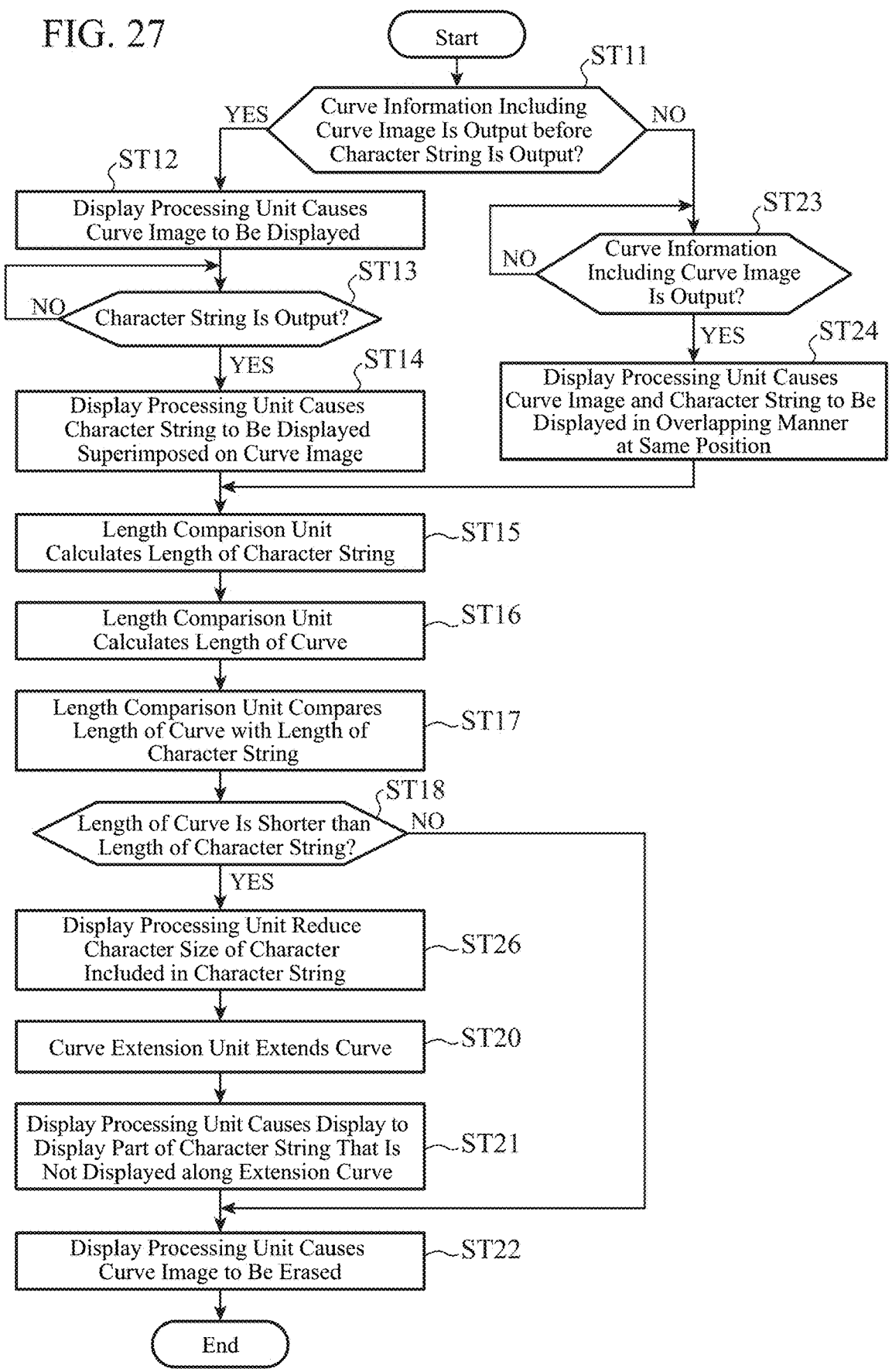
FIG. 27 is a flowchart illustrating an input display control method that is a processing content of an input display system according to a fourth embodiment.

FIG. 27 is a flowchart illustrating an input display control method that is a processing content of the input display system according to the fourth embodiment. In FIG. 27, the same reference numerals as those in FIG. 5 denote the same or corresponding portions.

For example, when the user utters "Would you like to go to the pool tomorrow", the character string acquisition unit 10 acquires a character string indicating "Would you like to go to the pool tomorrow?" from the voice recognition unit 8, and outputs the character string to each of the length comparison unit 13 and the display processing unit 18.

Upon receiving the character string indicating "Would you like to go to the pool tomorrow?" from the character string acquisition unit 10, the display processing unit 18 generates display information for displaying the character string superimposed on the curve image, as in the first embodiment.

However, since the length of the character string acquired by the character string acquisition unit 10 is long, a part of the character string protrudes out of the display area of the display 32, so that the display processing unit 18 disposes the part of the character string in the virtual area.

In the example of FIG. 26, of the character string acquired by the character string acquisition unit 10, the display processing unit 18 displays a character string "Would you like to go to the pool" in the display area, and disposes a character string "tomorrow?" in the virtual area.

In the example of FIG. 26, the character size of each character included in the character string "Would you like to go to the pool tomorrow?" is as described in the character attribute table stored in the character management DB 2.

Upon disposing a part of the character string in the virtual area, the display processing unit 18 reduces the character size of each of all the characters included in the character string so that the length of the character string is less than or equal to the length of the curve indicated by the curve information acquired by the curve information acquisition unit 9 (step ST26 in FIG. 27).

The display processing unit 18 reduces the character size of each of all the characters, and then generates display information for displaying the entire character string in the display area of the display 32.

As illustrated in FIG. 26, the display processing unit 18 causes the entire character string to be displayed in the display area of the display 32 in accordance with the generated display information (step ST21 in FIG. 27).

Here, the display processing unit 18 reduces the character size of each of all the characters included in the character string so that the length of the character string is less than or equal to the length of the curve.

When the length of the character string acquired by the character string acquisition unit 10 is shorter than the length of the curve, the display processing unit 18 may increase the character size of each of all the characters included in the character string within a range in which the length of the character is not longer than the length of the curve.

Figure 28:
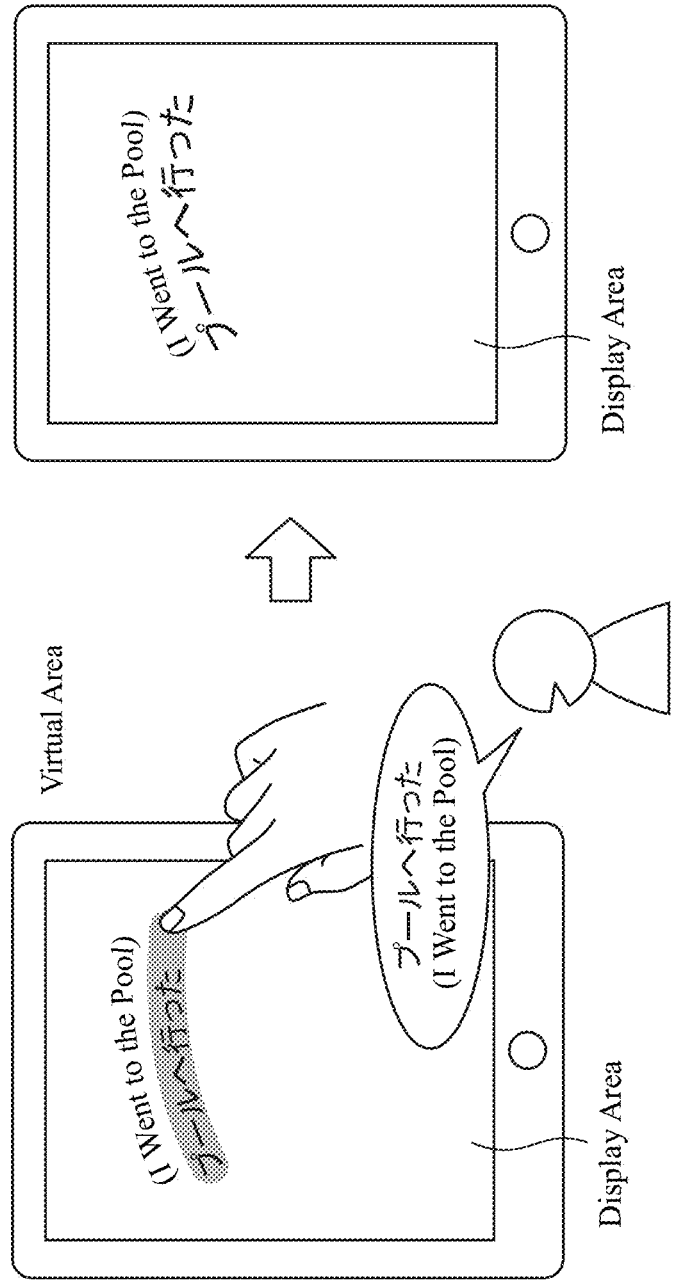
FIG. 28 is an explanatory diagram illustrating an example in which the display control unit 12 increases the character size of characters included in a character string within a range in which the length of the character string is not longer than the length of the curve.

FIG. 28 is an explanatory diagram illustrating an example in which the display control unit 12 increases the character size of the characters included in the character string within the range in which the length of the character string is not longer than the length of the curve.

In the example of FIG. 28, the display control unit 12 increases the character size of each of all the characters included in the character string so that the length of the character string is almost the same as the length of the curve. However, when the length of the character string acquired by the character string acquisition unit 10 is shorter than the length of the curve, the display control unit 12 may cause the entire character string to be displayed in the display area of the display 32 without changing the character size of each of all the characters included in the character string.

In the fourth embodiment described above, the input display control device 100 is configured so that the display control unit 12 makes the length of the character string less than or equal to the length of the curve indicated by the curve information acquired by the curve information acquisition unit 9 by reducing the character size of the character included in the character string a part of which is disposed in the virtual area. Thus, the input display control device 100 can cause all the characters included in the character string acquired by the character string acquisition unit 10 to be displayed in the display area of the display 32 automatically.

Note that, when the extension curve is not drawn and the length of the curve is shorter than the length of the character string, the size of the character included in the character string may be reduced to display the entire character string.

Fifth Embodiment

In the input display system illustrated in FIG. 1, when the character string moving unit 18c accepts movement for disposing the entire character string of which selection is accepted by the character string selection unit 18a in the display area, the display control unit 12 generates display information for displaying the entire character string in the display area.

In a fifth embodiment, the display control unit 12 performs processing of replacing the character string acquired by the character string acquisition unit 10 with a character string having the same meaning as that of the character string and having a length shorter than that of the character string. Then, an input display system will be described in which the display control unit 12 generates display information for displaying a character string after the replacement processing, along the curve indicated by the curve information acquired by the curve information acquisition unit 9.

Figure 29:
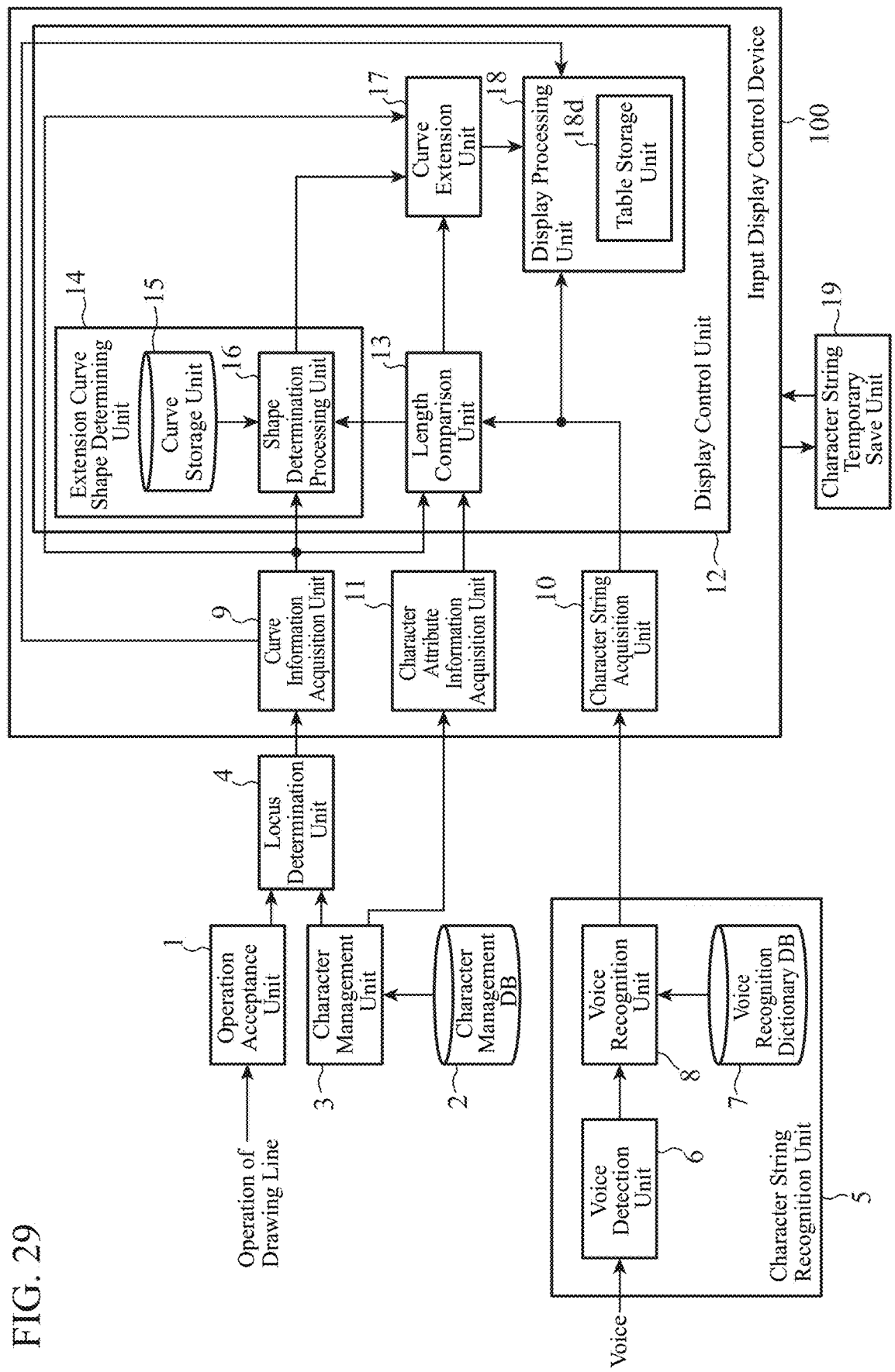
FIG. 29 is a configuration diagram illustrating an input display system including an input display control device according to a fifth embodiment.

FIG. 29 is a configuration diagram illustrating the input display system including an input display control device according to the fifth embodiment. In FIG. 29, since the same reference numerals as those in FIG. 1 denote the same or corresponding portions, the description thereof will be omitted.

The display processing unit 18 is implemented by, for example, the display processing circuit 31 illustrated in FIG. 2.

Unlike the display processing unit 18 illustrated in FIG. 1, the display processing unit 18 includes a table storage unit 18d instead of the character string selection unit 18a, the outline addition unit 18b, and the character string moving unit 18c.

The display processing unit 18 generates display information for displaying the character string acquired by the character string acquisition unit 10 on the display 32 along the curve indicated by the curve information acquired by the curve information acquisition unit 9, and causes the display 32 to display the character string in accordance with the generated display information. The display information generated by the display processing unit 18 is information for displaying the character string acquired by the character string acquisition unit 10 superimposed on the curve image included in the curve information acquired by the curve information acquisition unit 9. The display processing unit 18 causes the display 32 to display the character string superimposed on the curve image in accordance with the display information.

Furthermore, if the comparison result by the length comparison unit 13 indicates that the length of the curve is shorter than the length of the character string, the display processing unit 18 generates display information for displaying, on the display 32, a part of the character string that cannot be displayed superimposed on the curve image along the extension curve added by the curve extension unit 17. The display processing unit 18 causes the display 32 to display the part of the character string in accordance with the generated display information.

Moreover, after causing the display 32 to display the character string, the display processing unit 18 generates display information for erasing the display of the curve image, and causes the display 32 to erase the curve image in accordance with the generated display information.

Figure 30:
FIG. 30 is an explanatory diagram illustrating a table indicating a correspondence between a "character string" and a "simple character string".

The table storage unit 18*d* is implemented by, for example, the storage processing circuit 22 illustrated in FIG. 2. As illustrated in FIG. 30, the table storage unit 18*d* stores a table indicating a correspondence between a "character string" and a "simple character string".

FIG. 30 is an explanatory diagram illustrating the table indicating the correspondence between the "character string" and the "simple character string".

In FIG. 30, a simple character string is referred to as a "simplified version". The "simple character string" has the same meaning as that of the "character string" and having a length shorter than that of the "character string".

The display processing unit 18 acquires a simple character string having a correspondence with the character string acquired by the character string acquisition unit 10 from the table storage unit 18*d*, and replace the character string acquired by the character string acquisition unit 10 with the acquired simple string.

The display processing unit 18 generates display information for displaying the character string after the replacement processing, along the curve indicated by the curve information acquired by the curve information acquisition unit 9.

The display processing unit 18 causes the character string after the replacement processing to be displayed in the display area of the display 32 in accordance with the generated display information.

Next, the operation will be described of the input display control device illustrated in FIG. 29.

Figure 31:
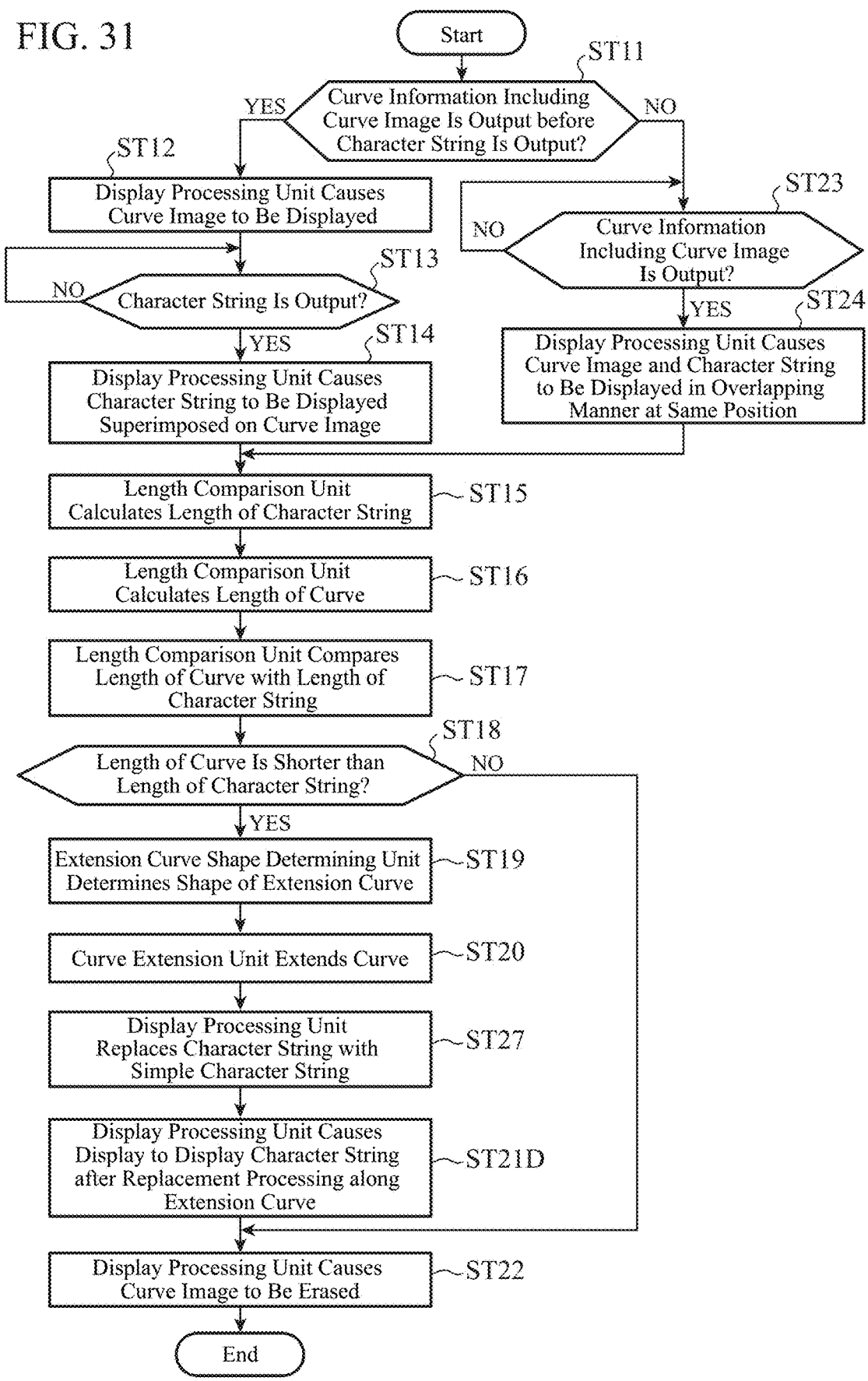
FIG. 31 is a flowchart illustrating an input display control method that is a processing content of the input display system according to the fifth embodiment.

FIG. 31 is a flowchart illustrating an input display control method that is a processing content of the input display system according to the fifth embodiment. In FIG. 31, the same reference numerals as those in FIG. 5 denote the same or corresponding portions.

Since the operation other than the display processing unit 18 is similar to the operation of the input display control device illustrated in FIG. 1, only the operation of the display processing unit 18 will be mainly described here.

For example, when the user utters "I went to eat ramen today", the character string acquisition unit 10 acquires a character string indicating "I went to eat ramen today" from the voice recognition unit 8, and outputs the character string to each of the length comparison unit 13 and the display processing unit 18.

Upon receiving the character string indicating "I went to eat ramen today" from the character string acquisition unit 10, the display processing unit 18 generates display information for displaying the character string superimposed on the curve image, as in the first embodiment.

However, since the length of the character string acquired by the character string acquisition unit 10 is long, a part of the character string protrudes out of the display area of the display 32, so that the display processing unit 18 disposes the part of the character string in the virtual area.

The display processing unit 18 disposes a character string "today" in the virtual area, of the character string indicating "I went to eat ramen today".

To make it possible to display the entire character string in the display area of the display 32, the display processing unit 18 replaces the character string acquired by the character string acquisition unit 10 with a simple character string to shorten the length of the character string (step ST27 in FIG. 31).

Specifically, the display processing unit 18 acquires a simple character string having a correspondence with the character string acquired by the character string acquisition unit 10 from the table storage unit 18*d*.

In the table illustrated in FIG. 30, as a simple character string having a correspondence with a character string indicating "went to eat" of the character string indicating "I went to eat ramen today", "ate" is stored.

Furthermore, in the table illustrated in FIG. 30, as a simple character string having a correspondence with a character string indicating "ramen" of the character string indicating "I went to eat ramen today", a pictogram indicating ramen is stored.

Thus, the display processing unit 18 replaces "went to eat" with "ate", and replaces "ramen" with "pictogram indicating ramen".

Figure 32:
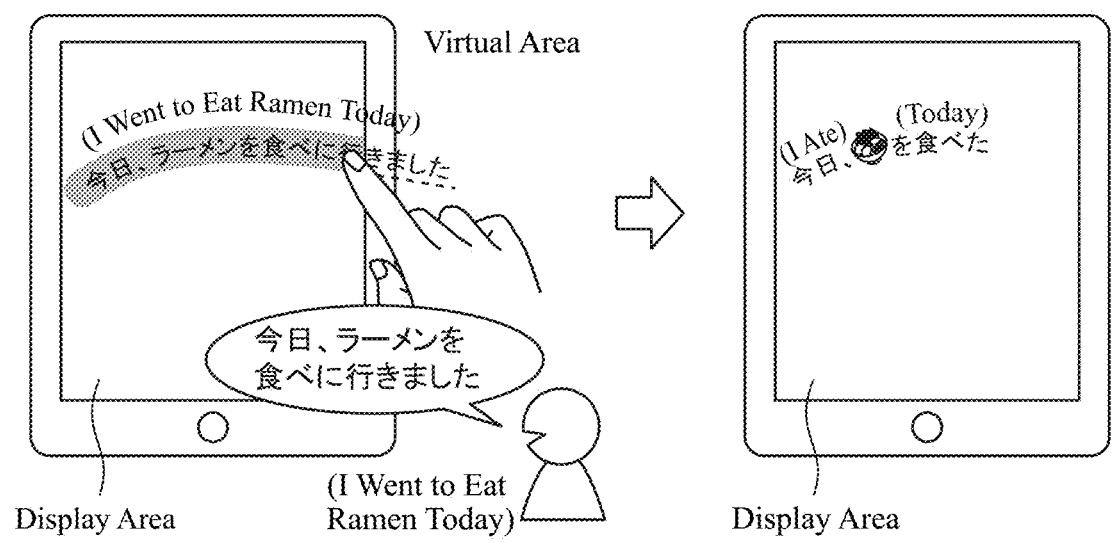
FIG. 32 is an explanatory diagram illustrating an example in which the display control unit 12 causes a character string after replacement processing to be displayed.

The display processing unit 18 generates display information for displaying the character string after the replacement processing, along the curve indicated by the curve information acquired by the curve information acquisition unit 9, and as illustrated in FIG. 32, causes the character string after the replacement processing to be displayed in the display area of the display 32 in accordance with the generated display information (step ST21D in FIG. 31).

FIG. 32 is an explanatory diagram illustrating an example in which the display control unit 12 causes the character string after the replacement processing to be displayed.

In the example of FIG. 32, the display processing unit 18 replaces the character string acquired by the character string acquisition unit 10 with a simple character string, so that the length of the character string is shortened and the entire character string is displayed in the display area of the display 32.

Here, when a part of the character string protrudes out of the display area since the length of the character string acquired by the character string acquisition unit 10 is long, the display processing unit 18 replaces the character string with a simple character string. However, this is only an example, and the display processing unit 18 may replace the character string with a simple character string even when a part of the character string does not protrude out of the display area.

In the fifth embodiment described above, the input display control device 100 is configured so that the display control unit 12 replaces the character string acquired by the character string acquisition unit 10 with a character string having the same meaning as that of the character string and having a length shorter than that of the character string, and generates display information for displaying the replaced character string along the curve indicated by the curve information acquired by the curve information acquisition unit 9. Thus, the input display control device 100 can cause all the characters included in the character string acquired by the character string acquisition unit 10 to be displayed in the display area of the display 32 automatically.

Sixth Embodiment

In a sixth embodiment, the curve information acquisition unit 9 acquires a plurality of pieces of curve information. Then, an input display system will be described in which the display control unit 12 generates display information for displaying the character string acquired by the character string acquisition unit 10 along curves indicated by each of the plurality of pieces of curve information acquired by the curve information acquisition unit 9.

A configuration diagram illustrating the input display system including the input display control device 100 of the sixth embodiment is FIG. 1, as in the first embodiment. However, the display processing unit 18 does not have to include the character string selection unit 18*a*, the outline addition unit 18*b*, and the character string moving unit 18*c*.

Figure 33:
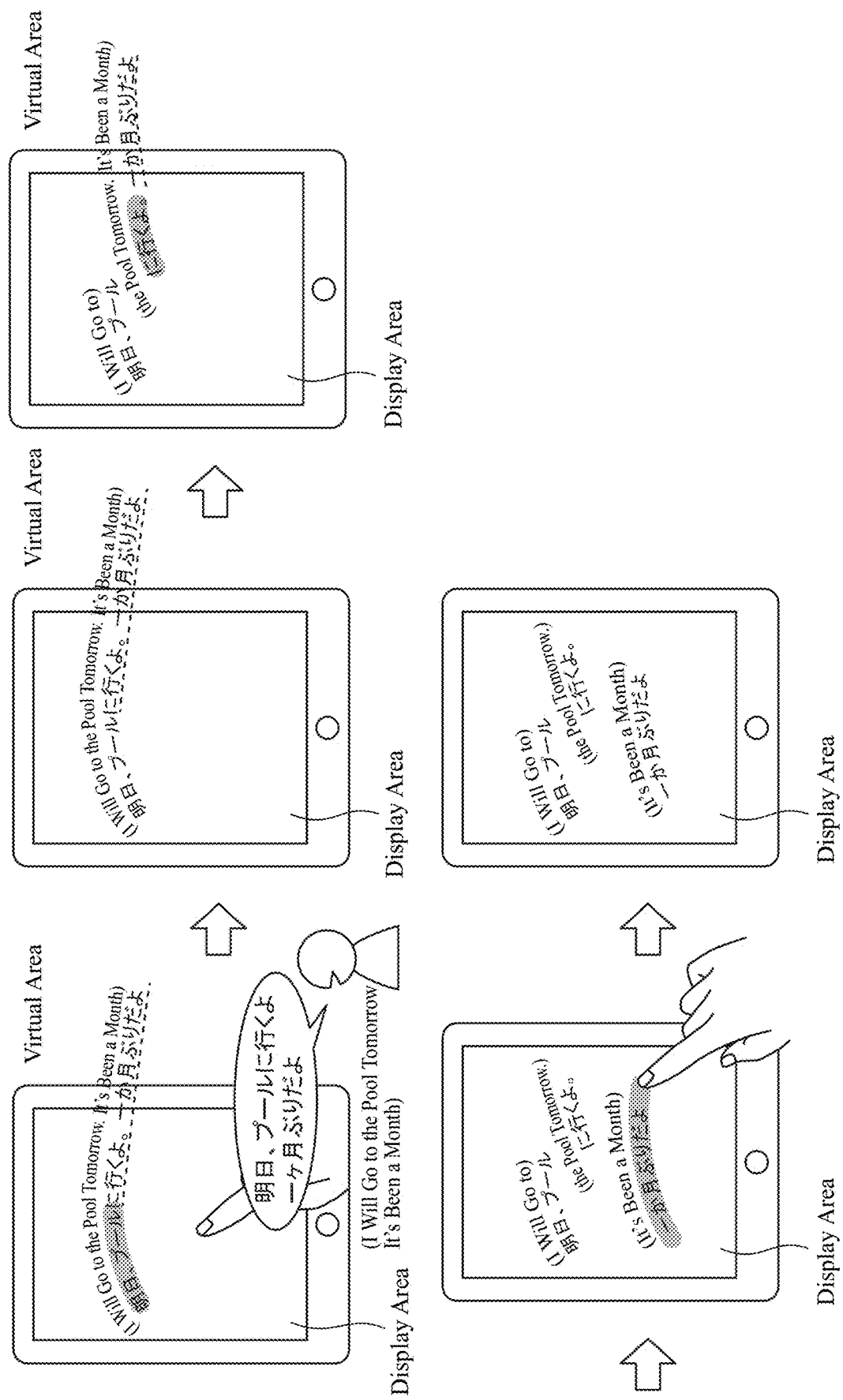
FIG. 33 is an explanatory diagram illustrating an example in which the display control unit 12 causes a character string to be displayed along curves indicated by each of a plurality of pieces of curve information.

FIG. 33 is an explanatory diagram illustrating an example in which the display control unit 12 causes a character string to be displayed along the curves indicated by each of the plurality of pieces of curve information.

Next, the operation of the input display system of the sixth embodiment will be described.

Figure 34:
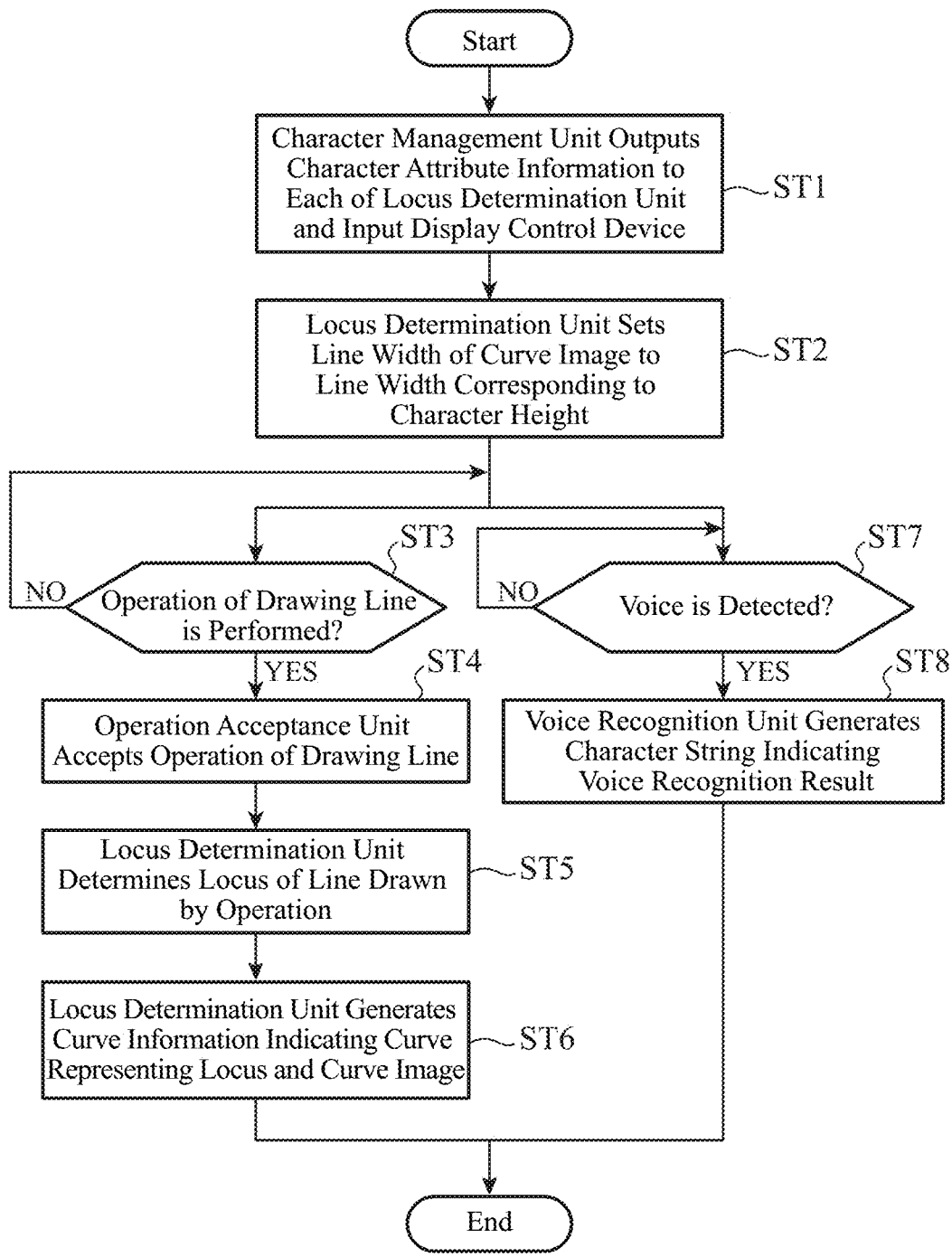
FIG. 34 is a flowchart illustrating an input display control method that is a processing content of an input display system according to a sixth embodiment.

FIG. 34 is a flowchart illustrating an input display control method that is a processing content of the input display system according to the sixth embodiment. In FIG. 34, the same reference numerals as those in FIG. 4 denote the same or corresponding portions.

Upon receiving the content of the operation of drawing the line from the operation acceptance unit 1 (in the case of step ST3: YES in FIG. 34), the locus determination unit 4 determines the locus of the line drawn by the operation from the operation content, and generates, as information indicating the length, shape, and the like of a curve representing the locus, curve information indicating the curve, as in the first embodiment (step ST6 in FIG. 34).

The locus determination unit 4 outputs the curve information including the curve image to the curve information acquisition unit 9, as in the first embodiment.

In the input display system of the sixth embodiment, when the operation acceptance unit 1 receives the content of the operation of drawing a plurality of lines, the locus determination unit 4 generates a plurality of pieces of curve information.

The curve information acquisition unit 9 acquires the curve information output from the locus determination unit 4, and outputs the curve information to each of the length comparison unit 13, the shape determination processing unit 16, the curve extension unit 17, and the display processing unit 18.

For example, when the user utters "I will go to the pool tomorrow, It's been a month", the character string acquisition unit 10 acquires a character string indicating "I will go to the pool tomorrow. It's been a month" from the voice recognition unit 8, and outputs the character string to each of the length comparison unit 13 and the display processing unit 18.

Upon receiving the character string indicating "I will go to the pool tomorrow. It's been a month" from the character string acquisition unit 10, the display processing unit 18 generates display information for displaying the character string superimposed on the curve image, as in the first embodiment.

However, since the length of the character string acquired by the character string acquisition unit 10 is long, a part of the character string protrudes out of the display area of the display 32, so that the display processing unit 18 disposes the part of the character string in the virtual area.

In the example of FIG. 33, of the character string indicating "I will go to the pool tomorrow. It's been a month", a character string within a range that fits in the curve is a character string "I will go to", so that the display processing unit 18 generates display information for displaying the character string "I will go to" along the curve.

Upon causing the character string "I will go to" to be displayed in the display area of the display 32 along the curve in accordance with the generated display information, the display processing unit 18 makes a line break in the character string at a position of the beginning of the character string that is not displayed. In the example of FIG. 33, the line break is made between the character "o" and the character "t". In FIG. 33, "←" represents the line break in the character string.

However, in the input display control system of the sixth embodiment, the display processing unit 18 accepts operation of adding a curve for displaying the character string obtained by the line break before making the line break in the character string.

Upon receiving the content of the operation of drawing the line from the operation acceptance unit 1, the locus determination unit 4 determines the locus of the line drawn by the operation from the operation content, and generates, as information indicating the length, shape, and the like of a curve representing the locus, curve information indicating the curve.

In the example of FIG. 33, the operation acceptance unit 1 accepts operations of drawing two lines, and the locus determination unit 4 generates pieces of curve information for two curves, in accordance with the contents of the corresponding operations of drawing the two lines.

The locus determination unit 4 outputs the generated two pieces of curve information to the curve information acquisition unit 9.

The curve information acquisition unit 9 acquires the two pieces of curve information output from the locus determination unit 4, and outputs the two pieces of curve information to each of the length comparison unit 13, the shape determination processing unit 16, the curve extension unit 17, and the display processing unit 18.

Upon receiving the two pieces of curve information from the curve information acquisition unit 9, the display processing unit 18 generates display information for displaying a character string "the pool tomorrow." along a curve (hereinafter referred to as a first curve) closer to a display position of the character string "I will go to" that is already displayed out of the curves indicated by the two pieces of curve information. Note that, although the closer curve is used as the first curve here, the order in which the curves are drawn may be stored, and the curve in the earlier order may be used as the first curve. Since a character string "It's been a month" does not fit in the first curve, at this stage, the display processing unit 18 only generates display information for displaying the character string "the pool tomorrow.".

Upon causing the character string "the pool tomorrow." to be displayed in the display area of the display 32 along the first curve in accordance with the generated display information, the display processing unit 18 makes a line break in the character string at a position of the beginning of the character string that is not displayed. In the example of FIG. 33, the line break is made between the character "." and the character "I".

The display processing unit 18 generates display information for displaying the character string "It's been a month" along a curve (hereinafter referred to as a second curve) that is not the first curve out of the curves indicated by the two pieces of curve information.

The display processing unit 18 causes the character string "It's been a month" to be displayed in the display area of the display 32 along the second curve in accordance with the generated display information.

In the sixth embodiment described above, the input display control device 100 is configured so that the curve information acquisition unit 9 acquires the plurality of pieces of curve information, and the display control unit 12 generates the display information for displaying the character string acquired by the character string acquisition unit 10 along the curves indicated by each of the plurality of pieces of curve information acquired by the curve information acquisition unit 9. Thus, the input display control device 100 can cause the character string to be displayed in a layout desired by the user even when the length of the character string acquired by the character string acquisition unit 10 is longer than the length of one curve.

Seventh Embodiment

In the input display system of the sixth embodiment, the display processing unit 18 disposes a part of the character string acquired by the character string acquisition unit 10 in the virtual area, and then makes a line break.

In a seventh embodiment, an input display system will be described in which the display processing unit 18 makes a line break in a character string without disposing a part of the character string acquired by the character string acquisition unit 10 in the virtual area.

Figure 35:
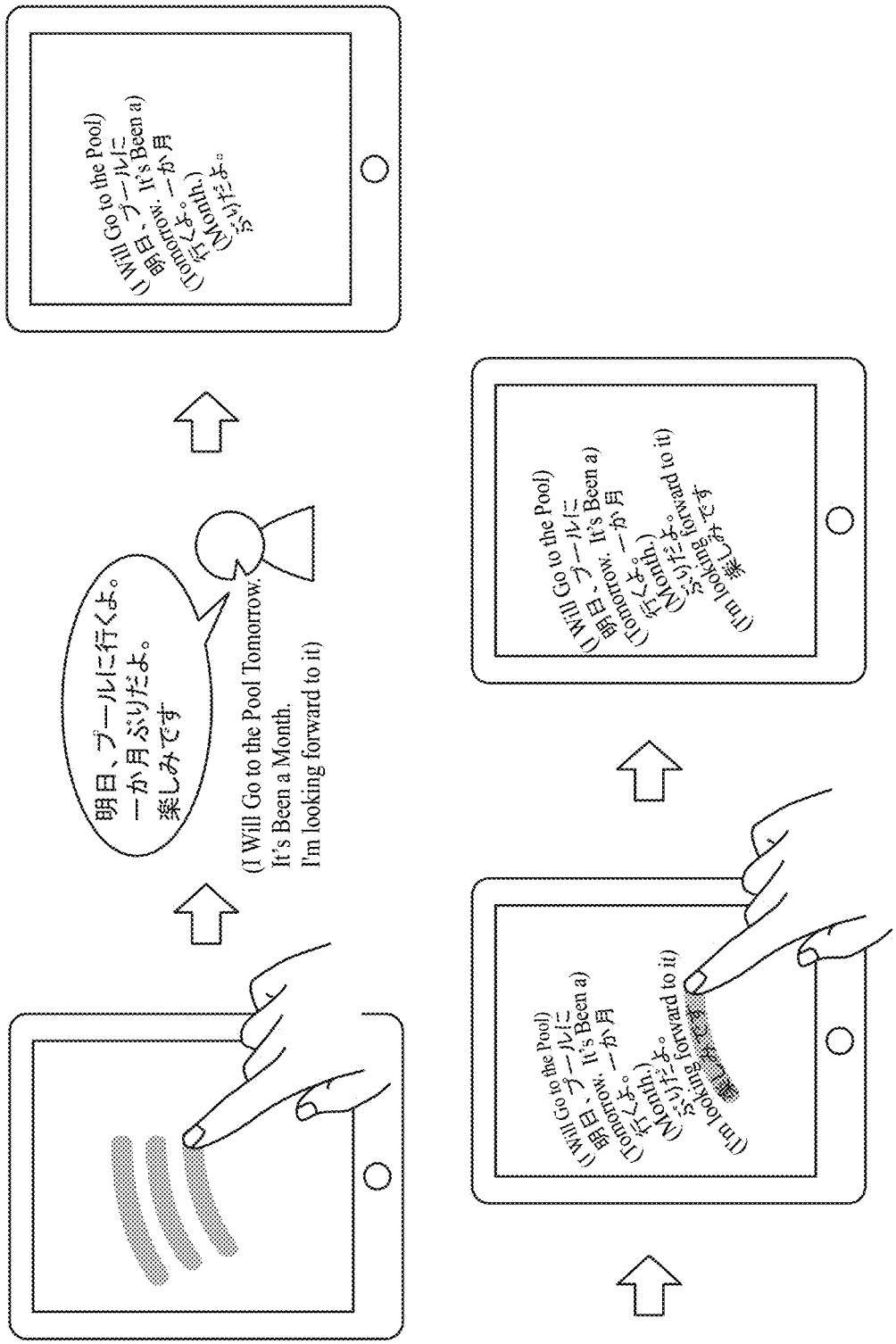
FIG. 35 is an explanatory diagram illustrating an example in which when a user performs operation of drawing a plurality of lines and then the user makes an utterance, the display control unit 12 causes a character string to be displayed along curves indicated by each of a plurality of pieces of curve information.

FIG. 35 is an explanatory diagram illustrating an example in which when the user performs operation of drawing a plurality of lines and then the user makes an utterance, the display control unit 12 causes a character string to be displayed along curves indicated by each of a plurality of pieces of curve information.

In the example in FIG. 35, a case is illustrated where the user first performs operation of drawing three lines, and then utters "I will go to the pool tomorrow. It's been a month. I'm looking forward to it". At this time, since the lengths of curves drawn by the user are shorter than the length of the character string, only "month." is displayed on the third line, and "I'm looking forward to it" is not displayed. The user who sees the display 32 notices that there is no display of "I'm looking forward to it", and additionally performs operation of drawing the fourth line. Then, the display control unit 12 displays the character string "I'm looking forward to it" that is not displayed, along the added fourth curve. In the example of FIG. 35, as described above, the display control unit 12 causes the character string indicating "I will go to the pool tomorrow. It's been a month. I'm looking forward to it." to be displayed along the four curves.

Figure 36:
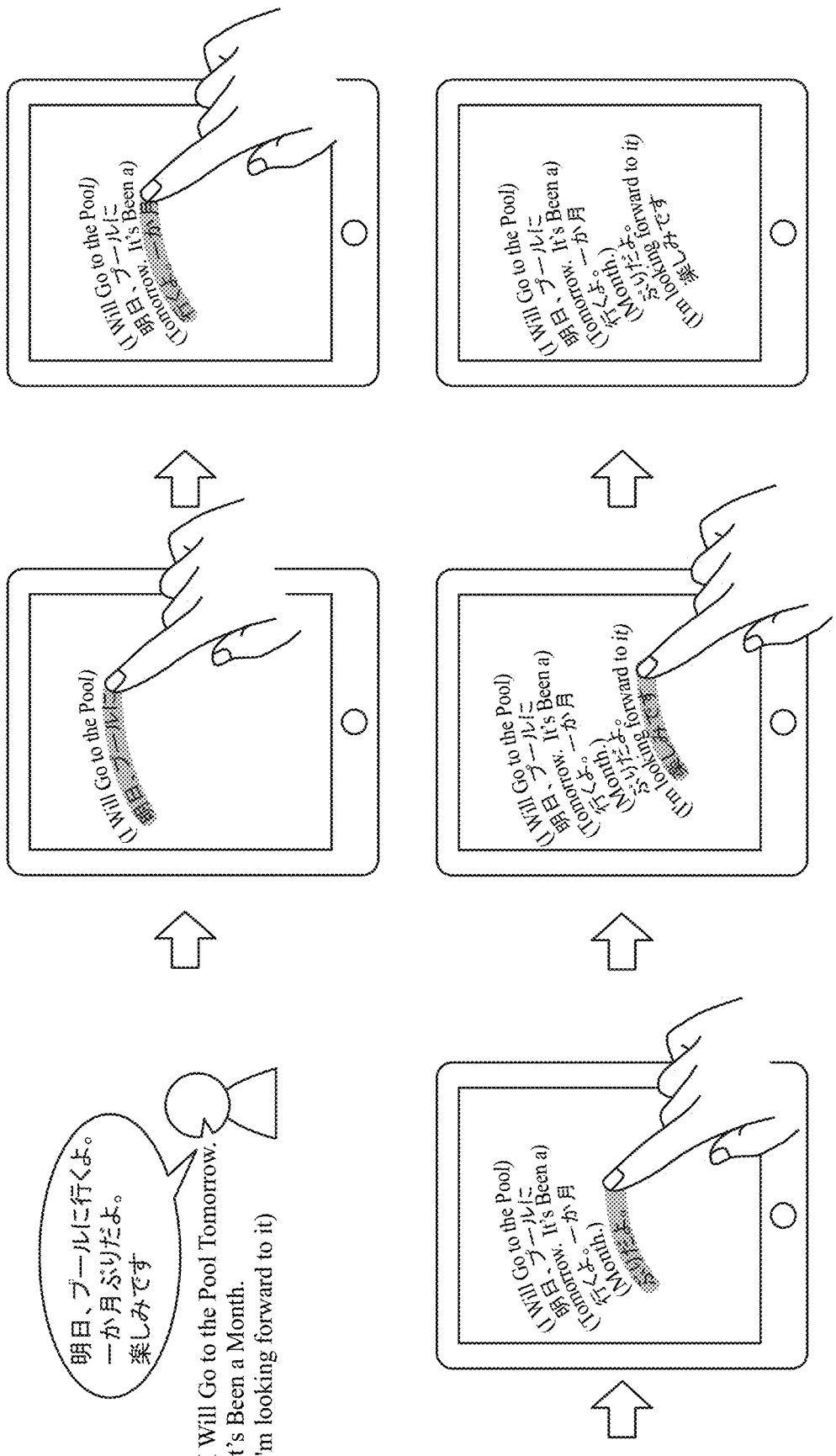
FIG. 36 is an explanatory diagram illustrating an example in which when a user makes an utterance and then the user performs operation of drawing a plurality of lines, the display control unit 12 causes a character string to be displayed along curves indicated by each of a plurality of pieces of curve information.

FIG. 36 is an explanatory diagram illustrating an example in which when the user makes an utterance and then the user performs operation of drawing a plurality of lines, the display control unit 12 causes a character string to be displayed along curves indicated by each of a plurality of pieces of curve information.

In the example of FIG. 36, the display control unit 12 causes the character string indicating "I will go to the pool tomorrow. It's been a month. I'm looking forward to it." to be displayed along the four curves.

In the seventh embodiment described above, the input display control device 100 is configured so that the curve information acquisition unit 9 acquires the plurality of pieces of curve information, and the display control unit 12 generates the display information for displaying the character string acquired by the character string acquisition unit 10 along the curves indicated by each of the plurality of pieces of curve information acquired by the curve information acquisition unit 9. Thus, the input display control device 100 can cause the character string to be displayed in a layout desired by the user even when the length of the character string acquired by the character string acquisition unit 10 is longer than the length of one curve.

Eighth Embodiment

In the input display system illustrated in FIGS. 1 and 29, the display control unit 12 causes the display 32 to display the character string acquired by the character string acquisition unit 10 along the curve indicated by the curve information acquired by the curve information acquisition unit 9.

In an eighth embodiment, an input display system will be described for translating the character string acquired by the character string acquisition unit 10 and causing the display 32 to display a character string indicating a translation result for the character string.

Figure 37:
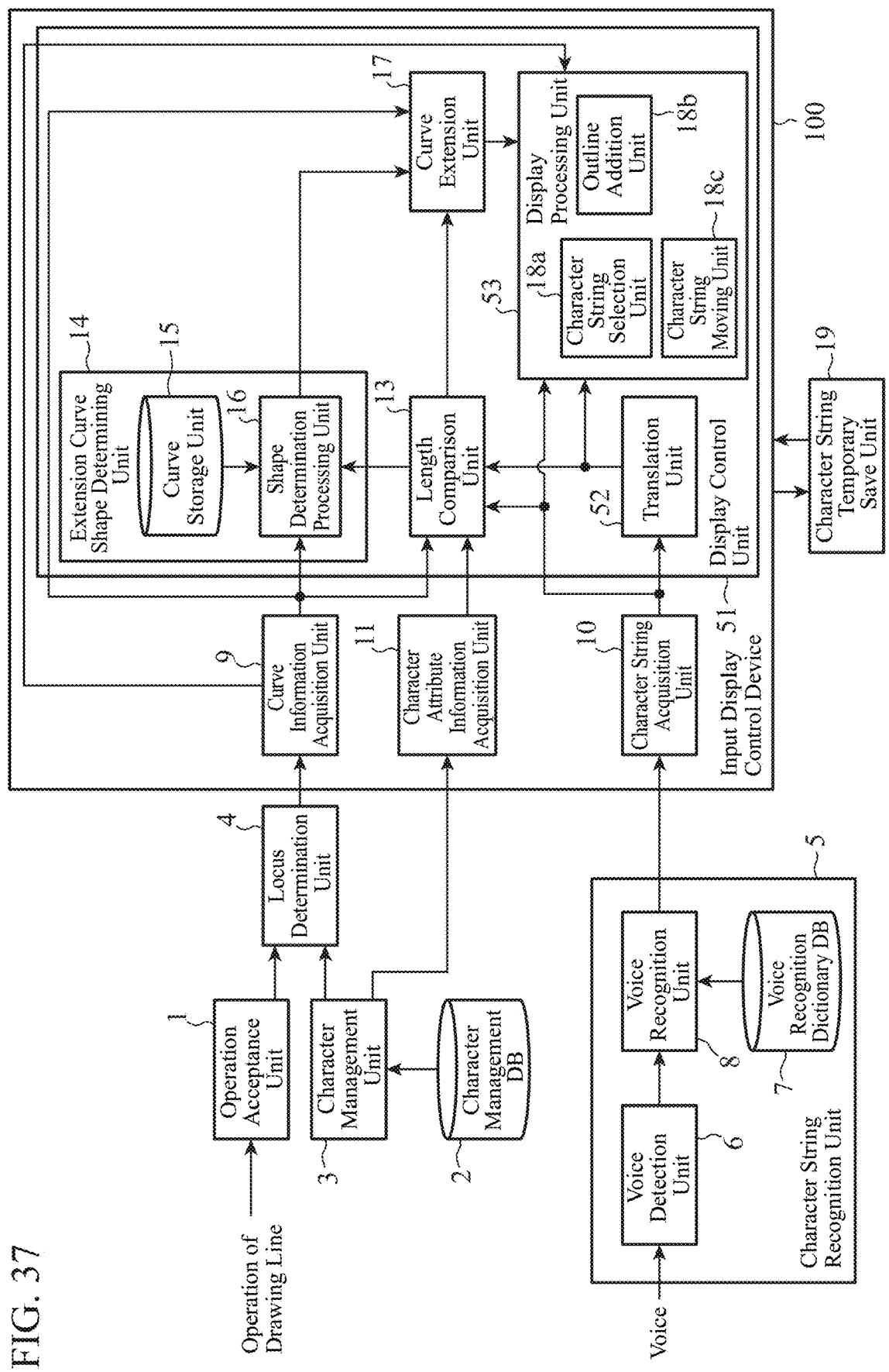
FIG. 37 is a configuration diagram illustrating an input display system including an input display control device according to an eighth embodiment.
Figure 38:
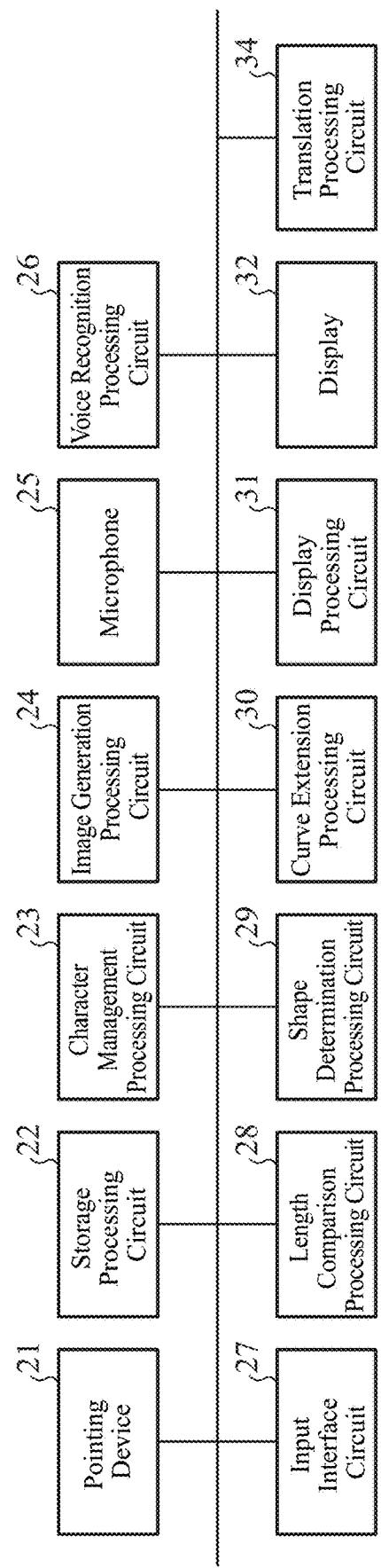
FIG. 38 is a hardware configuration diagram of the input display system according to the eighth embodiment.

FIG. 37 is a configuration diagram illustrating the input display system including an input display control device according to the eighth embodiment, and FIG. 38 is a hardware configuration diagram of the input display system according to the eighth embodiment.

In FIGS. 37 and 38, since the same reference numerals as those in FIGS. 1, 2, and 29 denote the same or corresponding portions, the description thereof will be omitted.

A translation unit 52 is implemented by, for example, the translation processing circuit 34 illustrated in FIG. 38. The translation unit 52 translates the character string acquired by the character string acquisition unit 10, and outputs the character string indicating the translation result for the character string to each of the length comparison unit 13 and a display processing unit 53.

A display control unit 51 includes the length comparison unit 13, the extension curve shape determining unit 14, the curve extension unit 17, the translation unit 52, and the display processing unit 53. The display control unit 51 performs processing similar to that of the display control unit 12 illustrated in FIGS. 1 and 29, and also generates a curve for displaying a translated character string having a length greater than or equal to the length of the character string indicating the translation result output from the translation unit 52. Furthermore, the display control unit 51 generates display information for displaying the character string indicating the translation result by the translation unit 52 on the display 32 along the curve for displaying the translated character string, and causes the display 32 to display the character string indicating the translation result in accordance with the generated display information.

The display processing unit 53 is implemented by, for example, the display processing circuit 31 illustrated in FIG. 38, and includes the character string selection unit 18*a*, the outline addition unit 18*b*, and the character string moving unit 18*c* similarly to the display processing unit 18 illustrated in FIG. 1.

The display processing unit 53 illustrated in FIG. 37 includes the character string selection unit 18*a*, the outline addition unit 18*b*, and the character string moving unit 18*c*. However, this is only an example, and the display processing unit 53 may include the table storage unit 18*d* similarly to the display processing unit 18 illustrated in FIG. 29.

Unlike the display processing unit 18 illustrated in FIGS. 1 and 29, the display processing unit 53 generates the curve for displaying the translated character string having the length greater than or equal to the length of the character string indicating the translation result output from the translation unit 52. The display processing unit 53 causes the display 32 to display the character string indicating the translation result output from the translation unit 52 along the curve for displaying the translated character string.

In FIG. 37, each of the operation acceptance unit 1, the character management DB 2, the character management unit 3, the locus determination unit 4, the character string recognition unit 5, the curve information acquisition unit 9, the character string acquisition unit 10, the character attribute information acquisition unit 11, the length comparison unit 13, the extension curve shape determining unit 14, the curve extension unit 17, the translation unit 52, the display processing unit 53, and the character string temporary save unit 19 that are the components of the input display system, is implemented by dedicated hardware as illustrated in FIG. 38. That is, the input display system is assumed to be one implemented by the pointing device 21, the storage processing circuit 22, the character management processing circuit 23, the image generation processing circuit 24, the microphone 25, the voice recognition processing circuit 26, the input interface circuit 27, the length comparison processing circuit 28, the shape determination processing circuit 29, the curve extension processing circuit 30, the display processing circuit 31, the display 32, and the translation processing circuit 34.

However, the input display system may be one implemented by software, firmware, or a combination of software and firmware.

When the input display system is implemented by software or firmware or the like, the character management DB 2, the voice recognition dictionary DB 7, and the character string temporary save unit 19 are configured on the memory 41 of the computer illustrated in FIG. 3, and a program for causing the computer to execute processing procedures for the operation acceptance unit 1, the character management unit 3, the locus determination unit 4, the voice detection unit 6, the voice recognition unit 8, and the display control unit 51 is stored in the memory 41. Then, it is sufficient that the processor 42 illustrated in FIG. 3 executes the program stored in the memory 41.

Next, the operation of the input display system illustrated in FIG. 37 will be described.

However, since the components other than the translation unit 52 and the display processing unit 53 are similar to those of the input display system according to any one of the first to seventh embodiments, here, a processing content of the translation unit 52 and the display processing unit 53 will be mainly described.

When the character string acquisition unit 10 acquires a character string indicating the voice recognition result output from the character string recognition unit 5, the translation unit 52 translates the acquired character string, and outputs a character string indicating the translation result for the character string to each of the length comparison unit 13 and the display processing unit 53.

If the character string indicating the voice recognition result is "I went to the sea in summer vacation", for example, the character string indicating the translation result for the character string is "I went to the sea in summer vacation".

Similarly to the display processing unit 18 of FIG. 1 or 29, the display processing unit 53 causes the character string indicating the voice recognition result acquired by the character string recognition unit 5 to be displayed superimposed on the curve image acquired by the curve information acquisition unit 9.

Furthermore, if it is not possible to cause a part of the character string to be displayed along the curve since the length of the curve indicated by the curve information is shorter than the length of the character string, the display processing unit 53 causes the display 32 to display the part of the character string along the extension curve added by the curve extension unit 17, similarly to the display processing unit 18 of FIG. 1 or 29.

Upon receiving the character string indicating the translation result from the translation unit 52, the display processing unit 53 generates the curve for displaying the translated character string having the length greater than or equal to the length of the character string indicating the translation result.

At this time, character attribute information indicating the character width of the characters constituting the character string indicating the translation result is received from the character management unit 3.

For example, if the character string indicating the translation result is "I went to the sea in summer vacation", the number of characters is 36 including spaces. Thus, if the character width of the characters constituting the character string indicating the translation result is "2 mm", the length of the character string indicating the translation result is 72 mm as indicated in the following equation (5).

$$\text{Length of character string indicating translation result} = 2 \text{ mm} \times 36 = 72 \text{ mm} \quad (5)$$

Thus, in this case, the length of the curve for displaying the translated character string is greater than or equal to 72 mm.

Furthermore, the shape of the curve for displaying the translated character string is the same as the shape of the curve representing the locus of the line drawn by the user's operation, that is, the shape of the curve indicated by the curve information acquired by the curve information acquisition unit 9. When the curve is extended by the curve extension unit 17, the shape is the same as the shape of the curve extended by the curve extension unit 17.

For example, if the shape of the curve representing the locus of the line drawn by the user's operation is an arc shape, the shape of the curve for displaying the translated character string is also the arc shape. If the shape of the curve representing the locus of the line drawn by the user's operation is a wavy line shape, the shape of the curve for displaying the translated character string is also the wavy line shape.

Note that, when the curve is extended by the curve extension unit 17 and the length of the curve for displaying the translated character string is longer than the length of the curve extended by the curve extension unit 17, or when the curve is not extended by the curve extension unit 17 and the length of the curve for displaying the translated character string is longer than the length of the curve indicated by the curve information acquired by the curve information acquisition unit 9, the curve for displaying the translated character string is extended. For the extension of the curve for displaying the translated character string, a method similar to the case of extending the curve indicated by the curve information is used. Specifically, the shape of the extension portion of the curve for displaying the translated character string is determined from the shape of the curve for displaying the translated character string, and the curve for displaying the translated character string is extended.

Upon generating the curve for displaying the translated character string, the display processing unit 53 generates display information for displaying the character string indicating the translation result on the display 32 along the curve for displaying the translated character string, and causes the display 32 to display the character string indicating the translation result in accordance with the display information.

Here, FIG. 39 is an explanatory diagram illustrating an example of display processing in the display processing unit 53 of the display control unit 51.

In step A, the display processing unit 53 displays a curve image of the curve representing the locus of the line drawn by the user's operation on the display 32.

When the voice recognition unit 8 performs recognition processing of the user's voice in step B, the display processing unit 53 causes the character string indicating the voice recognition result to be displayed superimposed on the curve image in step C. Steps A to C are the same as those in the first embodiment. However, here, an example is illustrated in a case where the curve information including the curve image is output from the locus determination unit 4 before the character string indicating the voice recognition result is output from the voice recognition unit 8.

In step D, the display processing unit 53 causes the display 32 to display the character string indicating the translation result along the curve for displaying the translated character string having the same shape as the curve representing the locus of the line drawn by the user's operation.

In the example of FIG. 39, the display processing unit 53 arranges the curve for displaying the translated character string on the lower side of the curve representing the locus of the line drawn by the user's operation, but the curve for displaying the translated character string may be arranged on the upper side of the curve representing the locus of the line drawn by the user's operation, or may be arranged on the left side or the right side.

In step E, the display processing unit 53 erases the curve image of the curve representing the locus of the line drawn by the user's operation.

In the input display system of the eighth embodiment, the display processing unit 53 causes the display 32 to display the curve for displaying the translated character string. However, this is only an example, and the curve for displaying the translated character string may be transparent.

In the input display system of the eighth embodiment, the character string indicating the voice recognition result and the character string indicating the translation result are displayed side by side. However, this is only an example, and as illustrated in FIG. 40, the display processing unit 53 may cause the character string indicating the voice recognition result to be displayed in step C, and then the character string indicating the translation result to be displayed from the beginning side superimposed on the curve image while causing the character string indicating the voice recognition result to be erased from the beginning side in step D. In this case, the finally displayed character string is only the character string indicating the translation result.

FIG. 40 is an explanatory diagram illustrating an example of display processing in the display processing unit 53 of the display control unit 51.

In the input display system of the eighth embodiment, as illustrated in FIG. 41, the display processing unit 53 may cause the character string indicating a result of back translation to be displayed side by side with the character string indicating the voice recognition result and the character string indicating the translation result. FIG. 41 is an explanatory diagram illustrating an example of displaying the character string indicating the translation result.

In the input display system of the eighth embodiment, the translation unit 52 performs translation from Japanese into English, so that the back translation in this case means that the translation result is retranslated from English into Japanese.

In the example of FIG. 41, in step D, the display processing unit 53 causes a character string in English indicating the translation result to be displayed under a character string in Japanese indicating the voice recognition result, and causes a character string in Japanese indicating the back translation to be displayed under the character string in English.

Furthermore, as illustrated in FIG. 42, in step D, the display processing unit 53 erases the character string in Japanese indicating the voice recognition result displayed superimposed on the curve image, and then causes the character string in English indicating the translation result to be displayed superimposed on the curve image. Then, the display processing unit 53 may cause the character string in Japanese indicating the back translation to be displayed under the character string in English. FIG. 42 is an explanatory diagram illustrating an example of displaying the character string indicating the translation result.

In the eighth embodiment described above, the input display control device 100 is configured so that the translation unit 52 is included for translating the character string acquired by the character string acquisition unit 10, and the display processing unit 53 generates the curve for displaying the translated character string having the length greater than or equal to the length of the character string indicating the translation result output from the translation unit 52, and generates the display information for displaying the character string indicating the translation result on the display 32 along the curve for displaying the translated character string. Thus, the input display control device 100 can cause the entire character string to be displayed along the curve even when the length of the curve representing the locus of the line drawn by the operation of drawing the line is shorter than the character string indicating the translation result.

In the input display system of the eighth embodiment, the display processing unit 53 causes the character string indicating the voice recognition result and the character string indicating the translation result to be displayed side by side. However, this is only an example, and when the display processing unit 53 has a face-to-face configuration in which the display 32 includes two screens and the top sides of the two screens are in contact with each other as illustrated in FIG. 43, the display processing unit 53 may perform display as follows.

Figure 43:
FIG. 43 is an explanatory diagram illustrating an example of display processing in the display processing unit 53 when the display 32 includes two face-to-face screens.

FIG. 43 is an explanatory diagram illustrating an example of display processing in the display processing unit 53 when the display 32 includes two face-to-face screens.

For example, the display processing unit 53 causes the character string indicating the voice recognition result to be displayed on the lower screen of the two face-to-face screens in the figure, and causes the character string indicating the translation result to be displayed on the upper screen of the two face-to-face screens in the figure.

Alternatively, the display processing unit 53 causes the character string indicating the translation result to be displayed on the lower screen of the two face-to-face screens, and causes the character string indicating the voice recognition result to be displayed on the upper screen of the two face-to-face screens.

However, since it is the two face-to-face screens, the characters are rotated 180 degrees on the upper screen of the two face-to-face screens.

Figure 44:
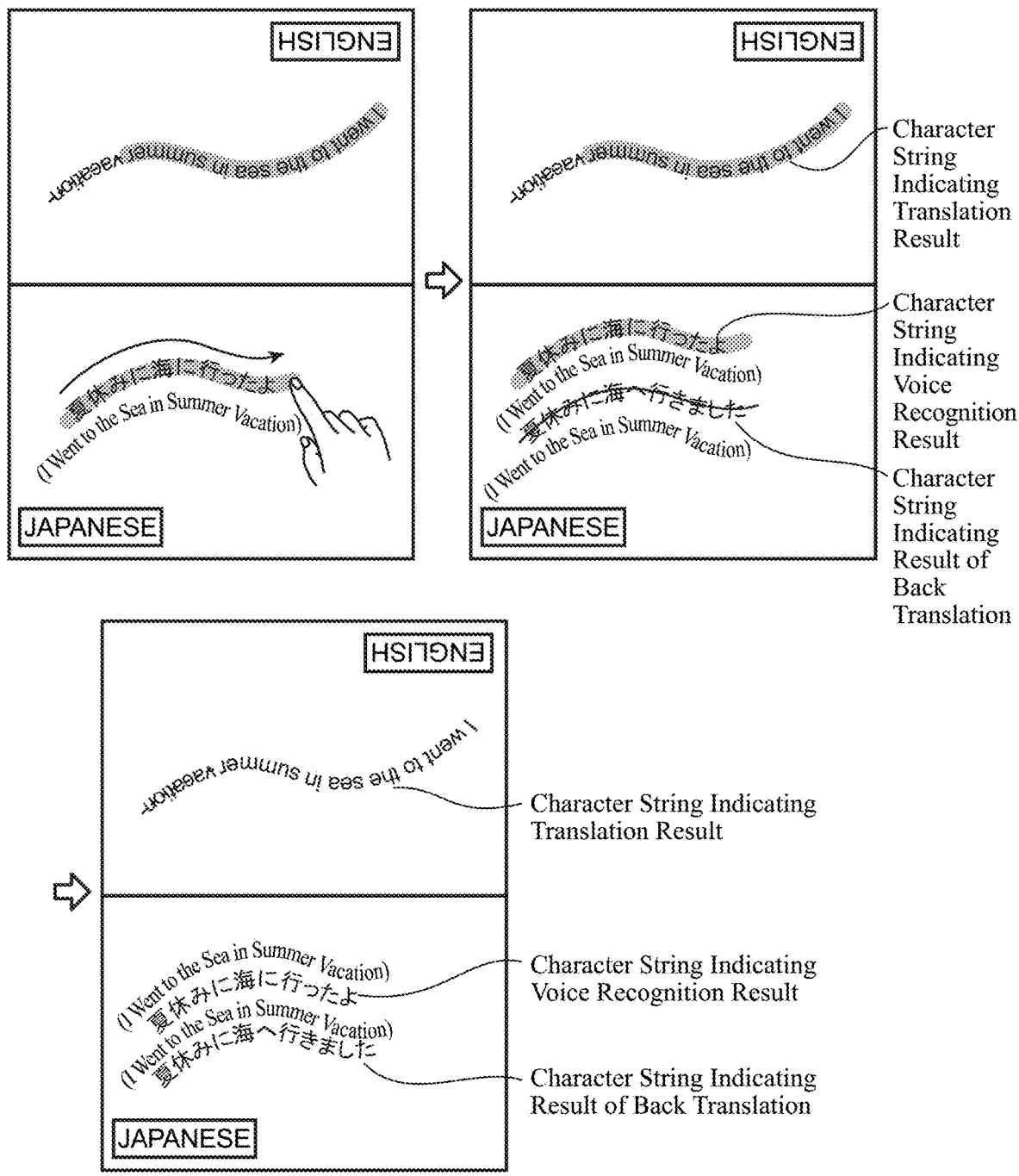
FIG. 44 is an explanatory diagram illustrating an example of displaying a character string indicating a translation result.

Furthermore, even in the case of the two face-to-face screens, the display processing unit 53 may cause the character string indicating the result of the back translation to be displayed, as illustrated in FIG. 44. FIG. 44 is an explanatory diagram illustrating an example of displaying the character string indicating the translation result.

Note that, also in the eighth embodiment, as in the first embodiment, the input display control device 100 may be configured so that when a part of the character string acquired by the character string acquisition unit 10 protrudes out of the display area of the display 32 since the length of the character string acquired by the character string acquisition unit 10 is long, the part of the character string is disposed in the virtual area that is an area surrounding the display area.

Furthermore, when a part of the character string indicating the translation result protrudes out of the display area of the display 32, the part of the character string indicating the translation result may be disposed in the virtual area. By doing so, it is possible to avoid a situation in which the character string indicating the translation result cannot be generated.

In a case where the character string indicating the translation result is generated in the virtual area, when the user selects the character string indicating the translation result, an outline of a color different from the character may be added to the contour of the character included in the character string, as in the first embodiment.

Moreover, as in the first embodiment, the movement of the selected character string may be accepted. By doing so, it is possible to avoid a situation in which the entire character string indicating the translation result cannot be displayed.

Furthermore, when the user selects and moves either or both of the character string acquired by the character string acquisition unit 10 and the character string indicating the translation result, the acquired character string and the character string indicating the translation result may be moved together. By doing so, it is possible to prevent the characters from being arranged at distant positions after the movement. Note that, a configuration is also possible in which movements are separately performed.

Moreover, similarly to the above, the back translation may be generated to straddle a border between the display area and the virtual area, and made selectable by the user and moved after the selection, whereby the entire character string may be displayed.

Ninth Embodiment

In the input display system illustrated in FIGS. 1 and 29, the character string recognition unit 5 acquires the character string indicating the voice recognition result as the character string to be displayed.

In a ninth embodiment, an input display system will be described in which a character string recognition unit 60 acquires a character string indicating the recognition result of characters drawn by the operation accepted by the operation acceptance unit 1, as the character string to be displayed.

Figure 45:
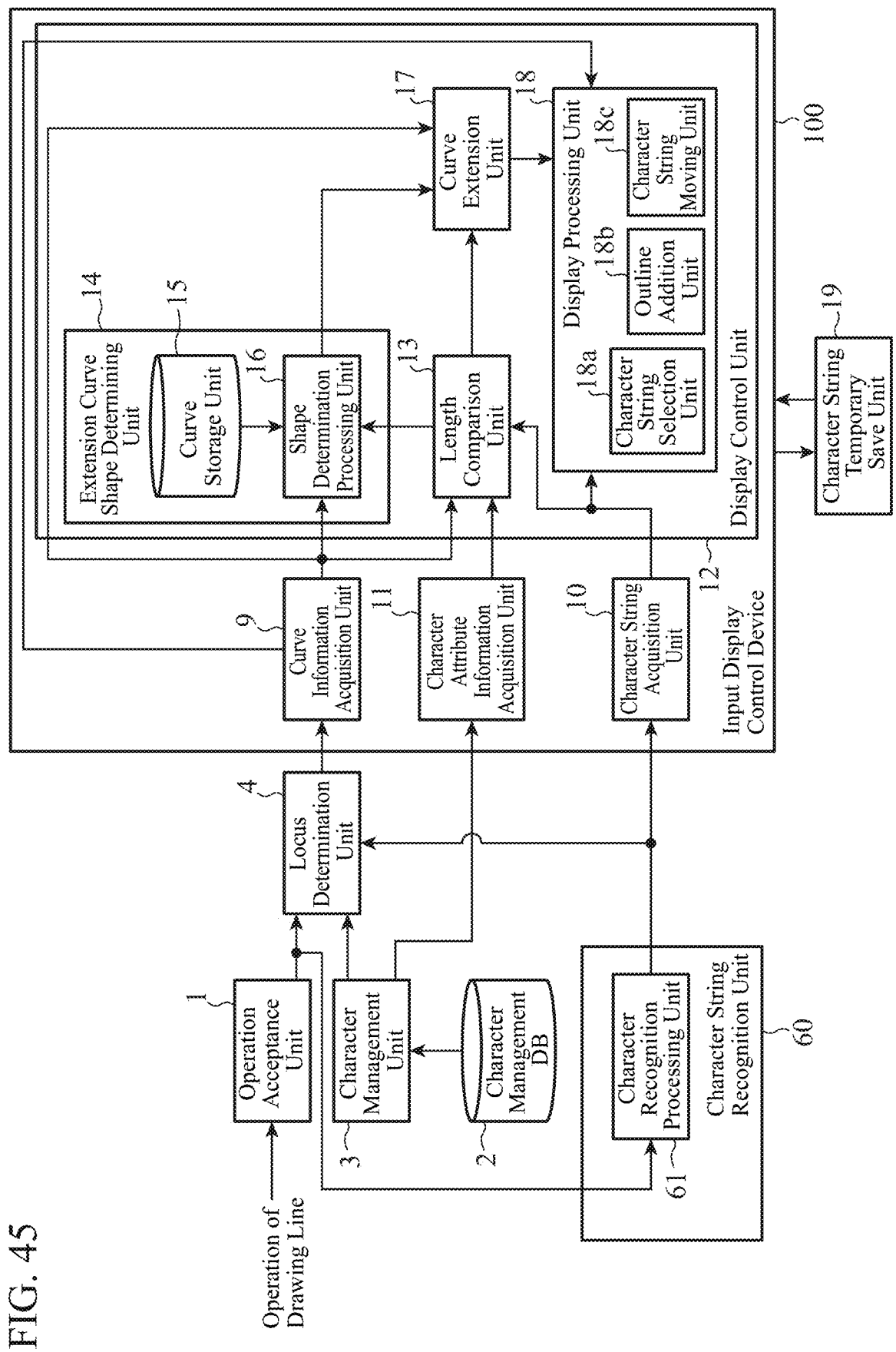
FIG. 45 is a configuration diagram illustrating an input display system including an input display control device according to a ninth embodiment.
Figure 46:
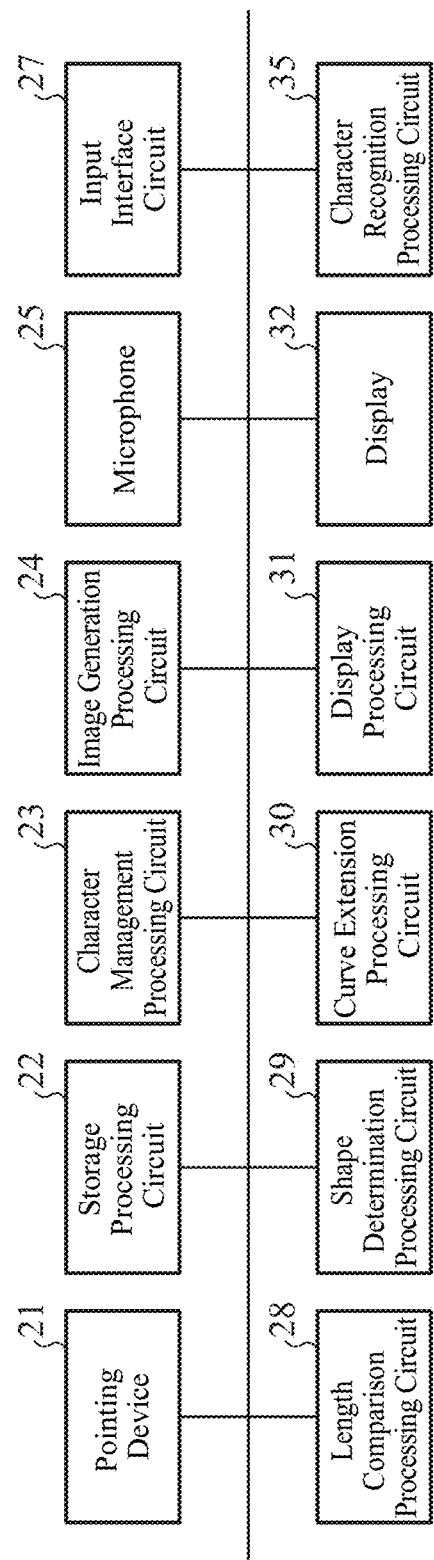
FIG. 46 is a hardware configuration diagram of the input display system according to the ninth embodiment.

FIG. 45 is a configuration diagram illustrating the input display system including an input display control device according to the ninth embodiment, and FIG. 46 is a hardware configuration diagram of the input display system according to the ninth embodiment.

In FIGS. 45 and 46, since the same reference numerals as those in FIGS. 1 and 2 denote the same or corresponding portions, the description thereof will be omitted.

The character string recognition unit 60 includes a character recognition processing unit 61, and outputs the character string indicating the recognition result of the characters drawn by the operation accepted by the operation acceptance unit 1 as a character string to be displayed, to each of the locus determination unit 4 and the character string acquisition unit 10.

The character recognition processing unit 61 is implemented by, for example, a character recognition processing circuit 35 in which an optical character recognition (OCR) function that is optical character recognition processing is implemented. The character recognition processing unit 61 recognizes the characters drawn by the operation accepted by the operation acceptance unit 1, and outputs the character string indicating the recognition result of the characters, as the character string to be displayed, to each of the locus determination unit 4 and the character string acquisition unit 10.

In FIG. 45, each of the operation acceptance unit 1, the character management DB 2, the character management unit 3, the locus determination unit 4, the character string recognition unit 60, the curve information acquisition unit 9, the character string acquisition unit 10, the character attribute information acquisition unit 11, the length comparison unit 13, the extension curve shape determining unit 14, the curve extension unit 17, the display processing unit 18, and the character string temporary save unit 19 that are components of the input display system, is implemented by dedicated hardware as illustrated in FIG. 46. That is, the input display system is assumed to be one implemented by the pointing device 21, the storage processing circuit 22, the character management processing circuit 23, the image generation processing circuit 24, the microphone 25, the voice recognition processing circuit 26, the input interface circuit 27, the length comparison processing circuit 28, the shape determination processing circuit 29, the curve extension processing circuit 30, the display processing circuit 31, the display 32, and the character recognition processing circuit 35.

However, the input display system may be one implemented by software, firmware, or a combination of software and firmware.

When the input display system is implemented by software or firmware or the like, the character management DB 2 and the character string temporary save unit 19 are configured on the memory 41 of the computer illustrated in FIG. 3, and a program for causing the computer to execute processing procedures for the operation acceptance unit 1, the character management unit 3, the locus determination unit 4, the character recognition processing unit 61, and the display control unit 12 is stored in the memory 41. Then, it is sufficient that the processor 42 illustrated in FIG. 3 executes the program stored in the memory 41.

FIG. 47 is an explanatory diagram illustrating an example of processing of displaying a character string indicating a character recognition result.

Next, the operation of the input display system illustrated in FIG. 45 will be described.

In the input display system illustrated in FIG. 45, it is assumed that the pointing device 21 implementing the operation acceptance unit 1 is a touch panel. Thus, when the user performs operation of drawing characters as operation of drawing lines on the touch panel by using one's finger or an input pen for the touch panel, the operation acceptance unit 1 accepts the operation of drawing the characters, and outputs a content of the operation to each of the locus determination unit 4 and the character string recognition unit 60.

The content of the operation of drawing the characters to be output is, for example, time-series data indicating a continuous change of position coordinates on the touch panel as coordinates of a position of the finger or a position of the input pen in contact with the touch panel.

In the example of FIG. 47, in step A, the user handwrites a character string "I want to eat Japanese food".

The character recognition processing unit 61 of the character string recognition unit 60 recognizes multiple characters drawn by the operation accepted by the operation acceptance unit 1, acquires a character string indicating the recognition result of the multiple characters, and outputs the acquired character string to each of the locus determination unit 4 and the input display control device 100.

Upon receiving the content of the operation of drawing one or more characters from the operation acceptance unit 1 and receiving the character string from the character recognition processing unit 61, the locus determination unit 4 performs processing of allocating the content of the operation of drawing the one or more characters for each character.

Specifically, it is as follows.

First, the locus determination unit 4 identifies a coordinate $X_{LEFT}$ having the smallest X coordinate and a coordinate $X_{RIGHT}$ having the largest X coordinate among the position coordinates on the touch panel indicated by the time-series data that is the content of the operation of drawing the characters. The locus determination unit 4 calculates the length in the X direction of the character string by subtracting the coordinate $X_{LEFT}$ from the coordinate $X_{RIGHT}$ identified.

Then, the locus determination unit 4 calculates the length in the X direction per character by dividing the length in the X direction of the character string by the number of characters, and also calculates a coordinate range in the X direction where each character exists, from the length in the X direction per character and the coordinates $X_{LEFT}$. For example, the coordinate range in the X direction where the nth character from the left end of the character string exists is calculated as (length in the X direction per character×(n−1)+$X_{LEFT}$) to (length in the X direction per character×n+$X_{LEFT}$).

The locus determination unit 4 finds the coordinate range in the X direction including each position coordinate indicated by the time-series data, and allocates it to the coordinate range in the X direction corresponding to each position coordinate indicated by the time-series data, thereby allocating the content of the operation of drawing the one or more characters for each character.

Next, for a coordinate range unit in the X direction, the locus determination unit 4 calculates an average value of X coordinates and an average value of Y coordinates of multiple position coordinates indicated by the time-series data included in the coordinate range, as the center coordinates of the character corresponding to the coordinate range.

Upon calculating the center coordinates of each character included in the character string, the locus determination unit 4 generates one line by connecting the center coordinates of the respective characters as illustrated in step B of FIG. 47, sets the one line as a curve representing the locus of the character string, and outputs curve information indicating the curve to the input display control device 100.

Here, assuming that the sizes of the characters included in the character string are equal, the length in the X direction per character is calculated by dividing the length in the X direction of the character string by the number of characters. In the case of handwritten characters, the sizes of the characters are not always equal, so the coordinate range unit in the X direction may not match each character included in the character string.

However, in the input display system illustrated in FIG. 45, even if the center coordinates of each character are not exactly known, if the center coordinates are known of each area obtained by dividing an area where the character string exists in the X direction, a curve indicating an arrangement direction of the character string can be obtained. Thus, even when the sizes of the characters are not equal, the curve can be obtained by the above method.

Furthermore, here, when the locus determination unit 4 obtains the curve indicating the arrangement direction of the character string, each position coordinate indicated by the time-series data is allocated to the coordinate range unit in the X direction; however, for example, when the handwritten characters are written vertically, each position coordinate indicated by the time-series data may be allocated to a coordinate range unit in the Y direction.

It goes without saying that the method of allocating each position coordinate described here is only an example, and other methods may be used.

In the input display system illustrated in FIG. 45, the curve is obtained from the operation content of drawing characters. However, this is only an example, and when the user performs the operation of drawing a line described in the first embodiment separately from the operation of drawing characters and thus the operation acceptance unit 1 accepts the operation of drawing the characters and the operation of drawing the line, the locus determination unit 4 may determine the curve representing the locus of the drawn line from a content of the operation of drawing the line accepted by the operation acceptance unit 1.

When the character string acquisition unit 10 acquires the character string output from the character recognition processing unit 61 of the character string recognition unit 60, the display processing unit 18 generates display information for displaying the character string on the display 32 along the curve indicated by the curve information acquired by the curve information acquisition unit 9. The display processing unit 18 causes the display 32 to display the character string in accordance with the generated display information.

In step C of FIG. 47, the display processing unit 18 draws a curve representing a locus so that the locus and the handwritten characters are arranged side by side, and causes the character string to be displayed. However, this is not limited thereto, and the display processing unit 18 may, for example, cause the handwritten characters to be erased and then draw a curve at a position of the handwritten characters and cause the character string to be displayed.

Furthermore, the curve representing the locus may be transparent.

In the input display system illustrated in FIG. 45, the locus determination unit 4 can obtain the curve from the operation content of drawing characters. However, as in the first embodiment, the recognized character string is displayed with characters having predetermined attributes. Thus, when the length of the obtained curve is shorter than the length of the character string, the display processing unit 18 cannot cause some characters included in the character string to be displayed along the curve, as in the first embodiment.

In this case, as in the first embodiment, the curve extension unit 17 extends the curve, so that the display processing unit 18 causes some characters that are not displayed to be displayed.

Specifically, the length comparison unit 13 compares the length of the curve with the length of the character string, the extension curve shape determining unit 14 determines the shape of the extension curve, and the curve extension unit 17 adds the extension curve to the curve indicated by the curve information acquired by the curve information acquisition unit 9, whereby the curve is extended. Then, the display processing unit 18 causes some characters that are not displayed to be displayed along the extension curve.

In the ninth embodiment described above, the input display system is configured so that the character string recognition unit 60 recognizes the characters drawn by the operation accepted by the operation acceptance unit 1, and the character recognition processing unit 61 is included for acquiring the character string indicating the character recognition result as the character string to be displayed. Thus, even when the handwritten character is displayed, the input display system can avoid a situation in which the entire character string cannot be displayed, as in the first embodiment.

Note that, in the ninth embodiment as well, as in the first embodiment, when the length of the character string indicating the recognition result is long and thus a part of the character string protrudes out of the display area of the display 32, the input display control device 100 may be configured so that the part of the character string is disposed in the virtual area that is an area surrounding the display area.

Furthermore, in a case where the character string indicating the recognition result is disposed in the virtual area, when the user selects the character string, an outline of a color different from the character may be added to the contour of the character included in the character string, as in the first embodiment.

Moreover, the movement of the selected character string may be accepted. By doing so, it is possible to avoid a situation in which the entire character string indicating the recognition result cannot be generated.

Furthermore, when the user selects and moves either or both of the handwritten character string and the character string indicating the recognition result, the handwritten character string and the character string indicating the recognition result may be moved together. By doing so, it is possible to prevent the characters from being arranged at distant positions after the movement. Note that, a configuration is also possible in which movements are separately performed.

Tenth Embodiment

In the input display system illustrated in FIG. 45, an example is illustrated in which the character string recognition unit 60 including the character recognition processing unit 61 is applied to the input display control device illustrated in FIG. 1.

In a tenth embodiment, an input display system will be described in which the character string recognition unit 60 including the character recognition processing unit 61 is applied to the input display control device illustrated in FIG. 37.

Figure 48:
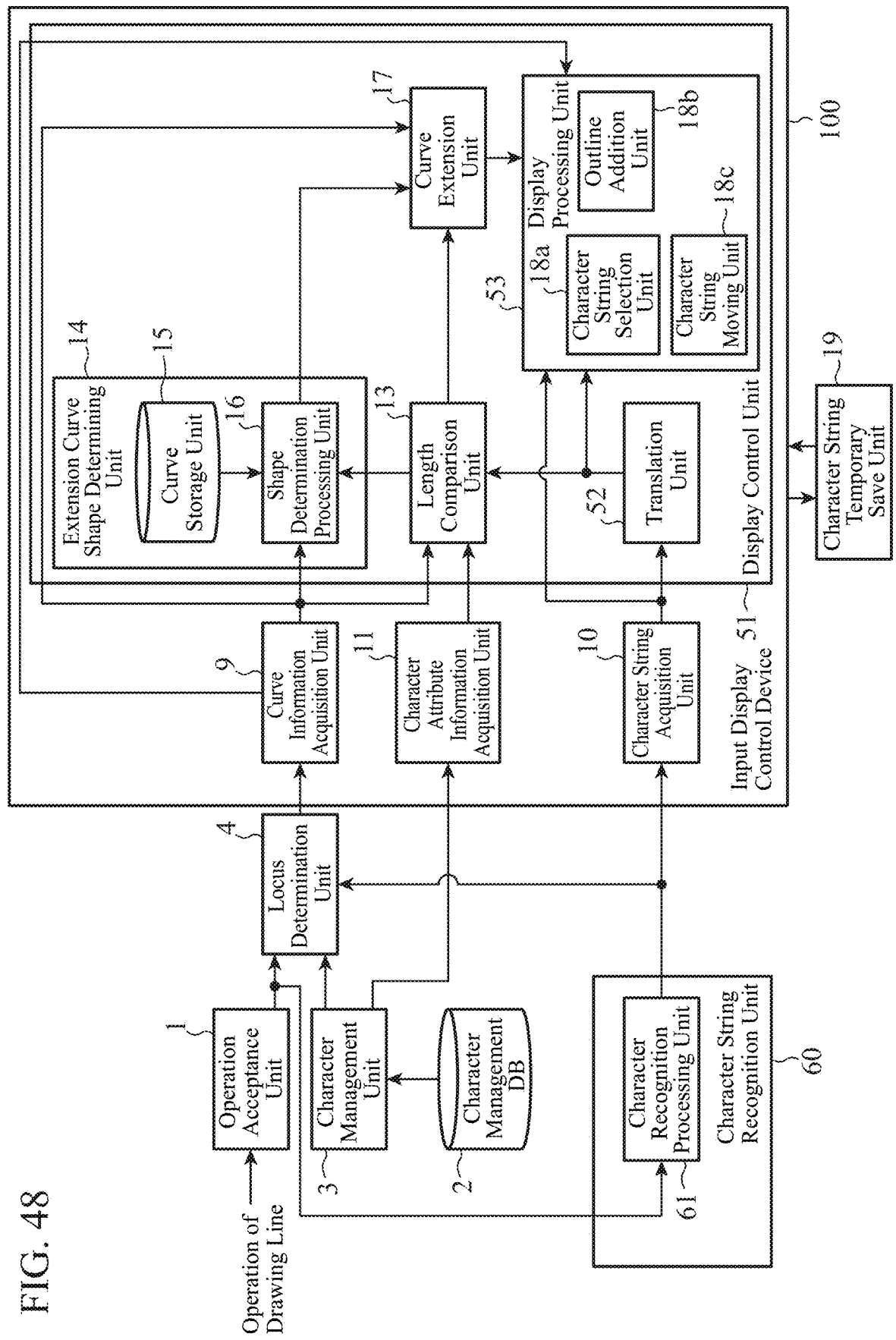
FIG. 48 is a configuration diagram illustrating an input display system including an input display control device according to a tenth embodiment.

FIG. 48 is a configuration diagram illustrating the input display system including the input display control device according to the tenth embodiment.

FIG. 49 is an explanatory diagram illustrating an example of processing of displaying a character string indicating a translation result.

In the input display system illustrated in FIG. 45, the display processing unit 18 causes the display 32 to display the character string indicating the recognition result of the multiple characters along the curve indicated by the curve information acquired by the curve information acquisition unit 9.

On the other hand, the input display system illustrated in FIG. 48 is different from the input display system illustrated in FIG. 45 in that the display processing unit 53 also causes the display 32 to display the character string indicating the translation result along the curve indicated by the curve information as illustrated in step C of FIG. 49.

In the tenth embodiment described above, as in the eighth embodiment, even when the length of the curve indicated by the curve information acquired by the curve information acquisition unit 9 is shorter than the character string indicating the translation result by the translation unit 52, the display processing unit 53 can cause the entire character string to be displayed along the curve.

Note that, in the tenth embodiment as well, as in the first embodiment, the input display control device 100 may be configured so that when the length of the character string indicating the translation result is long and thus a part of the character string protrudes out of the display area of the display 32, the part of the character string is disposed in the virtual area that is an area surrounding the display area.

Furthermore, in a case where the character string indicating the translation result is disposed in the virtual area, when the user selects the character string indicating that character string, an outline of a color different from the character may be added to the contour of the character included in the character string, as in the first embodiment.

Moreover, the movement of the selected character string may be accepted. By doing so, it is possible to avoid a situation in which the entire character string indicating the translation result cannot be generated.

Furthermore, when the user selects and moves either or both of the handwritten character string and the character string indicating the translation result, the handwritten character string and the character string indicating the translation result may be moved together. By doing so, it is possible to prevent the characters from being arranged at distant positions after the movement. Note that, a configuration is also possible in which movements are separately performed.

Note that, in the invention of the present application, within the scope of the invention, free combination of embodiments, a modification of an arbitrary component of each embodiment, or omission of an arbitrary component in each embodiment is possible.

INDUSTRIAL APPLICABILITY

The input display control device, the input display control method, and the input display system according to the present invention are suitable for applications for displaying character strings.

REFERENCE SIGNS LIST

1: operation acceptance unit, 2: character management DB, 3: character management unit, 4: locus determination unit, 5: character string recognition unit, 6: voice detection unit, 7: voice recognition dictionary DB, 8: voice recognition unit, 9: curve information acquisition unit, 10: character string acquisition unit, 11: character attribute information acquisition unit, 12: display control unit, 13: length comparison unit, 14: extension curve shape determining unit, 15: curve storage unit, 16: shape determination processing unit, 17: curve extension unit, 18: display processing unit, 18a: character string selection unit, 18b: outline addition unit, 18c: character string moving unit, 18d: table storage unit, 19: character string temporary save unit, 21: pointing device, 22: storage processing circuit, 23: character management processing circuit, 24: image generation processing circuit, 25: microphone, 26: voice recognition processing circuit, 27: input interface circuit, 28: length comparison processing circuit, 29: shape determination processing circuit, 30: curve extension processing circuit, 31: display processing circuit, 32: display, 34: translation processing circuit, 35: character recognition processing circuit, 41: memory, 42: processor, 51: display control unit, 52: translation unit, 53: display processing unit, 60: character string recognition unit, 61: character recognition processing unit, 100: input display control device.

The invention claimed is:

1. An input display control device comprising:
processing circuitry to perform a process of:
acquiring curve information indicating a curve;
acquiring a character string; and
generating display information for displaying the character string acquired along the curve indicated by the curve information acquired, wherein
the process
extends the curve by determining a shape of an extension part of the curve on a basis of the curve indicated by the curve information acquired when determining that a length of the curve indicated by the curve information acquired is shorter than a length of the character string acquired,
compares the length of the curve with the length of the character string acquired when the curve reaches ends of a display area of a display,
extends further the curve to a virtual area which is an area surrounding the display area when determining that a part of the character string acquired protrudes out of the display area of the display since a length of the character string acquired is longer than the length of the curve, and
generates the display information by disposing the part of the character string in the virtual area along the curve.

2. The input display control device according to claim 1, wherein the process includes accepting selection of the character string a part of which is disposed in the virtual area.

3. The input display control device according to claim 2, wherein when a user's contact time with respect to a character in the display area among characters included in the character string a part of which is disposed in the virtual area is longer than a threshold value, the character string selection unit accepts selection of the character string.

4. The input display control device according to claim 2, wherein the process includes adding, to a contour of a character included in the character string of which selection is accepted, an outline of a color different from that of the character.

5. The input display control device according to claim 2, wherein the process includes accepting movement of the character string of which selection is accepted.

6. The input display control device according to claim 5, wherein when the process accepts movement for disposing the entire character string of which selection is accepted in the display area, the process generates display information for displaying the entire character string on the display area.

7. The input display control device according to claim 5, wherein when the process accepts movement for moving the entire character string of which selection is accepted outside the display area, the process discards the character string.

8. The input display control device according to claim 1, wherein the process generates display information for displaying a part of the character string disposed in the virtual area in the display area by making a line break in the character string a part of which is disposed in the virtual area.

9. The input display control device according to claim 8, wherein the process generates a curve having a shape identical to a shape of the curve indicated by the curve information acquired, and generates display information for displaying a part of the character string disposed in the virtual area along the generated curve.

10. The input display control device according to claim 1, wherein the process generates display information for displaying the entire character string a part of which is disposed in the virtual area in the display area by moving the entire character string into the display area.

11. The input display control device according to claim 1, wherein the process makes the length of the character string a part of which is disposed in the virtual area less than or equal to a length of the curve indicated by the curve information acquired by reducing a character size of a character included in the character string.

12. The input display control device according to claim 1, wherein when the length of the character string acquired is shorter than a length of the curve indicated by the curve information acquired, the process increases a character size of a character included in the character string within a range in which the length of the character string is not longer than the length of the curve.

13. The input display control device according to claim 1, wherein the process performs processing of replacing the character string a part of which is disposed in the virtual area with another character string having a meaning identical to a meaning of the character string and having a length shorter than the length of the character string, and generates display information for displaying the other character string after replacement processing along the curve indicated by the curve information acquired.

14. The input display control device according to claim 1, wherein
the process acquires a plurality of pieces of the curve information acquired, and
the process generates display information for displaying the character string acquired along curves indicated by each of the plurality of pieces of curve information acquired.

15. An input display control method comprising:
acquiring curve information indicating a curve;
acquiring a character string; and
performing processing of generating display information for displaying the character string acquired along the curve indicated by the curve information acquired, by a display control unit,
extending the curve by determining a shape of an extension part of the curve on a basis of the curve indicated by the curve information acquired when determining that a length of the curve indicated by the curve information acquired is shorter than a length of the character string acquired,
comparing the length of the curve with the length of the character string acquired when the curve reaches ends of a display area of a display,
extending further the curve to a virtual area which is an area surrounding the display area when determining that a part of the character string acquired protrudes out of the display area of the display since a length of the character string acquired is longer than the length of the curve, and
generates the display information by disposing the part of the character string in the virtual area along the curve.

16. An input display system comprising:
processing circuitry to perform a process of:
accepting operation of drawing a line;
determining a locus of the line drawn by the operation accepted;
recognizing a character string to be displayed;
acquiring curve information indicating a curve representing the locus determined;
acquiring the character string recognized; and
generating display information for displaying the character string acquired along the curve indicated by the curve information acquired, wherein
the process
extends the curve by determining a shape of an extension part of the curve on a basis of the curve indicated by the curve information acquired when determining that a length of the curve indicated by the curve information acquired is shorter than a length of the character string acquired,
compares the length of the curve with the length of the character string acquired when the curve reaches ends of a display area of a display,
extends further the curve to a virtual area which is an area surrounding the display area when determining that a part of the character string acquired protrudes out of the display area of the display since a length of the character string acquired is longer than the length of the curve, and
generates the display information by disposing the part of the character string in the virtual area along the curve.

* * * * *